US011333636B2

(12) United States Patent
Langnes et al.

(10) Patent No.: US 11,333,636 B2
(45) Date of Patent: May 17, 2022

(54) DETECTING EVENTS USING ACOUSTIC FREQUENCY DOMAIN FEATURES

(71) Applicant: BP Exploration Operating Company Limited, Middlesex (GB)

(72) Inventors: Tommy Langnes, Weybridge (GB); Pradyumna Thiruvenkatanathan, Richmond (GB)

(73) Assignee: BP EXPLORATION OPERATING COMPANY LIMITED, Middlesex (GB)

( * ) Notice: Subject to any disclaimer, the term of this patent is extended or adjusted under 35 U.S.C. 154(b) by 76 days.

(21) Appl. No.: 16/755,211

(22) PCT Filed: Oct. 10, 2018

(86) PCT No.: PCT/EP2018/077568
§ 371 (c)(1),
(2) Date: Apr. 10, 2020

(87) PCT Pub. No.: WO2019/072899
PCT Pub. Date: Apr. 18, 2019

(65) Prior Publication Data
US 2020/0256834 A1  Aug. 13, 2020

Related U.S. Application Data

(60) Provisional application No. 62/571,070, filed on Oct. 11, 2017.

(51) Int. Cl.
*G01N 29/44* (2006.01)
*G01H 9/00* (2006.01)
(Continued)

(52) U.S. Cl.
CPC ......... *G01N 29/4454* (2013.01); *G01H 9/004* (2013.01); *G01M 3/24* (2013.01); *G01N 29/46* (2013.01); *G01W 1/00* (2013.01)

(58) Field of Classification Search
CPC ..... G01N 29/4454; G01N 29/46; G01M 3/24; G01H 9/004; G01W 1/00
See application file for complete search history.

(56) References Cited

U.S. PATENT DOCUMENTS 3,563,311 A  2/1971 Stein
3,841,144 A  10/1974 Baldwin
(Continued)

FOREIGN PATENT DOCUMENTS

CA  2760662 A1  12/2010
CA  2953938 A1  1/2016
(Continued)

OTHER PUBLICATIONS

Hull, John William, et al., "Well-Integrity Monitoring and Analysis Using Distributed Fiber-Optic Acoustic Sensors," IADC/SPE Drilling Conference and Exhibition, Feb. 2-4, 2010, New Orleans, Louisiana, US, SPE-128304-MS, https://doi.org/10.2118/128304-MS.
(Continued)

*Primary Examiner* — Bryan Bui
(74) *Attorney, Agent, or Firm* — Conley Rose, P.C.

(57) ABSTRACT

A system for processing acoustic data to identify an event includes a receiver unit including a processor and a memory. The receiver unit is configured to receive a signal from a sensor disposed along a sensor path or across a sensor area. A processing application is stored in the memory. The processing application, when executed on the processor, configures the processor to: receive the signal from the sensor, where the signal includes an indication of an acoustic signal received at one or more lengths along the sensor path or across a portion of the sensor area and the signal is indicative of the acoustic signal across a frequency spectrum; determine a plurality of frequency domain features of the signal across the frequency spectrum; and generate an
(Continued)

output comprising the plurality of frequency domain features.

23 Claims, 10 Drawing Sheets

(51) Int. Cl.
*G01M 3/24* (2006.01)
*G01N 29/46* (2006.01)
*G01W 1/00* (2006.01)

(56) References Cited

U.S. PATENT DOCUMENTS

| | | |
|---|---|---|
| 3,854,323 A | 12/1974 | Hearn et al. |
| 5,042,297 A | 8/1991 | Lessi |
| 5,113,941 A | 5/1992 | Donovan |
| 5,257,530 A | 11/1993 | Beattie et al. |
| 5,812,493 A | 9/1998 | Robein et al. |
| 5,825,017 A | 10/1998 | Pryor |
| 5,971,095 A | 10/1999 | Ozbek |
| 6,075,611 A | 6/2000 | Dussan V. et al. |
| 6,151,556 A | 11/2000 | Allen |
| 6,201,765 B1 | 3/2001 | Ireson |
| 6,450,037 B1 | 9/2002 | McGuinn et al. |
| 6,501,067 B2 | 12/2002 | Jones et al. |
| 6,516,275 B2 | 2/2003 | Lazaratos |
| 6,550,342 B2 | 4/2003 | Croteau et al. |
| 6,555,807 B2 | 4/2003 | Clayton et al. |
| 6,587,798 B2 | 7/2003 | Kersey et al. |
| 6,601,458 B1 | 8/2003 | Gysling et al. |
| 6,601,671 B1 | 8/2003 | Zhao et al. |
| 6,651,007 B2 | 11/2003 | Ozbek |
| 6,672,131 B1 | 1/2004 | Aldal et al. |
| 6,738,715 B2 | 5/2004 | Shatilo et al. |
| 6,751,559 B2 | 6/2004 | Fookes et al. |
| 6,782,150 B2 | 8/2004 | Davis et al. |
| 6,813,403 B2 | 11/2004 | Tennyson |
| 6,829,538 B2 | 12/2004 | de Kok |
| 6,837,098 B2 | 1/2005 | Gysling et al. |
| 6,904,368 B2 | 6/2005 | Reshef et al. |
| 6,933,491 B2 | 8/2005 | Maida, Jr. |
| 7,028,543 B2 | 4/2006 | Hardage et al. |
| 7,030,971 B1 | 4/2006 | Payton |
| 7,072,044 B2 | 7/2006 | Kringlebotn et al. |
| 7,088,639 B2 | 8/2006 | Walls et al. |
| 7,130,496 B2 | 10/2006 | Rogers |
| 7,219,762 B2 | 5/2007 | James et al. |
| 7,355,923 B2 | 4/2008 | Reshef et al. |
| 7,357,021 B2 | 4/2008 | Blacklaw |
| 7,395,864 B2 | 7/2008 | Ramachandran et al. |
| 7,398,697 B2 | 7/2008 | Allen et al. |
| 7,404,456 B2 | 7/2008 | Weaver et al. |
| 7,503,217 B2 | 3/2009 | Johansen |
| 7,652,245 B2 | 1/2010 | Crickmore et al. |
| 7,659,828 B2 | 2/2010 | Wehrs et al. |
| 7,660,200 B2 | 2/2010 | Tang |
| 7,872,736 B2 | 1/2011 | Rogers et al. |
| 7,890,280 B2 | 2/2011 | Fomme |
| 7,896,069 B2 | 3/2011 | Dria et al. |
| 7,940,389 B2 | 5/2011 | Rogers et al. |
| 7,946,341 B2 | 5/2011 | Hartog et al. |
| 8,020,616 B2 | 9/2011 | Greenaway |
| 8,023,829 B2 | 9/2011 | Nash et al. |
| 8,131,121 B2 | 3/2012 | Huffman |
| 8,200,049 B2 | 6/2012 | Kaplan et al. |
| 8,245,780 B2 | 8/2012 | Fidan et al. |
| 8,248,589 B2 | 8/2012 | DeFreitas et al. |
| 8,264,676 B2 | 9/2012 | Kanellopoulos et al. |
| 8,408,064 B2 | 4/2013 | Hartog et al. |
| 8,520,197 B2 | 8/2013 | Handerek |
| 8,534,114 B2 | 9/2013 | Ellson |
| 8,564,786 B2 | 10/2013 | Crickmore et al. |
| 8,576,386 B2 | 11/2013 | Jones et al. |
| 8,605,542 B2 | 12/2013 | Coates et al. |
| 8,614,795 B2 | 12/2013 | Duncan et al. |
| 8,634,681 B2 | 1/2014 | Rogers |
| 8,661,907 B2 | 3/2014 | Davis et al. |
| 8,755,643 B2 | 6/2014 | Nash et al. |
| 8,797,824 B2 | 8/2014 | Crickmore et al. |
| 8,902,704 B2 | 12/2014 | Zamow et al. |
| 8,923,663 B2 | 12/2014 | Hill et al. |
| 8,941,821 B2 | 1/2015 | Coupe et al. |
| 8,950,482 B2 | 2/2015 | Hill et al. |
| 8,973,444 B2 | 3/2015 | Hill et al. |
| 8,996,298 B2 | 3/2015 | Yamada |
| 8,997,585 B2 | 4/2015 | Hayward |
| 9,002,149 B2 | 4/2015 | Rogers |
| 9,052,230 B2 | 6/2015 | Kutlik et al. |
| 9,075,155 B2 | 7/2015 | Luscombe et al. |
| 9,109,944 B2 | 8/2015 | Den Boer et al. |
| 9,110,018 B2 | 8/2015 | Handerek |
| 9,140,582 B2 | 9/2015 | Farhadiroushan et al. |
| 9,140,815 B2 | 9/2015 | Lopez et al. |
| 9,146,151 B2 | 9/2015 | Kupershmidt |
| 9,228,889 B2 | 1/2016 | McCann |
| 9,243,949 B2 | 1/2016 | Crickmore et al. |
| 9,250,112 B2 | 2/2016 | Godfrey |
| 9,250,120 B2 | 2/2016 | Smith et al. |
| 9,255,836 B2 | 2/2016 | Taverner et al. |
| 9,304,017 B2 | 4/2016 | Handerek |
| 9,341,731 B2 | 5/2016 | Biswas |
| 9,347,313 B2 | 5/2016 | Wills et al. |
| 9,354,338 B1 | 5/2016 | Psaila |
| 9,377,551 B2 | 6/2016 | Hartog et al. |
| 9,377,559 B2 | 6/2016 | Cooper |
| 9,388,685 B2 | 7/2016 | Ravi et al. |
| 9,416,644 B2 | 8/2016 | McEwen-King et al. |
| 9,423,523 B2 | 8/2016 | McEwen-King |
| 9,429,466 B2 | 8/2016 | Barfoot et al. |
| 9,430,507 B2 | 8/2016 | Stowe et al. |
| 9,435,668 B2 | 9/2016 | Lewis et al. |
| 9,435,902 B2 | 9/2016 | Hill et al. |
| 9,453,821 B2 | 9/2016 | Minto et al. |
| 9,459,329 B2 | 10/2016 | McEwen-King et al. |
| 9,465,126 B2 | 10/2016 | Lewis et al. |
| 9,478,937 B1 | 10/2016 | Kupershmidt et al. |
| 9,507,030 B2 | 11/2016 | Godfrey |
| 9,512,711 B2 | 12/2016 | Sobolewski et al. |
| 9,523,790 B1 | 12/2016 | Valishin |
| 9,541,425 B2 | 1/2017 | Farhadiroushan et al. |
| 9,557,195 B2 | 1/2017 | Barfoot et al. |
| 9,561,812 B2 | 2/2017 | Godfrey |
| 9,575,196 B2 | 2/2017 | Ji et al. |
| 9,594,002 B2 | 3/2017 | Godfrey et al. |
| 9,599,489 B2 | 3/2017 | Nash et al. |
| 9,605,537 B2 | 3/2017 | Hull et al. |
| 9,606,250 B2 | 3/2017 | Hull et al. |
| 9,625,348 B2 | 4/2017 | Hill et al. |
| 9,631,972 B2 | 4/2017 | Hill et al. |
| 9,651,474 B2 | 5/2017 | Farhadiroushan et al. |
| 9,651,709 B2 | 5/2017 | Jaaskelainen |
| 9,677,956 B2 | 6/2017 | Hill et al. |
| 9,702,244 B2 | 7/2017 | Willis et al. |
| 9,719,846 B2 | 8/2017 | Ellmauthaler et al. |
| 9,733,120 B2 | 8/2017 | Stokely et al. |
| 9,739,645 B2 | 8/2017 | Hill et al. |
| 9,746,393 B2 | 8/2017 | Godfrey |
| 9,759,824 B2 | 9/2017 | Lumens et al. |
| 9,766,371 B2 | 9/2017 | Barfoot et al. |
| 9,778,097 B2 | 10/2017 | McEwen-King |
| 9,784,642 B2 | 10/2017 | Strong et al. |
| 9,797,239 B2 | 10/2017 | Godfrey |
| 9,810,809 B2 | 11/2017 | Farhadiroushan et al. |
| 9,816,853 B2 | 11/2017 | Crickmore et al. |
| 9,823,114 B2 | 11/2017 | Farhadiroushan et al. |
| 9,829,368 B2 | 11/2017 | Kutlik et al. |
| 9,850,749 B2 | 12/2017 | Finfer et al. |
| 9,869,795 B2 | 1/2018 | Jaaskelainen |
| 9,880,047 B2 | 1/2018 | Martin et al. |
| 9,896,929 B2 | 2/2018 | Farhadiroushan et al. |
| 9,909,903 B2 | 3/2018 | Lewis et al. |
| 9,945,215 B2 | 4/2018 | Godfrey |
| 9,945,979 B2 | 4/2018 | Stokely et al. |

(56) References Cited

U.S. PATENT DOCUMENTS

| | | |
|---|---|---|
| 9,983,293 B2 | 5/2018 | Farhadiroushan et al. |
| 9,989,388 B2 | 6/2018 | Farhadiroushan et al. |
| 10,018,036 B2 | 7/2018 | Ellmauthaler et al. |
| 10,031,044 B2 | 7/2018 | Kumar et al. |
| 10,067,030 B2 | 9/2018 | Hartog et al. |
| 10,101,182 B2 | 10/2018 | Barfoot |
| 10,120,104 B2 | 11/2018 | Roy et al. |
| 10,139,268 B2 | 11/2018 | Nunes et al. |
| 10,145,821 B2 | 12/2018 | Farhadiroushan et al. |
| 10,151,626 B2 | 12/2018 | Godfrey et al. |
| 10,175,374 B2 | 1/2019 | Dusterhoft et al. |
| 10,180,515 B2 | 1/2019 | Ellmauthaler et al. |
| 10,197,693 B2 | 2/2019 | Kalyanraman et al. |
| 10,198,946 B2 | 2/2019 | Crickmore et al. |
| 10,215,017 B2 | 2/2019 | Hull et al. |
| 10,221,681 B2 | 3/2019 | McEwen-King et al. |
| 10,234,345 B2 | 3/2019 | Hull et al. |
| 10,247,584 B2 | 4/2019 | Crickmore et al. |
| 10,260,937 B2 | 4/2019 | Dankers et al. |
| 10,267,141 B2 | 4/2019 | Nunes et al. |
| 10,274,381 B2 | 4/2019 | Kulkarni et al. |
| 10,275,402 B2 | 4/2019 | Guerriero et al. |
| 10,281,341 B2 | 5/2019 | Hull et al. |
| 10,310,113 B2 | 6/2019 | Sun et al. |
| 10,317,262 B2 | 6/2019 | Kippersund et al. |
| 10,379,239 B2 | 8/2019 | Udengaard |
| 10,393,921 B2 | 8/2019 | Cuny et al. |
| 10,401,519 B2 | 9/2019 | Willis et al. |
| 10,416,328 B2 | 9/2019 | Walters et al. |
| 10,422,365 B2 | 9/2019 | Hull et al. |
| 10,422,901 B2 | 9/2019 | Walters et al. |
| 10,429,530 B2 | 10/2019 | Rickett et al. |
| 10,444,388 B2 | 10/2019 | Dusterhoft et al. |
| 10,444,391 B2 | 10/2019 | Ellmauthaler et al. |
| 10,444,393 B2 | 10/2019 | Cheng et al. |
| 10,458,224 B2 | 10/2019 | Dickenson et al. |
| 10,520,625 B2 | 12/2019 | Walters et al. |
| 10,578,757 B2 | 3/2020 | Dong et al. |
| 10,975,687 B2 * | 4/2021 | Langnes ............ G01N 29/4427 |
| 11,053,791 B2 | 7/2021 | Langnes |
| 2001/0037883 A1 | 11/2001 | Veneruso et al. |
| 2002/0125009 A1 | 9/2002 | Wetzel et al. |
| 2002/0139929 A1 | 10/2002 | Mullins et al. |
| 2002/0195246 A1 | 12/2002 | Davidson |
| 2003/0010126 A1 | 1/2003 | Romanet et al. |
| 2003/0014199 A1 | 1/2003 | Toomey |
| 2003/0029241 A1 | 2/2003 | Mandal |
| 2004/0059505 A1 | 3/2004 | Gallagher |
| 2004/0252748 A1 | 12/2004 | Gleitman |
| 2005/0100172 A1 | 5/2005 | Schliep et al. |
| 2005/0246111 A1 | 11/2005 | Gysling et al. |
| 2006/0113089 A1 | 6/2006 | Henriksen et al. |
| 2006/0165239 A1 | 7/2006 | Langner et al. |
| 2006/0165344 A1 | 7/2006 | Mendez et al. |
| 2007/0047867 A1 | 3/2007 | Goldner |
| 2007/0163780 A1 | 7/2007 | Onodera et al. |
| 2007/0199696 A1 | 8/2007 | Walford |
| 2007/0215345 A1 | 9/2007 | Lafferty et al. |
| 2007/0234789 A1 | 10/2007 | Glasbergen et al. |
| 2007/0247631 A1 | 10/2007 | Paulson |
| 2007/0253561 A1 | 11/2007 | Williams et al. |
| 2008/0137475 A1 | 6/2008 | Maisons |
| 2008/0154510 A1 | 6/2008 | Scott |
| 2008/0232748 A1 | 9/2008 | Nash |
| 2008/0314142 A1 | 12/2008 | Davies |
| 2009/0010104 A1 | 1/2009 | Leaney |
| 2009/0055098 A1 | 2/2009 | Mese et al. |
| 2009/0132183 A1 | 5/2009 | Hartog et al. |
| 2009/0202192 A1 | 8/2009 | Taverner et al. |
| 2009/0213692 A1 | 8/2009 | Martinez et al. |
| 2010/0163223 A1 | 7/2010 | Brown |
| 2010/0243241 A1 | 9/2010 | Hampton et al. |
| 2010/0258304 A1 | 10/2010 | Hegeman |
| 2010/0268489 A1 | 10/2010 | Lie et al. |
| 2011/0011577 A1 | 1/2011 | Dusterhoft et al. |
| 2011/0030467 A1 | 2/2011 | Bakulin |
| 2011/0042071 A1 | 2/2011 | Hsu et al. |
| 2011/0085415 A1 | 4/2011 | Morton et al. |
| 2011/0094741 A1 | 4/2011 | Vigneaux et al. |
| 2011/0110191 A1 | 5/2011 | Williams-Stroud et al. |
| 2011/0139538 A1 | 6/2011 | Hill et al. |
| 2011/0149688 A1 | 6/2011 | Hill et al. |
| 2011/0188346 A1 | 8/2011 | Hull |
| 2011/0255077 A1 | 10/2011 | Rogers |
| 2011/0301882 A1 | 12/2011 | Andersen |
| 2011/0315369 A1 | 12/2011 | Holderman et al. |
| 2012/0020184 A1 | 1/2012 | Wilson et al. |
| 2012/0043079 A1 | 2/2012 | Wassouf et al. |
| 2012/0057432 A1 | 3/2012 | Hill et al. |
| 2012/0092960 A1 | 4/2012 | Gaston et al. |
| 2012/0096922 A1 | 4/2012 | Ellson |
| 2012/0111560 A1 | 5/2012 | Hill et al. |
| 2012/0137781 A1 | 6/2012 | Hill et al. |
| 2012/0152024 A1 | 6/2012 | Johansen |
| 2012/0155218 A1 | 6/2012 | Beasley et al. |
| 2012/0201096 A1 | 8/2012 | Valero et al. |
| 2012/0257475 A1 | 10/2012 | Luscombe et al. |
| 2012/0290213 A1 | 11/2012 | Huo et al. |
| 2012/0298421 A1 | 11/2012 | Coates |
| 2013/0139600 A1 | 6/2013 | McEwen-King et al. |
| 2013/0151203 A1 | 6/2013 | McEwen-King et al. |
| 2013/0166227 A1 | 6/2013 | Hermann et al. |
| 2013/0167628 A1 | 7/2013 | Hull et al. |
| 2013/0170519 A1 | 7/2013 | Alliot |
| 2013/0298665 A1 | 11/2013 | Minchau |
| 2013/0299165 A1 | 11/2013 | Crow |
| 2013/0319121 A1 | 12/2013 | Hill et al. |
| 2014/0025319 A1 | 1/2014 | Farhadiroushan et al. |
| 2014/0036627 A1 | 2/2014 | Hull et al. |
| 2014/0036628 A1 | 2/2014 | Hill et al. |
| 2014/0044222 A1 | 2/2014 | Kim et al. |
| 2014/0069173 A1 | 3/2014 | Roy et al. |
| 2014/0086009 A1 | 3/2014 | Yoneshima |
| 2014/0110124 A1 | 4/2014 | Goldner et al. |
| 2014/0150523 A1 | 6/2014 | Stokely et al. |
| 2014/0150548 A1 | 6/2014 | Childers et al. |
| 2014/0204368 A1 | 7/2014 | Lewis et al. |
| 2014/0216151 A1 | 8/2014 | Godfrey et al. |
| 2014/0334253 A1 | 11/2014 | Lumens et al. |
| 2014/0362668 A1 | 12/2014 | McEwen-King |
| 2015/0000415 A1 | 1/2015 | Kelley |
| 2015/0085610 A1 | 3/2015 | Raum et al. |
| 2015/0144333 A1 | 5/2015 | Lee et al. |
| 2015/0146759 A1 | 5/2015 | Johnston |
| 2015/0234526 A1 | 8/2015 | Chalubert et al. |
| 2015/0235544 A1 | 8/2015 | Hernandez et al. |
| 2015/0308191 A1 | 10/2015 | Zhan et al. |
| 2015/0308909 A1 | 10/2015 | Carneal et al. |
| 2016/0123798 A1 | 5/2016 | Godfrey et al. |
| 2016/0138386 A1 | 5/2016 | Stokely et al. |
| 2016/0146962 A1 | 5/2016 | Hayward |
| 2016/0201453 A1 | 7/2016 | Kaiser et al. |
| 2016/0223389 A1 | 8/2016 | Farhadiroushan et al. |
| 2016/0259079 A1 | 9/2016 | Wilson et al. |
| 2016/0265345 A1 | 9/2016 | In T Panhuis et al. |
| 2016/0281494 A1 | 9/2016 | Shirdel et al. |
| 2016/0312552 A1 | 10/2016 | Early et al. |
| 2016/0312604 A1 | 10/2016 | Hull et al. |
| 2016/0320232 A1 | 11/2016 | Nunes et al. |
| 2016/0327419 A1 | 11/2016 | Hellevang et al. |
| 2016/0342569 A1 | 11/2016 | Al Marzouqi |
| 2016/0356665 A1 | 12/2016 | Felemban et al. |
| 2016/0369590 A1 | 12/2016 | Tonkin et al. |
| 2016/0369607 A1 | 12/2016 | Roy et al. |
| 2017/0010385 A1 | 1/2017 | Englich et al. |
| 2017/0016312 A1 | 1/2017 | Clarke et al. |
| 2017/0039826 A1 | 2/2017 | Cojocaur |
| 2017/0045410 A1 | 2/2017 | Crickmore et al. |
| 2017/0052049 A1 | 2/2017 | Crickmore et al. |
| 2017/0052050 A1 | 2/2017 | Crickmore et al. |
| 2017/0074998 A1 | 3/2017 | McColpin et al. |
| 2017/0074999 A1 | 3/2017 | Walters et al. |
| 2017/0075001 A1 | 3/2017 | McColpin et al. |
| 2017/0075002 A1 | 3/2017 | Ranjan et al. |

(56) References Cited

U.S. PATENT DOCUMENTS

| | | |
|---|---|---|
| 2017/0075003 A1 | 3/2017 | Dusterhoft et al. |
| 2017/0075004 A1 | 3/2017 | McColpin et al. |
| 2017/0075005 A1 | 3/2017 | Ranjan et al. |
| 2017/0082766 A1 | 3/2017 | Milne et al. |
| 2017/0090054 A1 | 3/2017 | Willis et al. |
| 2017/0119255 A1 | 5/2017 | Mahajan et al. |
| 2017/0123089 A1 | 5/2017 | Walters et al. |
| 2017/0153154 A1 | 6/2017 | Hull et al. |
| 2017/0205253 A1 | 7/2017 | Handerek |
| 2017/0234999 A1 | 8/2017 | Dykstra et al. |
| 2017/0241830 A1 | 8/2017 | Jaaskelainen |
| 2017/0241831 A1 | 8/2017 | Jaaskelainen |
| 2017/0275986 A1 | 9/2017 | Nunes et al. |
| 2017/0292862 A1 | 10/2017 | Godfrey |
| 2017/0315261 A1 | 11/2017 | Bartling et al. |
| 2017/0342814 A1 | 11/2017 | Krueger et al. |
| 2017/0343389 A1 | 11/2017 | Parker et al. |
| 2017/0350234 A1 | 12/2017 | Xia et al. |
| 2017/0363756 A1 | 12/2017 | El Allouche et al. |
| 2017/0371057 A1 | 12/2017 | Mateeva et al. |
| 2018/0010443 A1 | 1/2018 | Lu et al. |
| 2018/0024260 A1 | 1/2018 | Hornman et al. |
| 2018/0031413 A1 | 2/2018 | Stokely et al. |
| 2018/0045543 A1 | 2/2018 | Farhadiroushan et al. |
| 2018/0045768 A1 | 2/2018 | Godfrey et al. |
| 2018/0058196 A1 | 3/2018 | Jaaskelainen et al. |
| 2018/0066490 A1 | 3/2018 | Kjos |
| 2018/0087372 A1 | 3/2018 | Stokely et al. |
| 2018/0094952 A1 | 4/2018 | Handerek |
| 2018/0112519 A1 | 4/2018 | Duan et al. |
| 2018/0112520 A1 | 4/2018 | Duan |
| 2018/0112523 A1 | 4/2018 | Yang et al. |
| 2018/0136354 A1 | 5/2018 | Haldorsen |
| 2018/0172860 A1 | 6/2018 | Wilson et al. |
| 2018/0180658 A1 | 6/2018 | Godfrey |
| 2018/0203144 A1 | 7/2018 | Karrenbach et al. |
| 2018/0222498 A1 | 8/2018 | Kelley |
| 2018/0224572 A1 | 8/2018 | Farhadiroushan et al. |
| 2018/0230797 A1 | 8/2018 | Seshadri et al. |
| 2018/0231658 A1 | 8/2018 | Jalilian et al. |
| 2018/0238167 A1 | 8/2018 | Ravi et al. |
| 2018/0252097 A1 | 9/2018 | Skinner et al. |
| 2018/0259662 A1 | 9/2018 | Srinivasan |
| 2018/0266854 A1 | 9/2018 | Moore et al. |
| 2018/0267201 A1 | 9/2018 | Lewis |
| 2018/0284752 A1 | 10/2018 | Cella et al. |
| 2018/0292569 A1 | 10/2018 | LeBlanc et al. |
| 2018/0320827 A1 | 11/2018 | Hull et al. |
| 2018/0340801 A1 | 11/2018 | Kelley et al. |
| 2018/0342156 A1 | 11/2018 | Martin et al. |
| 2018/0354534 A1 | 12/2018 | Cole |
| 2018/0356210 A1 | 12/2018 | Moore et al. |
| 2019/0003499 A1 | 1/2019 | Logan et al. |
| 2019/0003903 A1 | 1/2019 | Godfrey |
| 2019/0025094 A1 | 1/2019 | Lewis et al. |
| 2019/0026634 A1 | 1/2019 | Homeyer et al. |
| 2019/0064030 A1 | 2/2019 | Sundermann |
| 2019/0072379 A1 | 3/2019 | Jalilian et al. |
| 2019/0113641 A1 | 4/2019 | Fang et al. |
| 2019/0120044 A1 | 4/2019 | Langnes et al. |
| 2019/0137045 A1 | 5/2019 | Jalilian et al. |
| 2019/0169985 A1 | 6/2019 | Dickenson et al. |
| 2019/0186958 A1 | 6/2019 | Godfrey |
| 2019/0197846 A1 | 6/2019 | Englund |
| 2019/0225250 A1 | 7/2019 | Esprey et al. |
| 2019/0257169 A1 | 8/2019 | Grimsbo et al. |
| 2019/0257699 A1 | 8/2019 | Handerek et al. |
| 2019/0277135 A1 | 9/2019 | Zha |
| 2019/0323863 A1 | 10/2019 | Shatalin et al. |
| 2019/0324444 A1 | 10/2019 | Cella et al. |
| 2019/0331819 A1 | 10/2019 | Wu et al. |
| 2019/0339688 A1 | 11/2019 | Cella et al. |
| 2019/0353814 A1 | 11/2019 | Cha et al. |
| 2019/0375213 A1* | 12/2019 | Theopold ................. B65B 35/16 |
| 2019/0390546 A1 | 12/2019 | Langnes et al. |
| 2020/0018149 A1 | 1/2020 | Luo et al. |
| 2020/0024942 A1 | 1/2020 | Lolla et al. |
| 2020/0032639 A1 | 1/2020 | Langnes et al. |
| 2020/0032645 A1 | 1/2020 | LeBlanc et al. |
| 2020/0048999 A1 | 2/2020 | Langnes et al. |
| 2020/0056907 A1 | 2/2020 | Godfrey |
| 2020/0057220 A1 | 2/2020 | Hull et al. |
| 2020/0070862 A1 | 3/2020 | Bilodeau et al. |
| 2020/0081145 A1 | 3/2020 | Padhi et al. |
| 2020/0088022 A1 | 3/2020 | Shen et al. |
| 2020/0102821 A1 | 4/2020 | Willis et al. |
| 2020/0124489 A1 | 4/2020 | Godfrey |
| 2020/0131900 A1 | 4/2020 | Leblanc et al. |
| 2020/0158594 A1 | 5/2020 | Dankers et al. |
| 2020/0172130 A1 | 6/2020 | Esprey |
| 2020/0173273 A1 | 6/2020 | Thiruvenkatanathan |
| 2020/0173818 A1 | 6/2020 | Handerek et al. |
| 2020/0174149 A1 | 6/2020 | Thiruvenkatanathan |
| 2020/0182047 A1 | 6/2020 | Langnes et al. |
| 2020/0184556 A1 | 6/2020 | Cella |
| 2020/0190971 A1 | 6/2020 | Thiruvenkatanathan |
| 2020/0200000 A1 | 6/2020 | Langnes et al. |
| 2020/0200943 A1 | 6/2020 | Adeyemi et al. |
| 2020/0233107 A1 | 7/2020 | Constantinou et al. |
| 2020/0291772 A1 | 9/2020 | Thiruvenkatanathan et al. |
| 2021/0047916 A1 | 2/2021 | Thiruvenkatanathan et al. |
| 2021/0115785 A1 | 4/2021 | Cerrahoglu et al. |
| 2021/0115786 A1 | 4/2021 | Cerrahoglu et al. |
| 2021/0148199 A1 | 5/2021 | Thiruvenkatanathan |

FOREIGN PATENT DOCUMENTS

| | | |
|---|---|---|
| CA | 2866274 A1 | 3/2016 |
| CN | 101769442 A | 7/2010 |
| CN | 102226390 A | 10/2011 |
| CN | 203561437 U | 4/2014 |
| CN | 105135219 A | 12/2015 |
| CN | 105676267 A | 6/2016 |
| CN | 205746047 U | 11/2016 |
| CN | 108918405 A | 11/2018 |
| CN | 109000157 A | 12/2018 |
| CN | 110231409 A | 9/2019 |
| CN | 209858753 U | 12/2019 |
| EP | 2418466 A2 | 2/2012 |
| EP | 3006908 A1 | 4/2016 |
| EP | 3032441 A2 | 6/2016 |
| EP | 3073051 A1 | 9/2016 |
| EP | 3314308 A1 | 5/2018 |
| EP | 3440314 A2 | 2/2019 |
| GB | 1299843 A | 12/1972 |
| GB | 2354782 A | 4/2001 |
| GB | 2359834 A | 9/2001 |
| GB | 2522061 A | 7/2015 |
| GB | 2555550 A | 5/2018 |
| GB | 2555637 A | 5/2018 |
| JP | 5518424 B2 | 6/2014 |
| NL | 9000577 A | 10/1990 |
| WO | 9721116 A1 | 6/1997 |
| WO | 2004031738 A1 | 4/2004 |
| WO | 2007/024763 A2 | 3/2007 |
| WO | 2007024763 A2 | 3/2007 |
| WO | 2008147953 A1 | 12/2008 |
| WO | 2009048340 A2 | 4/2009 |
| WO | 2009086279 A2 | 7/2009 |
| WO | 2009109747 A1 | 9/2009 |
| WO | 2010099484 A2 | 9/2010 |
| WO | 2012011831 A1 | 1/2012 |
| WO | 2013114135 A2 | 8/2013 |
| WO | 2015011394 A1 | 1/2015 |
| WO | 2015025216 A2 | 2/2015 |
| WO | 2015060981 A1 | 4/2015 |
| WO | 2015170113 A1 | 11/2015 |
| WO | 2015170116 A1 | 11/2015 |
| WO | 2016010550 A1 | 1/2016 |
| WO | 2016020654 A1 | 2/2016 |
| WO | 2016108914 A1 | 7/2016 |
| WO | 2016115030 A1 | 7/2016 |
| WO | 2016207341 A1 | 12/2016 |
| WO | 2017009606 A1 | 1/2017 |

(56) References Cited

FOREIGN PATENT DOCUMENTS

| | | |
|---|---|---|
| WO | 2017064472 A1 | 4/2017 |
| WO | 2017078536 A1 | 5/2017 |
| WO | 2017109467 A1 | 6/2017 |
| WO | 2017156339 A1 | 9/2017 |
| WO | 2017203271 A1 | 11/2017 |
| WO | 2017214729 A1 | 12/2017 |
| WO | 2018044309 A1 | 3/2018 |
| WO | 2018057029 A1 | 3/2018 |
| WO | 2018088994 A1 | 5/2018 |
| WO | 2018136050 A1 | 7/2018 |
| WO | 2018154275 A1 | 8/2018 |
| WO | 2018195661 A1 | 11/2018 |
| WO | 2019005050 A1 | 1/2019 |
| WO | 2019027466 A1 | 2/2019 |
| WO | 2019072899 A2 | 4/2019 |
| WO | 2019094140 A1 | 5/2019 |
| WO | 2019094474 A1 | 5/2019 |
| WO | 2019136556 A1 | 7/2019 |
| WO | 2019139564 A1 | 7/2019 |
| WO | 2020109426 A2 | 6/2020 |
| WO | 2020109427 A2 | 6/2020 |
| WO | 2020119957 A1 | 6/2020 |
| WO | 2020182312 A1 | 9/2020 |
| WO | 2020260928 A1 | 12/2020 |
| WO | 2021034300 A1 | 2/2021 |
| WO | 2021037586 A1 | 3/2021 |
| WO | 2021052604 A1 | 3/2021 |
| WO | 2021052605 A1 | 3/2021 |
| WO | 2021052607 A1 | 3/2021 |
| WO | 2021073740 A1 | 4/2021 |
| WO | 2021073741 A1 | 4/2021 |
| WO | 2021073763 A1 | 4/2021 |
| WO | 2021073776 A1 | 4/2021 |
| WO | 2021093974 A1 | 5/2021 |
| WO | 2021093976 A1 | 5/2021 |

OTHER PUBLICATIONS

Isensys, "Sand Alert—Fixed and Portable Sand Monitoring," Isensys LLP, Sep. 2016, www.isensys.co.uk.
Johannessen, Kjetil, et al., "Distributed Acoustic Sensing—A New Way of Listening to Your Well/Reservoir," SPE Intelligent Energy International, Mar. 27-29, 2012, Utrecht, NL, SPE-149602-MS, https://doi.org/10.2118/149602-MS.
Li, Meng, et al., "Current and Future Applications of Distributed Acoustic Sensing as a New Reservoir Geophysics Tool," The Open Petroleum Engineering Journal, 2015, 8, (Suppl 1: M3) 272-281.
Ma, King, et al. "Deep Learning on Temporal-Spectral Data for Anomaly Detection," Department of Electrical and Computer Engineering, University of Calgary, Proc. of SPIE vol. 10190, 2017.
Martin, Shawn, "Can Oil Well Monitoring Systems Withstand Stimulation Treatments," Feb. 26, 2015, https://insights.globalspec.com/article/601/can-oil-well-monitoring-systems-withstand-stimulation-treatments [retrieved on Aug. 18, 2020].
Martinez, Roberto Jr., "Diagnosis of Fracture Flow Conditions With Acoustic Sensing," SPE Hydraulic Fracturing Technology Conference, Feb. 4-6, The Woodlands, Texas, US, Publication Date 2014.
Miller, Douglas E., et al., "Vertical Seismic Profiling Using a Fiber-optic Cable as a Distributed Acoustic Sensor," 74th EAGE Conference Exhibition incorporating SPE EUROPEC 2012, Copenhagen, Denmark, Jun. 4-7, 2012.
Mohd Daud, Farik, et al., "Successful Application of Ultrasound Technology to Detect Sand Producing Intervals in the Wellbore," International Petroleum Technology Conference, Nov. 15-17, 2011, Bangkok, Thailand, IPTC-14737-MS, https://doi.org/10.2523/IPTC-14737-MS.
Molenaar, Menno M., et al., "First Downhole Application of Distributed Acoustic Sensing for Hydraulic-Fracturing Monitoring and Diagnostics," SPE Drilling Completion, vol. 27, Is. 1, Mar. 2012, SPE-140561-PA, https://doi.org/10.2118/140561-PA.
Mullens, Stephen, et al., "Fiber-Optic Distributed Vibration Sensing Provides Technique for Detecting Sand Production," Offshore Technology Conference, May 3-6, 2010, Houston, Texas, US, OTC-20429-MS, https://doi.org/10.4043/20429-MS.
Naldrett, G., et al., "Production Monitoring Using Next-Generation Distributed Sensing Systems," Petrophysics, vol. 59, No. 4 (Aug. 2018); pp. 496-510; 16 Figures. DOI: 10.30632/PJV59V4-2018a5.
Paleja, Rakesh, et al., "Velocity Tracking for Flow Monitoring and Production Profiling Using Distributed Acoustic Sensing," SPE Annual Technical Conference and Exhibition, Sep. 28-30, 2015, Houston, Texas, US, SPE-174823-MS, https://doi.org/10.2118/174823-MS.
Roxar sand monitor, https://www.emerson.com/en-us/automation/roxar.
Roxar, "Sand Monitor, Non-intrusive acoustic sensor," Draft 1-120209, Sundheim-Madison Feb. 2009.
Schultz, Whitney H., "Time-Lapse Multicomponent Geophone and DAS VSP Processing and Analysis," Colorado School of Mines, Geo-Physics Department, 2019.
Silixa, "Fracture Monitoring," https://silixa.com/solutions/oil-and-gas-downhole/frac-services/fracture-monitoring/.
Silixa, "Well Integrity," https://silixa.com/solutions/oil-and-gas-downhole/permanent-reservoir-and-well-surveillance/well-integrity/.
Silkina, Tatiana, "Application of Distributed Acoustic Sensing to Flow Regime Classification," Natural Gas Technology, Norwegian University of Science and Technology, Jun. 2014.
Stokely, Christopher L., "Acoustics-Based Flow Monitoring During Hydraulic Fracturing," SPE-179151-MS, Society of Petroleum Engineers, SPE Hydraulic Fracturing Technology Conference, Feb. 9-11, 2016, The Woodlands, Texas, USA, https://doi.org/10.2118/179151-MS.
Susilo, Yoliandri, et al., "Significant Increase in Sand Control Reliability of Open Hole Gravel Pack Completions in ACG Field—Azerbaijan," SPE European Formation Damage Conference Exhibition, Jun. 5-7, 2013, Noordwijk, NL, SPE-165206-MS, https://doi.org/10.2118/165206-MS.
Tiffin, David L., et al., "Drawdown Guidelines for Sand Control Completions", SPE International, SPE 84495, Oct. 5, 2003 (Oct. 5, 2003), pp. 1-10, XP002361435.
Van der Horst, Juun, et al., "Fibre Optic Sensing For Improved Wellbore Production Surveillance," International Petroleum Technology Conference, Jan. 19-22, 2014, Doha, Qatar, IPTC-17528-MS, https://doi.org/10.2523/IPTC-17528-MS.
Wang, Fang, et al., "Pipeline Leak Detection by Using Time-Domain Statistical Features," IEEE Sensors Journal, vol. 17, No. 19, Oct. 2017.
Wang, Kai, et al., "Vibration Sensor Approaches for the Monitoring of Sand Production in Bohai Bay," Hindawi Publishing Corporation, Shock and Vibration, vol. 2015, Article ID 591780, http://dx.doi.org/10.1155/2015/591780.
World first installation of a fiber optic acoustic sensor for reservoir monitoring, Oil and Gas Product News, Oct. 30, 2009.
WorldOil.com, "Adelous unveils distributed acoustic sensor solution for upstream oil gas," May 28, 2015. https://www.worldoil.com/news/2015/5/28/adelous-unveils-distributed-acoustic-sensor-solution-for-upstream-oil-gas.
Xiao, J., et al., "Dynamic Water Injection Profiling in Intelligent Wells Using Distributed Acoustic Sensor with Multimode Optical Fibers," SPE Annual Technical Conference and Exhibition, Sep. 28-30, 2015, Houston, Texas, US, SPE-174865-MS, https://doi.org/10.2118/174865-MS.
Xiao, J.J., et al., "Intelligent Distributed Acoustic Sensing for In-well Monitoring," SPE Saudi Arabia Section Technical Symposium and Exhibition, Apr. 21-24, 2014, Al-Khobar, SA, SPE-172197-MS, https://doi.org/10.2118/172197-MS.
Williams, J., "Distributed acoustic sensing for pipeline monitoring," Pipeline and Gas Journal Jul. 2012, vol. 239 No. 7.
Partial International Search Report Search Report dated Oct. 20, 2020, PCT Application No. PCT/EP2020/051814.
Partial International Search Report Search Report dated Oct. 16, 2020, PCT Application No. PCT/EP2020/051817.

(56) References Cited

OTHER PUBLICATIONS

Restriction Requirement dated Dec. 15, 2020, U.S. Appl. No. 16/291,929, filed Oct. 5, 2018.
Notice of Allowance dated Dec. 11, 2020, U.S. Appl. No. 16/566,711, filed Sep. 10, 2019.
Final Office Action dated Sep. 3, 2020, U.S. Appl. No. 16/710,237, filed Dec. 11, 2019.
Office Action dated Feb. 11, 2021, U.S. Appl. No. 16/710,237, filed Dec. 11, 2019.
Office Action dated Dec. 3, 2020, U.S. Appl. No. 16/698,335, filed Nov. 11, 2019.
International Search Report and Written Opinion dated Nov. 6, 2020, PCT Application No. PCT/EP2020/072811.
International Search Report and Written Opinion dated Jul. 9, 2020, PCT Application No. PCT/EP2019/078195.
Office Action dated Jan. 7, 2021, U.S. Appl. No. 17/071,031, filed Oct. 15, 2020.
Office Action dated Jan. 14, 2021, U.S. Appl. No. 17/071,021, filed Oct. 20, 2020.
Office Action dated Dec. 30, 2020, U.S. Appl. No. 17/091,940, filed Nov. 6, 2020.
International Search Report and Written Opinion dated Feb. 3, 2021, PCT Application No. PCT/EP2020/066171.
International Search Report and Written Opinion dated Dec. 11, 2020, PCT Application No. PCT/EP2020/051814.
International Search Report and Written Opinion dated Dec. 20, 2020, PCT Application No. PCT/EP2020/051817.
International Search Report and Written Opinion dated Dec. 9, 2020, PCT Application No. PCT/EP2020/067043.
International Search Report and Written Opinion dated Oct. 5, 2017, PCT Application No. PCT/EP2017/058300.
International Preliminary Report on Patentability dated Oct. 18, 2018, PCT Application No. PCT/EP2017/058300.
Intention to Grant dated Dec. 12, 2019, EP Application No. 17715935.7.
Decision to Grant dated May 8, 2020, EP Application No. 17715935.7.
Office Action dated Dec. 29, 2019, U.S. Appl. No. 16/563,544, filed Sep. 16, 2019.
Notice of Allowance dated Apr. 22, 2020, U.S. Appl. No. 16/563,544, filed Sep. 16, 2019.
European Search Report dated Aug. 10, 2020, EP Application No. 20170700.7.
International Search Report and Written Opinion dated Sep. 22, 2017, PCT Application No. PCT/EP2017/058292.
International Preliminary Report on Patentability dated Oct. 18, 2018, PCT Application No. PCT/EP2017/058292.
Office Action dated Dec. 4, 2019, U.S. Appl. No. 16/563,689, filed Sep. 6, 2019.
Notice of Allowance dated May 20, 2020, U.S. Appl. No. 16/563,689, filed Sep. 6, 2019.
Corrected Notice of Allowability dated Jun. 19, 2020, U.S. Appl. No. 16/563,689, filed Sep. 6, 2019.
European Search Report dated Apr. 22, 2020, for European Application No. 20154638.9.
International Search Report and Written Opinion dated Jun. 29, 2018, PCT Application No. PCT/EP2018/058174.
International Preliminary Report on Patentability dated Oct. 10, 2019, PCT Application No. PCT/EP2018/058174.
Office Action dated Jan. 24, 2020, U.S. Appl. No. 16/566,711, filed Sep. 10, 2019.
Final Office Action dated Aug. 4, 2020, U.S. Appl. No. 16/566,711, filed Sep. 10, 2019.
Advisory Action dated Oct. 16, 2020, U.S. Appl. No. 16/566,711, filed Sep. 10, 2019.
European Article 94(3) Examination Report dated Jan. 15, 2020, for European Application No. 18714513.1.
European Article 94(3) Examination Report dated Jul. 29, 2020, for European Application No. 18714513.1.
European Search Report dated Dec. 4, 2019, for European Application No. 19198488.9.
European Article 94(3) Examination Report dated Feb. 3, 2020, for European Application No. 19198488.9.
Intention to Grant dated Aug. 10, 2020, for European Application No. 19198488.9.
Eurasian Office Action dated Sep. 3, 2020, for Eurasian Application No. 201992243/31.
International Search Report and Written Opinion dated Nov. 28, 2018, PCT Application No. PCT/EP2018/072811.
International Preliminary Report on Patentability dated Mar. 5, 2020, PCT Application No. PCT/EP2018/072811.
International Search Report and Written Opinion dated Feb. 14, 2020, PCT Application No. PCT/EP2019/057149.
Office Action dated Mar. 4, 2020, U.S. Appl. No. 16/710,237, filed Dec. 11, 2019.
International Preliminary Report on Patentability dated Apr. 23, 2020, PCT Application No. PCT/EP2018/077568.
International Search Report and Written Opinion dated Jul. 9, 2020, PCT Application No. PCT/EP2018/082985.
International Search Report and Written Opinion dated Jul. 9, 2020, PCT Application No. PCT/EP2019/082808.
Office Action dated Feb. 24, 2020, U.S. Appl. No. 16/698,335, filed Nov. 11, 2019.
Final Office Action dated Jun. 24, 2020, U.S. Appl. No. 16/698,335, filed Nov. 11, 2019.
Office Action dated Mar. 30, 2021, U.S. Appl. No. 16/291,929, filed Oct. 5, 2018.
Notice of Allowance dated Apr. 21, 2021, U.S. Appl. No. 16/563,689, filed Sep. 6, 2019.
Office Action dated Apr. 29, 2021, U.S. Appl. No. 16/639,774, filed Feb. 18, 2020.
Office Action dated Jul. 22, 2021, U.S. Appl. No. 16/710,237, filed Dec. 11, 2019.
Final Office Action dated Jun. 15, 2021, U.S. Appl. No. 16/698,335, filed Nov. 11, 2019.
Notice of Allowance dated Apr. 22, 2021, U.S. Appl. No. 17/071,031, filed Oct. 15, 2020.
Final Office Action dated May 11, 2021, U.S. Appl. No. 17/071,021, filed Oct. 20, 2020.
Advisory Action dated Jul. 28, 2021, U.S. Appl. No. 17/071,021, filed Oct. 20, 2020.
Office Action dated Mar. 22, 2021, U.S. Appl. No. 16/698,407, filed Nov. 27, 2019.
Final Office Action dated Jun. 29, 2021, U.S. Appl. No. 16/698,407, filed Nov. 27, 2019.
Final Office Action dated Apr. 7, 2021, U.S. Appl. No. 17/091,940, filed Nov. 6, 2020.
Notice of Allowance dated Jun. 29, 2021, U.S. Appl. No. 17/091,940, filed Nov. 6, 2020.
International Search Report and Written Opinion dated Mar. 15, 2021, PCT Application No. PCT/EP2020/067045.
International Search Report and Written Opinion dated Mar. 12, 2021, PCT Application No. PCT/EP2020/067044.
De la Cruz Salas, Luis M., "Computational Methods for Oil Recovery", Instituto de Geofisica Universidad Nacional Autonoma de Mexico, Jan. 2011, Slides 1-97 (Year: 2011).
Lashgari, Hamid R., et al., "A Four-Phase Chemical/Gas Model in an Implicit-Pressure/ Explicit-Concentration Reservoir Simulator," SPE J. 21 (2016): 1086-1105 (Year: 2016).
Thiruvenkatanathan Prad: "Seeing the LYTT: Real time flow profiling in hydrocarbon wells", Jun. 11, 2020 (Jun. 11, 2020). pp. 1-3, XP055776735, Retrieved from the Internet: URL:https://www.lytt.com/blog/the-new-tool-that-is-lytting-up-inflow-profiling [retrieved—on Feb. 16, 2021], p. 1 p. 2.
Advisory Action dated Aug. 25, 2020, U.S. Appl. No. 16/698,335, filed Nov. 11, 2019.
International Search Report and Written Opinion dated Jan. 27, 2020, PCT Application No. PCT/EP2019/056425.
International Search Report and Written Opinion dated Feb. 28, 2020, PCT Application No. PCT/IB2019/055355.
International Search Report and Written Opinion dated Jun. 16, 2020, PCT Application No. PCT/EP2019/075385.

(56) References Cited

OTHER PUBLICATIONS

International Search Report and Written Opinion dated Jun. 16, 2020, PCT Application No. PCT/EP2019/075378.
International Search Report and Written Opinion dated Jun. 17, 2020, PCT Application No. PCT/US2019/046759.
International Search Report and Written Opinion dated May 12, 2020, PCT Application No. PCT/EP2019/072891.
International Search Report and Written Opinion dated Jun. 16, 2020, PCT Application No. PCT/EP2019/075387.
International Search Report and Written Opinion dated Jun. 16, 2020, PCT Application No. PCT/EP2019/075382.
Partial International Search Report Search Report dated Sep. 10, 2020, PCT Application No. PCT/EP2019/085454.
International Search Report and Written Opinion dated Jul. 9, 2020, PCT Application No. PCT/EP2019/078197.
International Search Report and Written Opinion dated May 29, 2020, PCT Application No. PCT/EP2019/082809.
Office Action dated Mar. 12, 2020, U.S. Appl. No. 16/698,407, filed Nov. 27, 2019.
Final Office Action dated Jun. 30, 2020, U.S. Appl. No. 16/698,407, filed Nov. 27, 2019.
Examination Report dated Jul. 15, 2020, GCC Application No. GC 2019-38726.
International Search Report and Written Opinion dated Jul. 24, 2020, PCT Application No. PCT/EP2019/081542.
International Search Report and Written Opinion dated Jul. 24, 2020, PCT Application No. PCT/EP2019/081545.
Abdelgaward, Ahemd, "Distributed Sand Monitoring Framework Using Wireless Sensor Networks," School of Engineering Technology, Central Michigan University, Mount Pleasant, MI 48859, US, Oct. 2013, vol. 1 Is. 1, pp. 1-10.
Abukhamsin, Ahmed Yasin, et al., "In Flow Profiling and Production Optimization in Smart Wells Using Di stri but ed Acoustic and Temperature Measurements," Jun. 1, 2017 (Jun. 1, 2017), XP055604495, Retrieved from the Internet: URL: https://pangea.stanford.edu/ERE/pdf/pereports/PhD/Abukhamsin2016.pdf [retrieved on Jul. 11, 2019] paragraphs [0001], [0002], [0004].
Bakku, Sudhish K., et al., "Vertical Seismic Profiling Using Distributed Acoustic Sensing in a Hydrofrac Treatment Well," SEG Technical Program Expanded Abstracts Denver 2014 ISSN (print): 1052-3812, ISSN (online): 1949-4645, https://doi.org/10.1190/segam2014-1559.1.
Broesch, James "Digital Signal Processing: Instant Access," Chapter 7, www.newnespress.com.
Brown, Gerald K., "External Acoustic Sensors and Instruments for the Detection of Sand in Oil and Gas Wells," Offshore Technology Conference, May 5-8, 1997, Houston, Texas, US, OTC-8478-MS, https://doi.org/10.4043/8478-MS.
Brown, Gerald K., et al., "Solids and Sand Monitoring—An Overview," CORROSION 2000, Mar. 26-31, Orlando, Florida, US, NACE International, NACE-00091.
Cannon, Robert Thayer, et al., "Distributed Acoustic Sensing: State of the Art," SPE Digital Energy Conference, Mar. 5-7, 2013, The Woodlands, Texas, US, SPE-163688-MS, https://doi.org/10.2118/163688-MS.
Chen, Jianyou, et al., "Distributed acoustic sensing coupling noise removal based on sparse optimization," Society of Exploration Geophysicists and American Association of Petroleum Geologists, vol. 7, Issue 2, May 2019, pp. 1M-T563, ISSN (print): 2324-8858, ISSN (online): 2324-8866, https://doi.org/10.1190/INT-2018-0080.1.
Chhantyal, Khim et al., "Upstream Ultrasonic Level Based Soft Sensing of Volumetric Flow of Non-Newtonian Fluids in Open Venturi Channels," IEEE Sensors Journal, vol. 18, No. 12, Jun. 15, 2018.
ClampOn DSP-06 Particle Monitor, Aug. 2009.
ClampOn SandQ® Monitor, Aug. 2014.
Conway, Chris, et al., "An introduction to fiber optic Intelligent Distributed Acoustic Sensing (iDAS) technology for power industry applications," 9th International Conference on Insulated Power Cables, Jicable15—Versailles Jun. 21-25, 2015, A3.4.
Correa, Julia, et al., "3D vertical seismic profile acquired with distributed acoustic sensing on tubing installation: A case study from the CO2CRC Otway Project," Interpretation—a Journal of Subsurface Characterization, 7(1), ISSN 2324-8858, Feb. 1, 2019, DOI 10.1190/INT-2018-0086.1, https://escholarship.org/uc/item/2br8g398.
Finfer, D.C., et al., "Borehole Flow Monitoring using a Non-intrusive Passive Distributed Acoustic Sensing (DAS)," Society of Petroleum Engineers, SPE-170844-MS, SPE Annual Technical Conference and Exhibition held in Amsterdam, The Netherlands, Oct. 27-29, 2014.
Gardner, Neil, et al., "Distributed Fiber-Optic Technologies Drive New Intervention Applications," SPE JPT-7975, vol. 67 | Issue: 1, Jan. 1, 2015.
Hill, David, Permanent real-time full wellbore flow monitoring using distributed fiber-optic sensing, OptaSense, 2015.
Hofman, Joachim, et al., "Analysis of the acoustic response in water and sand of different fiber optic sensing cables," SPIE Sensing Technology + Applications, 2015, Baltimore, Maryland, U.S., Proceedings vol. 9491, Sensors for Extreme Harsh Environments II; 94910E (2015) https://doi.org/10.1117/12.2178282.
Folkestad, Trond, et al., "Acoustic measurements detect sand in North Sea flow lines," Oil and Gas Journal; (USA), Journal vol. 88:35; Journal ID: ISSN 0030-1388.
Molenaar, Mathieu, et al., "Downhole tests show benefits of distributed acoustic sensing," Oil and Gas Journal 109(1):82-85, Jan. 2011.
PCT/EP2018/077568 International Search Report and Written Opinion dated Jun. 4, 2019 (22 p.).

\* cited by examiner

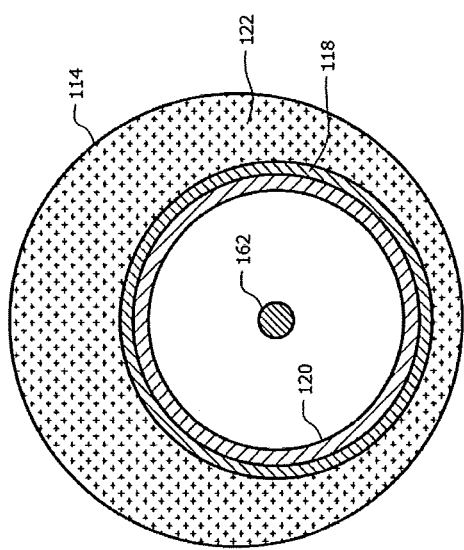 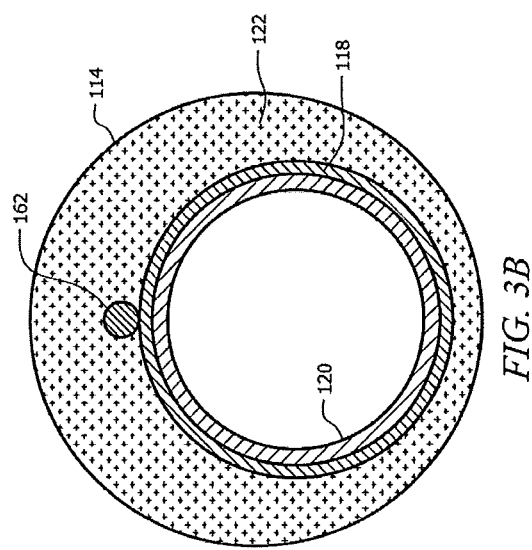

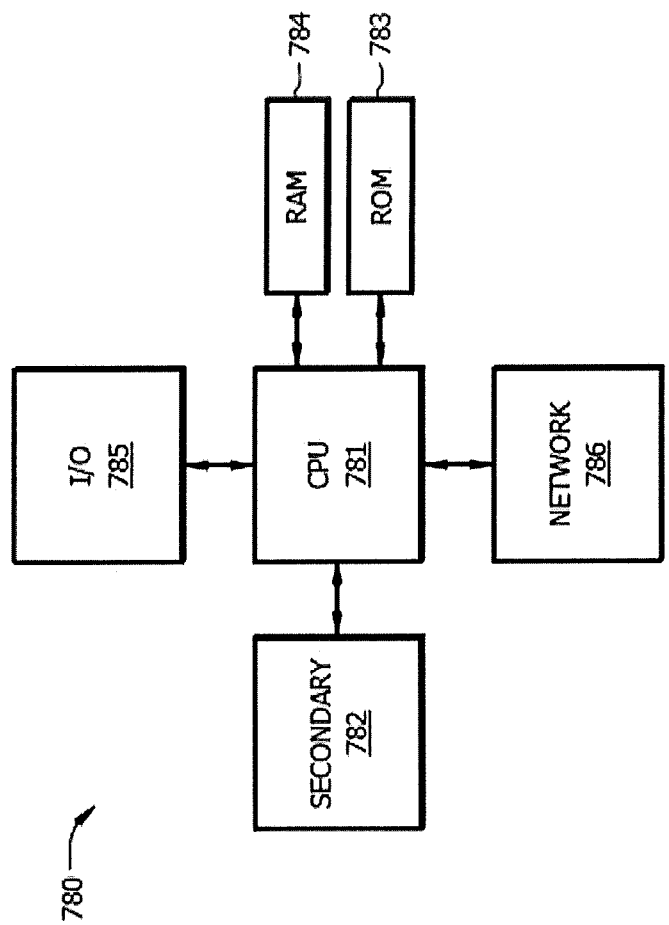

DETECTING EVENTS USING ACOUSTIC FREQUENCY DOMAIN FEATURES

CROSS-REFERENCE TO RELATED APPLICATIONS

This application is a 35 U.S.C. § 371 national stage application of PCT/EP2018/077568 filed Oct. 10, 2018, and entitled "Detecting Events Using Acoustic Frequency Domain Features," which claims benefit of U.S. provisional patent application Ser. No. 62/571,070 filed Oct. 11, 2017, and entitled "Detecting Events Using Acoustic Frequency Domain Features," each of which is hereby incorporated herein by reference in its entirety for all purposes.

STATEMENT REGARDING FEDERALLY SPONSORED RESEARCH OR DEVELOPMENT

Not applicable.

BACKGROUND

Within a hydrocarbon production well, various fluids such as hydrocarbons, water, gas, and the like can be produced from the formation into the wellbore. The production of the fluid can result in the movement of the fluids in various downhole regions, including with the subterranean formation, from the formation into the wellbore, and within the wellbore itself. For example, some subterranean formations can release solids, generally referred to as "sand," that can be produced along with the fluids into the wellbore. These solids can cause a number of problems including erosion, clogging of wells, contamination and damage of the surface equipment, and the like. Sand production tends to be present when the producing formations are formed from weakly consolidated sand stones with low unconfined compressive strength. In such formations, sand control failures can lead to significant sand production, which can result in the need to choke back production from the well to bring sand production down to acceptable levels. This can lead to reduced oil production, and potentially result in a deferral of over 75% of the production from the well.

Efforts have been made to detect the movement of various fluids including those with particles in them within the wellbore. For example, efforts to detect sand have been made using acoustic point sensors placed at the surface of the well and clamped onto the production pipe. Produced sand particles passing through the production pipe, along with the produced fluids (e.g., oil, gas or water), contact the walls of the pipe, especially at the bends and elbows of the production pipe. Such contact creates stress waves that are captured as sound signals by the acoustic sensors mounted on the pipe wall. However, these detection methods only capture the presence of the sand at or near the surface equipment and are qualitative at best (e.g., indicating the presence of sand only).

Detection/monitoring systems are also common in environments other than wellbore environments, for example monitoring integrity, performance and/or security of pipelines, equipment, buildings, vehicles and perimeters.

BRIEF SUMMARY OF THE DISCLOSURE

In a first aspect, a system for processing acoustic data comprises a receiver unit comprising a processor and a memory, where the receiver unit is configured to receive a signal from a sensor disposed along a sensor path or across a sensor area, wherein a processing application is stored in the memory. The processing application, when executed on the processor, configures the processor to: receive the signal from the sensor, where the signal comprises an indication of an acoustic signal received at one or more lengths along the sensor path or across a portion of the sensor area, wherein the signal is indicative of the acoustic signal across a frequency spectrum; determine a plurality of frequency domain features of the signal across the frequency spectrum; and generate an output comprising the plurality of frequency domain features.

In a second aspect, a system for processing acoustic data comprises a receiver unit comprising a processor and a memory, where the receiver unit is configured to receive a signal from a sensor disposed along a sensor path or a sensor area provided that the sensor path or sensor area does not extend through a wellbore. A processing application is stored in the memory, that when executed on the processor, configures the processor to: receive the signal from the sensor, wherein the signal comprises an indication of an acoustic signal received at one or more lengths along the sensor path or across a portion of the sensor area, where the signal is indicative of the acoustic signal across a frequency spectrum; determine a plurality of frequency domain features of the signal across the frequency spectrum; and generate an output comprising the plurality of frequency domain features.

The term wellbore is known in the oil and gas exploration and production industry and refers to a hole drilled through the earth in order to provide a fluid flow path between a subterranean hydrocarbon bearing formation and the earth's surface.

The system of the first or second aspects can also include the sensor, where the sensor comprises a fiber optic cable disposed along the sensor path; and an optical generator coupled to the fiber optic cable. The optical generator is configured to generate a light beam and pass the light beam into the fiber optic cable.

In the system of any one of the preceding aspects, the plurality of frequency domain features of the signal can comprise a spectral centroid, and the spectral centroid is indicative of a center of mass of the frequency spectrum of the acoustic signal.

In the system of any one of the preceding aspects, the plurality of frequency domain features of the signal can comprise a spectral spread, and the spectral spread is indicative of an energy distribution of the acoustic signal around a spectral centroid.

In the system of any one of the preceding aspects, the plurality of frequency domain features of the signal can comprise a spectral roll-off, and the spectral roll-off is indicative of a frequency band comprising a predetermined percentage of a magnitude of signal strengths across the frequency spectrum.

In the system of any one of the preceding aspects, the plurality of frequency domain features of the signal can comprise a spectral skewness, and the spectral skewness is indicative of a symmetry of a distribution of spectral magnitude values around an arithmetic mean of the spectral magnitude values.

In the system of any one of the preceding aspects, the plurality of frequency domain features of the signal can comprise an RMS band energy, and the RMS band energy is a measure of signal energy of the signal in predetermined frequency bands across the frequency spectrum.

In the system of any one of the preceding aspects, the signal energy in each frequency band of the predetermined frequency bands can be a normalized energy based on a total RMS energy across the frequency spectrum.

In the system of any one of the preceding aspects, the plurality of frequency domain features of the signal can comprise a total RMS energy, and the total RMS energy comprises a root mean square of a waveform of the signal calculated in the time domain.

In the system of any one of the preceding aspects, the plurality of frequency domain features of the signal can comprise a spectral flatness, and the spectral flatness is a ratio of a geometric mean to an arithmetic mean of an energy spectrum value of the signal.

In the system of any one of the preceding aspects, the plurality of frequency domain features of the signal can comprise a spectral slope, and the spectral slope comprises a linear approximation of a shape of the spectrum of the signal.

In the system of any one of the preceding aspects, the plurality of frequency domain features of the signal can comprise a spectral kurtosis, and the spectral kurtosis comprises an indication of a flatness of the spectrum around a mean of the spectrum in the signal.

In the system of any one of the preceding aspects, the plurality of frequency domain features of the signal can comprise a spectral flux, and the spectral flux is a measure of a change in spectral magnitude summed across at least a portion of frequencies present in the signal between successive determinations of the frequency domain features.

In the system of any one of the preceding aspects, the plurality of frequency domain features of the signal can comprise a spectral autocorrelation function, and the spectral autocorrelation function is indicative of a lag of the signal that maximizes the correlation between the signal and a shifted signal.

In the system of any one of the preceding aspects, the plurality of frequency domain features of the signal can comprise at least two of: a spectral centroid, a spectral spread, a spectral roll-off, a spectral skewness, an RMS band energy, a total RMS energy, a spectral flatness, a spectral slope, a spectral kurtosis, a spectral flux, or a spectral autocorrelation function.

In the system of any one of the preceding aspects, the signal can comprise a first data size, the output can comprise a second data size, and the first data size can be greater than the second data size.

In a third aspect, a system for detecting an event using acoustic data comprises a processor unit comprising a processor and a memory. The processor unit is adapted for signal communication with a receiver. The memory comprises an analysis application, that when executed on the processor, configures the processor to: receive, from the receiver, a signal comprising a plurality of frequency domain features, where the frequency domain features are indicative of an acoustic signal, and where the frequency domain features are indicative of the acoustic signal across a frequency spectrum; compare the plurality of frequency domain features with one or more event signatures, where the one or more event signatures comprise thresholds or ranges for each of the plurality of frequency domain features; determine that the plurality of frequency domain features match at least one event signature of the one or more event signatures; determine the occurrence of at least one event based on the determination that the plurality of frequency domain features match the at least one event signature; and generate an output of the occurrence of the at least one event based on the determination.

In a fourth aspect, a system for detecting an event using acoustic data comprises a processor unit comprising a processor and a memory, where the processor unit is adapted for signal communication with a receiver. The memory comprises an analysis application, that when executed on the processor, configures the processor to: receive, from the receiver, a signal comprising a plurality of frequency domain features, where the frequency domain features are indicative of an acoustic signal provided that the acoustic signal is not an acoustic signal from within a wellbore, and where the frequency domain features are indicative of the acoustic signal across a frequency spectrum; compare the plurality of frequency domain features with one or more event signatures, where the one or more event signatures comprise thresholds or ranges for each of the plurality of frequency domain features; determine that the plurality of frequency domain features match at least one event signature of the one or more event signatures; determine the occurrence of at least one event based on the determination that the plurality of frequency domain features match the at least one event signature; and generate an output of the occurrence of the at least one event based on the determination.

In the system of any of the above aspects, the event signatures can comprise at least one of a rail car signature, a traffic signature, a security signature, a rotational or vibrational equipment signature, a building signature.

In the system of any of the above aspects, the acoustic signal can be generated by at least one of a mechanical source, a biological source, a fluid turbulence source, a fluid leak source, a weather source, or an object collision.

In a fifth aspect, a method of detecting an event using acoustic data comprises: obtaining a sample data set, where the sample data set is a sample of an acoustic signal originating from an acoustic sensor, and where the sample data set is representative of the acoustic signal across a frequency spectrum, determining a plurality of frequency domain features of the sample data set; comparing the plurality of frequency domain features with an event signature, where the event signature comprises a plurality of thresholds, ranges, or both corresponding to the plurality of frequency domain features; determining that the plurality of frequency domain features matches the thresholds, ranges, or both of the event signature; and determining the presence of the event based on determining that the plurality of frequency domain features match the thresholds, ranges, or both of the event signature.

In a sixth aspect, a method of detecting an event using acoustic data comprises: obtaining a sample data set, where the sample data set is a sample of an acoustic signal originating from an acoustic sensor excluding an acoustic sensor located inside a wellbore, and where the sample data set is representative of the acoustic signal across a frequency spectrum, determining a plurality of frequency domain features of the sample data set; comparing the plurality of frequency domain features with an event signature, wherein the event signature comprises a plurality of thresholds, ranges, or both corresponding to the plurality of frequency domain features; determining that the plurality of frequency domain features matches the thresholds, ranges, or both of the event signature; and determining the presence of the event based on determining that the plurality of frequency domain features match the thresholds, ranges, or both of the event signature.

In at least the fifth and sixth aspects, the event is not an event in a wellbore. In other words, the system and method detect an event excluding (i.e. other than) a wellbore event.

In a seventh aspect, a system for processing acoustic data comprises a receiver unit comprising a processor and a memory, where the receiver unit is configured to receive a signal from a sensor disposed along a sensor path. A processing application is stored in the memory, and the processing application, when executed on the processor, configures the processor to: receive the signal from the sensor, where the signal comprises acoustic signal received at one or more lengths along the sensor path; determine a plurality of frequency domain features of the signal across a frequency spectrum; generate an output comprising the plurality of frequency domain features; compare the plurality of frequency domain features with an event signature; and determine the presence of an event corresponding to the event signature based on determining that the plurality of frequency domain features match the event signature.

In an eighth aspect, a system for processing acoustic data comprises a receiver unit comprising a processor and a memory, where the receiver unit is configured to receive a signal from a sensor disposed along a sensor path or a sensor area, provided that the sensor path or sensor area does not extend through a wellbore. A processing application is stored in the memory, and the processing application, when executed on the processor, configures the processor to: receive the signal from the sensor, where the signal comprises acoustic signal received at one or more lengths along the sensor path or across a portion of the sensor area; determine a plurality of frequency domain features of the signal across a frequency spectrum; generate an output comprising the plurality of frequency domain features; compare the plurality of frequency domain features with an event signature; and determine the presence of an event corresponding to the event signature based on determining that the plurality of frequency domain features match the event signature.

In any one of the aspects above, the sensor can be disposed within or along at least one of a rail line, a road, a pipeline, a fence, industrial equipment.

In a ninth aspect, a method of processing acoustic data comprises a receiver unit comprising a processor and a memory, where the receiver unit is configured to receive a signal from a sensor disposed along a sensor path or a sensor area, provided that the sensor path or sensor area does not extend through a wellbore. A processing application is stored in the memory, and the processing application, when executed on the processor, configures the processor to: receive the signal from the sensor, where the signal comprises an indication of an acoustic signal received at one or more lengths along the sensor path or across a portion of the sensor area, where the signal is indicative of the acoustic signal across a frequency spectrum; determine a plurality of frequency domain features of the signal across the frequency spectrum; and generate an output comprising the plurality of frequency domain features.

In the ninth aspect, it is to be understood that the acoustic data is not wellbore acoustic data. In other words, the acoustic data does not originate from within a wellbore.

These and other features will be more clearly understood from the following detailed description taken in conjunction with the accompanying drawings and claims.

Embodiments described herein comprise a combination of features and advantages intended to address various shortcomings associated with certain prior devices, systems, and methods. The foregoing has outlined rather broadly the features and technical advantages of the invention in order that the detailed description of the invention that follows may be better understood. The various characteristics described above, as well as other features, will be readily apparent to those skilled in the art upon reading the following detailed description, and by referring to the accompanying drawings. It should be appreciated by those skilled in the art that the conception and the specific embodiments disclosed may be readily utilized as a basis for modifying or designing other structures for carrying out the same purposes of the invention. It should also be realized by those skilled in the art that such equivalent constructions do not depart from the spirit and scope of the invention as set forth in the appended claims.

BRIEF DESCRIPTION OF THE DRAWINGS

For a detailed description of the preferred embodiments of the invention, reference will now be made to the accompanying drawings in which:

FIGS. 3A and 3B are a schematic, cross-sectional views of embodiments of a well with a wellbore tubular having an optical fiber associated therewith.

FIG. 10 schematically illustrates a computer that can be used to carry out various steps according to an embodiment.

DETAILED DESCRIPTION OF THE PREFERRED EMBODIMENTS

Figure 1:
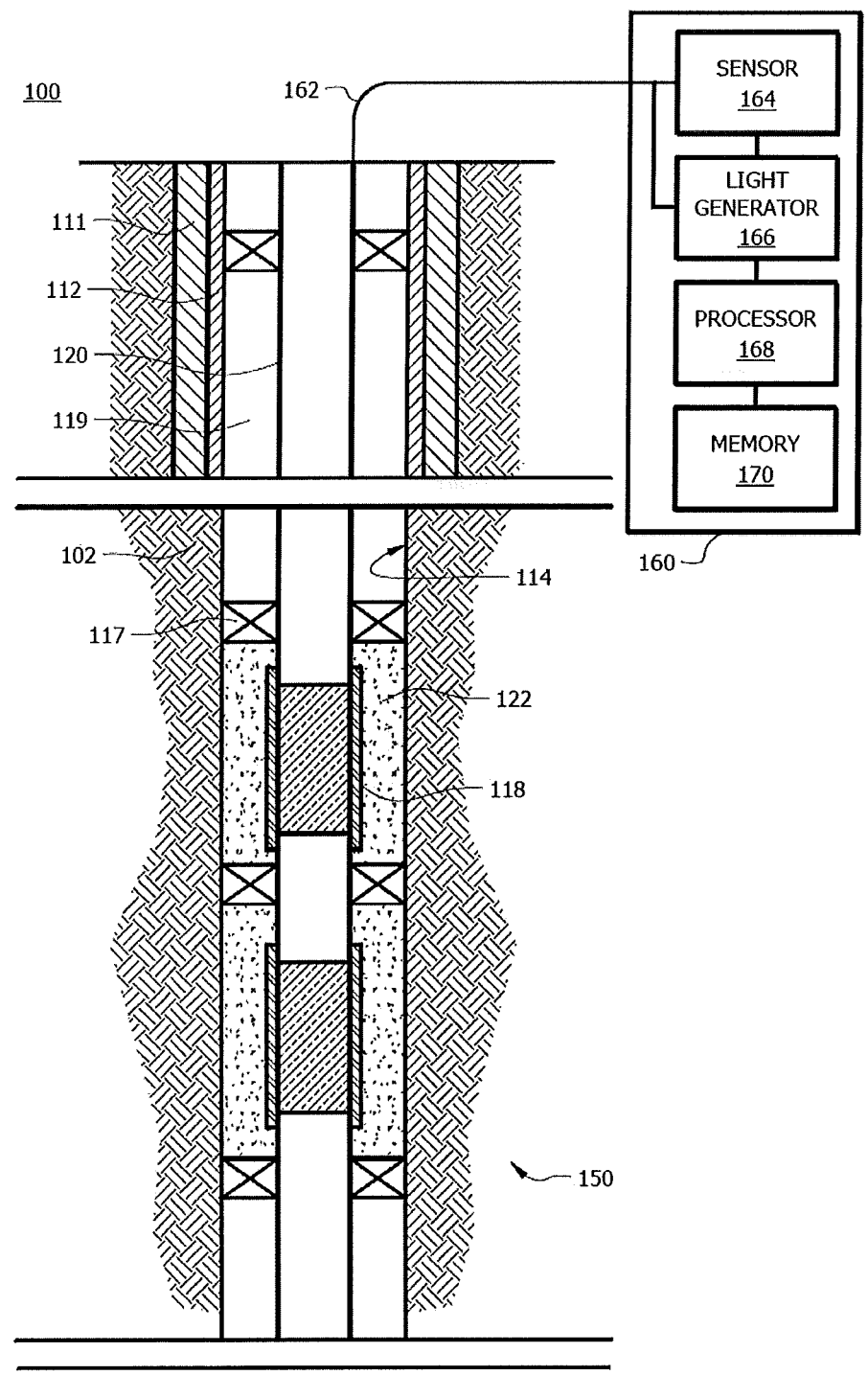
FIG. 1 is a schematic, cross-sectional illustration of a downhole wellbore environment according to an embodiment.

Unless otherwise specified, any use of any form of the terms "connect," "engage," "couple," "attach," or any other term describing an interaction between elements is not meant to limit the interaction to direct interaction between the elements and may also include indirect interaction between the elements described. In the following discussion and in the claims, the terms "including" and "comprising" are used in an open-ended fashion, and thus should be interpreted to mean "including, but not limited to . . . ". Reference to up or down will be made for purposes of description with "up," "upper," "upward," "upstream," or "above" meaning toward the surface of the wellbore and with "down," "lower," "downward," "downstream," or "below" meaning toward the terminal end of the well, regardless of the wellbore orientation. Reference to inner or outer will be made for purposes of description with "in," "inner," or "inward" meaning towards the central longitudinal axis of the wellbore and/or wellbore tubular, and "out," "outer," or "outward" meaning towards the wellbore wall. As used herein, the term "longitudinal" or "longitudinally" refers to an axis substantially aligned with the central axis of the wellbore tubular, and "radial" or "radially" refer to a direction perpendicular to the longitudinal axis. The various characteristics mentioned above, as well as other features and characteristics described in more detail below, will be readily apparent to those skilled in the art with the aid of this disclosure upon reading the following detailed description of the embodiments, and by referring to the accompanying drawings.

The inventors have developed a signal processing architecture for detecting an event in a wellbore, as described for example in their previous application WO 2017EP058292 which is incorporated below. The inventors have determined that the same signal processing described in their earlier application can be used to identify various other events across industries. This invention therefore provides a signal processing solution that can be applied to detect events other than events in a wellbore.

The systems of this invention can comprise similar real time signal processing architecture as that described in the earlier application, which therefore allows for the identification of non-wellbore events that are characterized by acoustic signatures or fingerprints in real time or near real time. Within these systems, various sensors (e.g., distributed fiber optic acoustic sensors, point acoustic sensors, etc.) can be used to obtain an acoustic sampling at various points along a path. The acoustic sample can then be processed using signal processing architecture with spectral feature extraction techniques that enable selectively extracting the acoustic signals of interest from background noise. The signal processing techniques as described herein can also help to address the "big-data problem" through intelligent extraction of data (rather than crude decimation techniques) to considerably reduce real time data volumes at the collection and processing site (e.g., by over 100 times, over 500 times, or over 1000 times, or over 10,000 times reduction).

Once obtained, the spectral features can be compared to a library of acoustic fingerprints or spectral signatures of events of interest in order to be able to segregate a noise resulting from an event of interest from other ambient acoustic background noise. Specific spectral signatures can be determined for each event by considering one or more frequency domain features for known events. From these known events, the spectral features specific to each event can be developed and ranges or thresholds can be established to define each event. Based on the specifics of each spectral characteristic, the resulting spectral signatures can be sufficiently distinguishable between events to allow for a relatively fast identification of such events. The resulting spectral signatures can then be used along with processed acoustic signal data to determine if an event is occurring at a point of interest along the path of the acoustic sensors. Any of the processing techniques disclosed herein can be used to initially determine a spectral signature, and then process and compare the spectral features in a sampled acoustic signal with the resulting spectral signatures.

The acoustic sensors as described herein can be distributed across an area or line. For example, a series of point source sensors (e.g., microphones) can be connected in a line or distributed through an area being monitored. When a optical fiber is used as the distributed acoustic sensor (DAS) system, the fiber can pass along a line or path. For example, the fiber can pass through or along a pipeline, along a rail, a fence, or the like. In some aspects, the fiber is not limited to passing in a straight line and can pass in a non-linear manner throughout an area. For example, a single fiber can pass from one piece of equipment to the next when equipment is being monitored. Thus, as described herein, an acoustic sensor system can be used to obtain an acoustic sample from throughout an area or along a sensor path, which may not be a linear path in all aspects.

When the acoustic sensor or sensors are distributed throughout an area, a given acoustic sample can be obtained from more than one sensor. For example, when the distributed acoustic sensor comprises a plurality of point type acoustic sensors distributed over an area, an acoustic sample can be obtained from one particular point source sensor or across a plurality of the sensors. For example, an acoustic sample can be combined across various sensors, which can include in some aspects accounting for time of flight of sound between the individual sensors. The use of a plurality of sensors may provide an acoustic sample that allows for area effects to be taken into account in the spectral feature extraction process. For example, temporal and spatial effects can be taken into account when multiple acoustic samples for a given event are measured across an area or path.

Thus, acoustic signals in industries such as (but not limited to) the transport industry (e.g. monitoring location, movement, integrity and/or density of vehicles such as rail or road vehicles), security (e.g. perimeter security, pipeline monitoring), facilities monitoring (e.g. monitoring equipment such as electric submersible pumps, wind turbines, compressors), building monitoring (e.g. structural monitoring), and the like can benefit from the use of the systems disclosed herein. For example, a rail line can be monitored to detect acoustic signals along the length of a rail, using for example, a fiber optic connected to the rail (either directly such as by attaching the fiber to the rail itself, or indirectly such as by arranging the fiber below the rail), along with a DAS unit. The length of the fiber along the rail can be considered a path of the fiber as it passes from the receiver/generator (e.g., the DAS unit) along the rail. Various acoustic signatures such as rail movements, maintenance vehicle movement, carriage fault detection, traffic movement, pedestrian traffic, and the like can be detected based on acoustic signals originating along the length of the rail and/or fiber. These signals can be processed to extract one or more spectral features, and spectral signatures of such events can be determined or developed. Once obtained, the spectral signatures can be used to process acoustic signals at various lengths along the path of the fiber and determine the presence of the various events using the spectral features and spectral signatures.

Similarly, security systems can use distributed acoustic sensors (e.g., an optical fiber, individual acoustic sensors, etc.) to detect acoustic signals across a path or an area. Various security related events such as voices, footsteps, breaking glass, etc. can be detected by using the acoustic signals from the acoustic sensors and processing them to extract spectral features and compare those spectral features to spectral signals for various security related events.

Similarly, the acoustic monitoring techniques can be used with point source, which can be individual or connected along a path. For example, a facility having industrial equipment can be monitored using the acoustic monitoring techniques described herein. For example, a facility having any rotating equipment such as pumps, turbines, compressors, or other equipment can have an acoustic sensor monitoring the piece of equipment. Spectral signatures of various events can be determined for each type of equipment and used to monitor and identify the state of the equipment. For example, a pump can be monitored to determine if the pump is active or inactive, if fluid is flowing through the pump, if a bearing is bad, and the like all through the use of an acoustic sample and the spectral characteristic matching as described herein. When multiple pieces of equipment are present, a single acoustic sensor such as a fiber can be coupled to each piece of equipment. This configuration may allow a single interrogation unit to monitor multiple pieces of equipment using the spectral analysis by resolving a length along the fiber for each piece of equipment. Thus, a distributed acoustic monitoring system may not require multiple processors correlating to individual pieces of equipment.

Similarly, pipelines can be monitored in a manner similar to the way the wellbores are monitored as disclosed herein. In this embodiment, the fiber may detect various events such as leaks, flow over a blockage or corrosion, and the like. This may allow for remote monitoring along the length of a pipeline.

Other types of industries can also benefit from the use of acoustic sensors to obtain acoustic samples that can be analyzed and matched to events using spectral feature extraction. Any industry that experiences events that create acoustic signals can be monitored using the systems as described herein. The spectral feature analysis process and system described herein can be used to characterize a number of sounds generated according to different mechanisms. The analysis process and system described herein can be used to detect and identify acoustic signals originating from mechanical sounds (e.g. equipment movements such as vibrations or rotations), biological sounds (e.g., footsteps, voices, vocal sounds, etc.), fluid turbulence (e.g., liquid flow, gaseous flow, mixed phase flow, etc.), fluid leaks (e.g., liquid leaks, gas leaks, etc.), noise from weather (e.g., wind, rain, hail, sleet, thunder, etc.), noise from object collisions (particle on a surface, etc.). In some aspects, these noises can be present at the same time and the signal processing can be used to separate and identify the individual sounds in the environment. Further, some of the sounds identifiable may not originate in a wellbore.

Further, when the signals are distributed across space, a single acoustic sensor such as a fiber optic, can be used with a receiver unit to detect acoustic signals across the length or path of the sensor element, thereby enabling a single sensor to detect acoustic signals across a wide area or path. In these embodiments, the signal may not be obtained from a wellbore. For example, the acoustic signal may be obtained from a non-wellbore source or from outside of a subterranean formation. Thus, the systems and processing techniques described herein can be used to identify events using spectral features obtained from acoustic signals across a variety of industries and locations.

In order to better understand the processes and systems, the previous application WO 2017EP058292 is incorporated below for reference. Thus the system and method of the invention are described below in connection with the wellbore environment to illustrate the operation and features of the system and method, but the teaching is equally applicable to other environments such as those mentioned above or indeed other environments which will be apparent to the reader.

As disclosed in the application, a new real time signal processing architecture allows for the identification of various downhole events including gas influx detection, downhole leak detection, well-barrier integrity monitoring, fluid inflow, and the identification of in-well sand ingress zones in real time or near real time. In some embodiments, the system allows for a quantitative measurement of various fluid flows such as a relative concentration of in-well sand ingress. As used herein, the term "real time" refers to a time that takes into account various communication and latency delays within a system, and can include actions taken within about ten seconds, within about thirty seconds, within about a minute, within about five minutes, or within about ten minutes of the action occurring. Various sensors (e.g., distributed fiber optic acoustic sensors, etc.) can be used to obtain an acoustic sampling at various points along the wellbore. The acoustic sample can then be processed using signal processing architecture with various feature extraction techniques (e.g., spectral feature extraction techniques) to obtain a measure of one or more frequency domain features that enable selectively extracting the acoustic signals of interest from background noise and consequently aiding in improving the accuracy of the identification of the movement of fluids and/or solids (e.g., sand ingress locations, gas influx locations, constricted fluid flow locations, etc.) in real time. As used herein, various frequency domain features can be obtained from the acoustic signal, and in some contexts the frequency domain features can also be referred to as spectral features or spectral descriptors. The signal processing techniques described herein can also help to address the big-data problem through intelligent extraction of data (rather than crude decimation techniques) to considerably reduce real time data volumes at the collection and processing site (e.g., by over 100 times, over 500 times, or over 1000 times, or over 10,000 times reduction).

The acoustic signal can be obtained in a manner that allows for a signal to be obtained along the entire wellbore or a portion of interest. While surface clamp-on acoustic detectors can provide an indication that certain events, such as downhole sanding, are occurring, they do not provide information about the depth in the production zone contributing to events such as sanding. Further, the methodology adopted for processing the clamp-on detector data for identifying the events from other acoustic "background" noise have only yielded qualitative and often inconsistent results. A number of other technical limitations currently hinder direct application of the technology for real time in-well acoustic detection. Fiber optic distributed acoustic sensors (DAS) capture acoustic signals resulting from downhole events such as gas influx, fluid flow past restrictions, sand ingress, and the like as well as other background acoustics as well. This mandates the need for a robust signal processing procedure that distinguishes sand ingress signals from other noise sources to avoid false positives in the results. This in turn results in a need for a clearer understanding of the acoustic fingerprint of in-well event of interest (e.g., sand ingress, etc.) in order to be able to segregate a noise resulting from an event of interest from other ambient acoustic background noise. As used herein, the resulting acoustic fingerprint of a particular event can also be referred to as a spectral signature, as described in more detail herein.

Further, reducing deferrals resulting from one or more events such as sand ingress and facilitating effective remediation relies upon near-real time decision support to inform the operator of the events. There is currently no technology/signal processing for DAS that successfully distinguishes and extracts event locations, let alone in near real time.

In terms of data processing and loads, DAS acquisition units produce large data volumes (typically around 1 TB/hour) creating complexities in data handling, data transfer, data processing and storage. There is currently no method of intelligently extracting useful information to reduce data volumes in real time for immediate decision support. This imposes complexity in real time data transmission to shore and data integration into existing IT platforms due to data bandwidth limitations and the data has to be stored in hard drives that are shipped back to shore for interpretation and analysis. In addition, this increases the interpretation turnaround time (typically a few weeks to months) before any remediation efforts can be taken resulting in deferred production.

The ability to identify various events in the wellbore may allow for various actions to be taken (remediation procedures) in response to the events. For example, a well can be shut in, production can be increased or decreased, and/or remedial measures can be taken in the wellbore, as appropriate based on the identified event(s). An effective response, when needed, benefits not just from a binary yes/no output of an identification of in-well events but also from a measure of relative amount of fluids and/or solids (e.g., concentrations of sand, amount of gas influx, amount of fluid flow past a restriction, etc.) from each of the identified zones so that zones contributing the greatest fluid and/or solid amounts can be acted upon first to improve or optimize production. For example, when a leak is detected past a restriction, a relative flow rate of the leak may allow for an identification of the timing in working to plug the leak (e.g., small leaks may not need to be fixed, larger leaks may need to be fixed with a high priority, etc.).

As described herein, spectral descriptors can be used with DAS acoustic data processing in real time to provide various downhole surveillance applications. More specifically, the data processing techniques can be applied for various for downhole fluid profiling such as fluid inflow/outflow detection, fluid phase segregation, well integrity monitoring, in well leak detection (e.g., downhole casing and tubing leak detection, leaking fluid phase identification, 4etc.), annular fluid flow diagnosis; overburden monitoring, fluid flow detection behind a casing, fluid induced hydraulic fracture detection in the overburden, and the like. Application of the signal processing technique with DAS for downhole surveillance provides a number of benefits including improving reservoir recovery by monitoring efficient drainage of reserves through downhole fluid surveillance (well integrity and production inflow monitoring), improving well operating envelopes through identification of drawdown levels (e.g., gas, sand, water, etc.), facilitating targeted remedial action for efficient sand management and well integrity, reducing operational risk through the clear identification of anomalies and/or failures in well barrier elements.

In some embodiments, use of the systems and methods described herein may provide knowledge of the zones contributing to sanding and their relative concentrations, thereby potentially allowing for improved remediation actions based on the processing results. The methods and systems disclosed herein can also provide information on the variability of the amount of sand being produced by the different sand influx zones as a function of different production rates, different production chokes, and downhole pressure conditions, thereby enabling choke control (e.g., automated choke control) for controlling sand production. Embodiments of the systems and methods disclosed herein also allow for a computation of the relative concentrations of sand ingress into the wellbore, thereby offering the potential for more targeted and effective remediation.

As disclosed herein, embodiments of the data processing techniques use a sequence of real time digital signal processing steps to isolate and extract the acoustic signal resulting from sand ingress from background noise, and allow real time detection of downhole sand ingress zones using distributed fiber optic acoustic sensor data as the input data feed.

Referring now to FIG. 1, an example of a wellbore operating environment 100 is shown. As will be described in more detail below, embodiments of completion assemblies comprising distributed acoustic sensor (DAS) system in accordance with the principles described herein can be positioned in environment 100.

As shown in FIG. 1, exemplary environment 100 includes a wellbore 114 traversing a subterranean formation 102, casing 112 lining at least a portion of wellbore 114, and a tubular 120 extending through wellbore 114 and casing 112. A plurality of spaced screen elements or assemblies 118 are provided along tubular 120. In addition, a plurality of spaced zonal isolation device 117 and gravel packs 122 are provided between tubular 120 and the sidewall of wellbore 114. In some embodiments, the operating environment 100 includes a workover and/or drilling rig positioned at the surface and extending over the wellbore 114.

In general, the wellbore 114 can be drilled into the subterranean formation 102 using any suitable drilling technique. The wellbore 114 can extend substantially vertically from the earth's surface over a vertical wellbore portion, deviate from vertical relative to the earth's surface over a deviated wellbore portion, and/or transition to a horizontal wellbore portion. In general, all or portions of a wellbore may be vertical, deviated at any suitable angle, horizontal, and/or curved. In addition, the wellbore 114 can be a new wellbore, an existing wellbore, a straight wellbore, an extended reach wellbore, a sidetracked wellbore, a multi-lateral wellbore, and other types of wellbores for drilling and completing one or more production zones. As illustrated, the wellbore 114 includes a substantially vertical producing section 150, which is an open hole completion (i.e., casing 112 does not extend through producing section 150). Although section 150 is illustrated as a vertical and open hole portion of wellbore 114 in FIG. 1, embodiments disclosed herein can be employed in sections of wellbores having any orientation, and in open or cased sections of wellbores. The casing 112 extends into the wellbore 114 from the surface and is cemented within the wellbore 114 with cement 111.

Tubular 120 can be lowered into wellbore 114 for performing an operation such as drilling, completion, workover, treatment, and/or production processes. In the embodiment shown in FIG. 1, the tubular 120 is a completion assembly string including a distributed acoustic sensor (DAS) sensor coupled thereto. However, in general, embodiments of the tubular 120 can function as a different type of structure in a wellbore including, without limitation, as a drill string, casing, liner, jointed tubing, and/or coiled tubing. Further, the tubular 120 may operate in any portion of the wellbore 114 (e.g., vertical, deviated, horizontal, and/or curved section of wellbore 114). Embodiments of DAS systems described herein can be coupled to the exterior of the tubular 120, or in some embodiments, disposed within an interior of the tubular 120, as shown in FIGS. 3A and 3B. When the DAS is coupled to the exterior of the tubular 120, the DAS can be positioned within a control line, control channel, or recess in the tubular 120. In some embodiments, a sand control system can include an outer shroud to contain the tubular 120 and protect the system during installation. A control line or channel can be formed in the shroud and the DAS system can be placed in the control line or channel.

The tubular 120 extends from the surface to the producing zones and generally provides a conduit for fluids to travel from the formation 102 to the surface. A completion assembly including the tubular 120 can include a variety of other equipment or downhole tools to facilitate the production of the formation fluids from the production zones. For example, zonal isolation devices 117 are used to isolate the various zones within the wellbore 114. In this embodiment, each zonal isolation device 117 can be a packer (e.g., production packer, gravel pack packer, frac-pac packer, etc.). The zonal isolation devices 117 can be positioned between the screen assemblies 118, for example, to isolate different gravel pack zones or intervals along the wellbore 114 from each other. In general, the space between each pair of adjacent zonal isolation devices 117 defines a production interval.

The screen assemblies 118 provide sand control capability. In particular, the sand control screen elements 118, or other filter media associated with wellbore tubular 120, can be designed to allow fluids to flow therethrough but restrict and/or prevent particulate matter of sufficient size from flowing therethrough. The screen assemblies 118 can be of the type known as "wire-wrapped", which are made up of a wire closely wrapped helically about a wellbore tubular, with a spacing between the wire wraps being chosen to allow fluid flow through the filter media while keeping particulates that are greater than a selected size from passing between the wire wraps. Other types of filter media can also be provided along the tubular 120 and can include any type of structures commonly used in gravel pack well completions, which permit the flow of fluids through the filter or screen while restricting and/or blocking the flow of particulates (e.g. other commercially-available screens, slotted or perforated liners or pipes; sintered-metal screens; sintered-sized, mesh screens; screened pipes; prepacked screens and/or liners; or combinations thereof). A protective outer shroud having a plurality of perforations therethrough may be positioned around the exterior of any such filter medium.

The gravel packs 122 are formed in the annulus 119 between the screen elements 118 (or tubular 120) and the sidewall of the wellbore 114 in an open hole completion. In general, the gravel packs 122 comprise relatively coarse granular material placed in the annulus to form a rough screen against the ingress of sand into the wellbore while also supporting the wellbore wall. The gravel pack 122 is optional and may not be present in all completions.

The fluid flowing into the tubular 120 may comprise more than one fluid component. Typical components include natural gas, oil, water, steam, and/or carbon dioxide. The relative proportions of these components can vary over time based on conditions within the formation 102 and the wellbore 114. Likewise, the composition of the fluid flowing into the tubular 120 sections throughout the length of the entire production string can vary significantly from section to section at any given time.

As fluid is produced into the wellbore 114 and into the completion assembly string, various solid particles present in the formation can be produced along with a fluid (e.g., oil, water, natural gas, etc.). Such solid particles are referred to herein as "sand," and can include any solids originating within the subterranean formation regardless of size or composition. As the sand enters the wellbore 114, it may create acoustic sounds that can be detected using an acoustic sensor such as a DAS system. Similarly, the flow of the various fluids into the wellbore 114 and/or through the wellbore 114 can create acoustic sounds that can be detected using the acoustic sensor such as the DAS system. Each type of event such as the different fluid flows and fluid flow locations can produce an acoustic signature with unique frequency domain features.

In FIG. 1, the DAS comprises an optical fiber 162 based acoustic sensing system that uses the optical backscatter component of light injected into the optical fiber for detecting acoustic perturbations (e.g., dynamic strain) along the length of the fiber 162. The light can be generated by a light generator or source 166 such as a laser, which can generate light pulses. The optical fiber 162 acts as the sensor element with no additional transducers in the optical path, and measurements can be taken along the length of the entire optical fiber 162. The measurements can then be detected by an optical receiver such as sensor 164 and selectively filtered to obtain measurements from a given depth point or range, thereby providing for a distributed measurement that has selective data for a plurality of zones along the optical fiber 162 at any given time. In this manner, the optical fiber 162 effectively functions as a distributed array of microphones spread over the entire length of the optical fiber 162, which typically spans at least the production zone 150 of the wellbore 114, to detect downhole acoustics.

The light reflected back up the optical fiber 162 as a result of the backscatter can travel back to the source, where the signal can be collected by a sensor 164 and processed (e.g., using a processor 168). In general, the time the light takes to return to the collection point is proportional to the distance traveled along the optical fiber 162. The resulting backscattered light arising along the length of the optical fiber 162 can be used to characterize the environment around the optical fiber 162. The use of a controlled light source 166 (e.g., having a controlled spectral width and frequency) may allow the backscatter to be collected and any disturbances along the length of the optical fiber 162 to be analyzed. In general, any acoustic or dynamic strain disturbances along the length of the optical fiber 162 can result in a change in the properties of the backscattered light, allowing for a distributed measurement of both the acoustic magnitude, frequency and in some cases of the relative phase of the disturbance.

An acquisition device 160 can be coupled to one end of the optical fiber 162. As discussed herein, the light source 166 can generate the light (e.g., one or more light pulses), and the sensor 164 can collect and analyze the backscattered light returning up the optical fiber 162. In some contexts, the acquisition device 160 including the light source 166 and the sensor 164 can be referred to as an interrogator. In addition to the light source 166 and the sensor 164, the acquisition device 160 generally comprises a processor 168 in signal communication with the sensor 164 to perform various analysis steps described in more detail herein. While shown as being within the acquisition device 160, the processor can also be located outside of the acquisition device 160 including being located remotely from the acquisition device 160. The sensor 164 can be used to obtain data at various rates and may obtain data at a sufficient rate to detect the acoustic signals of interest with sufficient bandwidth. In an embodiment, depth resolution ranges of between about 1 meter and about 10 meters can be achieved. While the system 100 described herein can be used with a DAS system to acquire an acoustic signal for a location or depth range in the wellbore 114, in general, any suitable acoustic signal acquisition system can be used with the processing steps disclosed herein. For example, various microphones or other sensors can be used to provide an acoustic signal at a given location based on the acoustic signal processing described herein. The benefit of the use of the DAS system is that an acoustic signal can be obtained across a plurality of locations and/or across a continuous length of the wellbore 114 rather than at discrete locations.

Specific spectral signatures can be determined for each event by considering one or more frequency domain features. The resulting spectral signatures can then be used along with processed acoustic signal data to determine if an event is occurring at a depth range of interest. The spectral signatures can be determined by considering the different types of movement and flow occurring within a wellbore and characterizing the frequency domain features for each type of movement.

Figure 2:
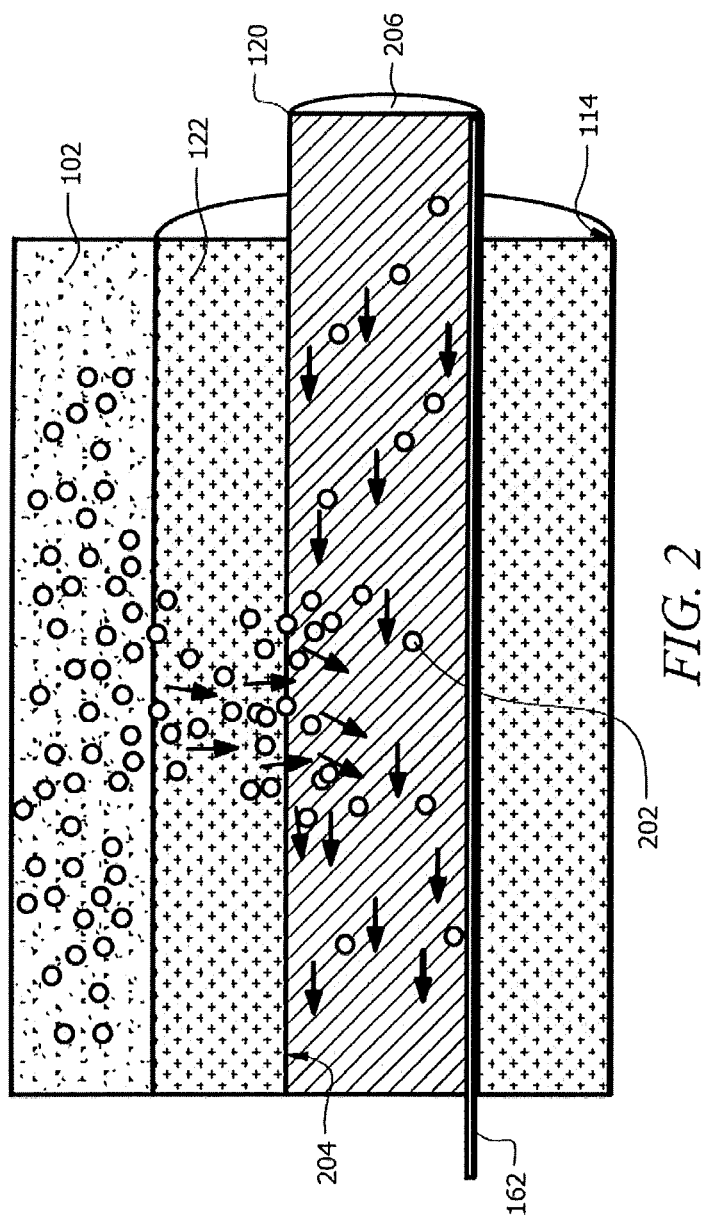
FIG. 2 is a schematic view of an embodiment of a wellbore tubular with sand ingress according to an embodiment.

Sand ingress can be considered first. As schematically illustrated in FIG. 2 and shown in the cross-sectional illustrations in FIGS. 3A and 3B, sand 202 can flow from the formation 102 into the wellbore 114 and then into the tubular 120. As the sand 202 flows into the tubular 120, it can collide against the inner surface 204 of the tubular 120, and with the fiber itself in cases where the fiber is displaced within the tubular, in a random fashion. Without being limited by this or any particular theory, the intensity of the collisions depends on the effective mass and the rate of change in the velocity of the impinging sand particles. This can depend on a number of factors including, without limitation, the direction of travel of the sand 202 in the wellbore 114 and/or tubular 120. The resulting random impacts can produce a random, broadband acoustic signal that can be captured on the optical fiber 162 coupled (e.g., strapped) to the tubular 120. The random excitation response tends to have a broadband acoustic signal with excitation frequencies extending up to the high frequency bands, for example, up to and beyond about 5 kHz depending on the size of the sand particles. In general, larger particle sizes may produce higher frequencies. The intensity of the acoustic signal may be proportional to the concentration of sand 202 generating the excitations such that an increased broad band power intensity can be expected at increasing sand 202 concentrations. In some embodiments, the resulting broadband acoustic signals that can be identified can include frequencies in the range of about 5 Hz to about 10 kHz, frequencies in the range of about 5 Hz to about 5 kHz or about 50 Hz to about 5 kHz, or frequencies in the range of about 500 Hz to about 5 kHz. Any frequency ranges between the lower frequencies values (e.g., 5 Hz, 50 Hz, 500 Hz, etc.) and the upper frequency values (e.g., 10 kHz, 7 kHz, 5 kHz, etc.) can be used to define the frequency range for a broadband acoustic signal.

The sand 202 entering the wellbore 114 can be carried within a carrier fluid 206, and the carrier fluid 206 can also generate high intensity acoustic background noise when entering the wellbore 114 due to the turbulence associated with the fluid flowing into the tubular 120. This background noise generated by the turbulent fluid flow is generally expected to be predominantly in a lower frequency region. For example, the fluid inflow acoustic signals can be between about 0 Hz and about 500 Hz, or alternatively between about 0 Hz and about 200 Hz. An increased power intensity can be expected at low frequencies resulting from increased turbulence in the carrier fluid flow. The background noises can be detected as superimposed signals on the broadband acoustic signals produced by the sand 202 when the sand ingress occurs.

A number of acoustic signal sources can also be considered along with the types of acoustic signals these sources generate. In general, a variety of signal sources can be considered including fluid flow with or without sand through the formation 102, fluid flow with or without sand 202 through a gravel pack 122, fluid flow with or without sand within or through the tubular 120 and/or sand screen 118, fluid flow with sand 202 within or through the tubular 120 and/or sand screen 118, fluid flow without sand 202 into the tubular 120 and/or sand screen 118, gas/liquid inflow, hydraulic fracturing, fluid leaks past restrictions (e.g., gas leaks, liquid leaks, etc.) mechanical instrumentation and geophysical acoustic noises and potential point reflection noise within the fiber caused by cracks in the fiber optic cable/conduit under investigation.

For the flow of fluid 206, with the potential for sand 202 to be carried with the flowing fluid 206, in the formation 102, the likelihood that any resulting acoustic signal would be captured by the optical fiber 162 is considered low. Further, the resulting acoustic signal would likely be dominated by low frequencies resulting from turbulent fluid flow. Similarly, the fluid flowing within the gravel pack 122 would likely flow with a low flow speed and therefore limit the generation and intensity of any acoustic signals created by the sand 202. Thus, the acoustic response would be expected to occur in the lower frequency range.

For the flow of fluid 206 with or without sand 202 through a gravel pack 122, the likelihood that any resulting acoustic signal would be captured by the acoustic sensor is also considered low. Further, the resulting acoustic signal would likely be dominated by low frequencies resulting from turbulent fluid flow.

For the flow of fluid 206 with or without sand 202 within or through the tubular 120, the likelihood of capturing an acoustic signal is considered high due to the proximity of the source of the acoustic signals to the optical fiber 162 coupled to the tubular 120. This type of flow can occur as the fluid 206 containing sand 202 flows within the tubular 120. Such flow would result in any sand flowing generally parallel to the inner surface 204 of the tubular 120, which would limit the generation of high frequency sounds as well as the intensity of any high frequency sounds that are generated. It is expected that the acoustic signals generated from the flow of the fluid 206 through the tubular 120 and/or sand screen 118 may be dominated by low frequency acoustic signals resulting from turbulent fluid flow.

Figure 4:
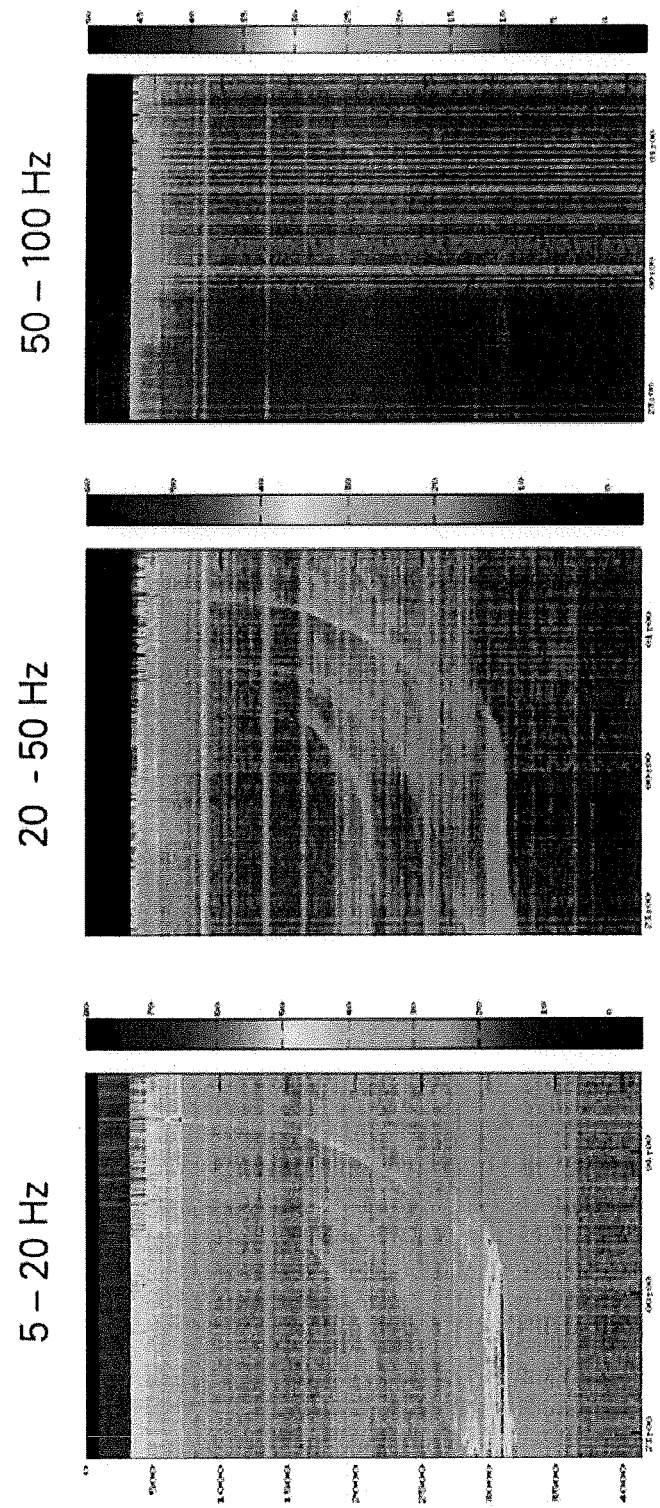
FIG. 4 is an exemplary frequency filtered acoustic intensity graph versus time over three frequency bands.

In an embodiment, the acoustic signal due to fluid 206 containing sand 202 within the tubular can be expected to have a rise in acoustic intensity from about 0 Hz to about 50 Hz, with a roll-off in power between about 20 Hz to about 50 Hz. An example of a signal of a fluid 206 containing sand 202 is shown in FIG. 4, which illustrates frequency filtered acoustic intensity in depth versus time graphs for three frequency bins. As illustrated, three frequency bins represent 5 Hz to 20 Hz, 20 Hz to 50 Hz, and 50 Hz to 100 Hz. The acoustic intensity can be seen in the first bin and second bin, with a nearly undetectable acoustic intensity in the frequency range between 50 Hz and 100 Hz. This demonstrates the acoustic rolloff for the flow of fluid containing sand within a wellbore tubular.

Returning to FIGS. 2-3, for the flow of fluid 206 without any sand 202 into the tubular 120 and/or sand screen 118, the proximity to the optical fiber 162 can result in a high likelihood that any acoustic signals generated would be detected by the acoustic sensor. As discussed herein, the flow of fluid 206 alone without any sand 202 is expected to produce an acoustic signal dominated by low frequency signals due to the acoustic signals being produced by turbulent fluid flow.

For the flow of fluid 206 with sand 202 into the tubular 120 and/or sand screen 118, the proximity to the optical fiber 162 can result in a high likelihood that any acoustic signals generated would be detected by the optical fiber 162. As further discussed herein, the flow of fluid 206 with the sand 202 would likely result in an acoustic signal having broadband characteristics with excitation frequencies extending up to the high frequency bands, for example, up to and beyond about 5 kHz.

Figure 5:
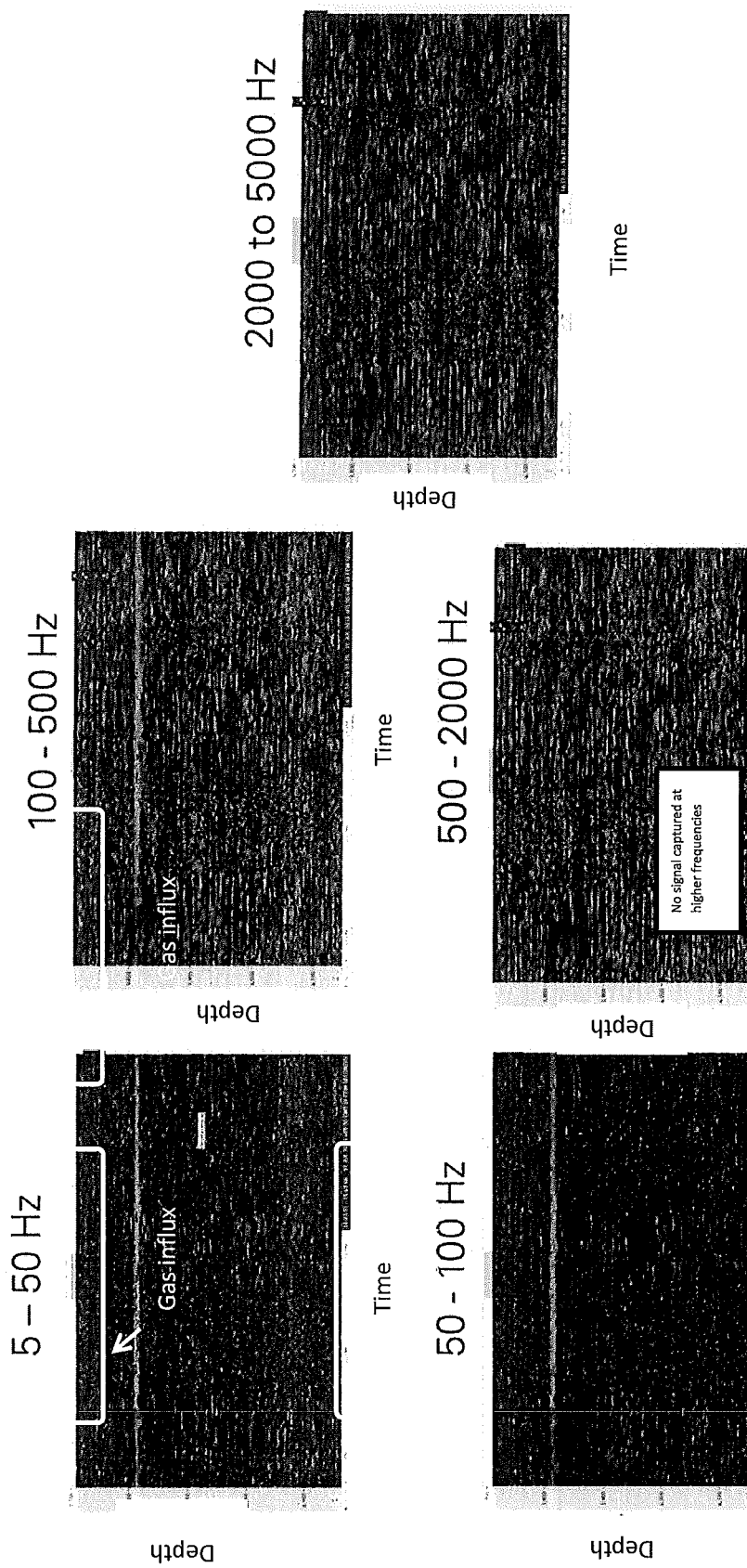
FIG. 5 is another exemplary frequency filtered acoustic intensity graph versus time over five frequency bands.

For the flow of gas into the wellbore, the proximity to the optical fiber 162 can result in a high likelihood that any acoustic signals generated would be detected by the optical fiber 162. The flow of a gas into the wellbore would likely result in a turbulent flow over a broad frequency range. For example, the gas inflow acoustic signals can be between about 0 Hz and about 1000 Hz, or alternatively between about 0 Hz and about 500 Hz. An increased power intensity may occur between about 300 Hz and about 500 Hz from increased turbulence in the gas flow. An example of the acoustic signal resulting from the influx of gas into the wellbore is shown in FIG. 5, which illustrates frequency filtered acoustic intensity in depth versus time graphs for five frequency bins. As illustrated, the five frequency bins represent 5 Hz to 50 Hz, 50 Hz to 100 Hz, 100 Hz to 500 Hz, 500 Hz to 2000 Hz, and 2000 Hz to 5000 Hz. The acoustic intensity can be seen in the first three bins with frequency ranges up to about 500 Hz, with a nearly undetectable acoustic intensity in the frequency range above 500 Hz. This demonstrates that at least a portion of the frequency domain features may not be present above 500 Hz, which can help to define the signature of the influx of gas.

For hydraulic fracturing, the self-induced fracturing of the subterranean formation due to various formation conditions can create an acoustic signal. The intensity of such signal may be detected by the optical fiber 162 depending on the distance between the fracture and the optical fiber 162. The resulting fracture can be expected to produce a wide band response having the acoustic energy present in a frequency band between about 0 Hz to about 400 Hz. Some amount of spectral energy can be expected up to about 1000 Hz. Further, the discrete nature of fracturing events may be seen as a nearly instantaneous broadband high energy event followed by a low-energy, lower frequency fluid flow acoustic signal resulting from fluid flow in response to the fracture.

For the flow of a fluid behind a casing in the wellbore, the proximity of the fluid flow to the optical fiber 162 can result in the acoustic signal being detected. The flow behind the casing can generally be characterized by a flow of fluid through one or more restrictions based on a generally narrow or small leak path being present. The flow through such a restriction may be characterized by an increase in spectral power in a frequency range between about 0 Hz to about 300 Hz with a main energy contribution in the range of about 0 Hz to about 100 Hz, or between about 0 Hz and about 70 Hz.

For acoustic signals generated by mechanical instrumentation and geophysical acoustic noises, the sounds can be detected by the optical fiber 162 in some instances depending on the distance between the sound generation and the portion of the optical fiber 162 being used to detect the sounds. Various mechanical noises would be expected to have low frequency sounds. For example, various motors can operate in the 50 Hz to 60 Hz range, and it is expected that the resulting acoustic signal would have a spectral energy in a narrow band. Various geophysical sounds may have even lower frequencies. As a result, it is expected that the sounds from the mechanical instrumentation and geophysical sources can be filtered out based on a low-pass frequency filter.

For point reflection type noises, these are usually broadband in nature but can occur at spatially confined depths and usually do not span the expected spatial resolution of the interrogator. These may be removed as part of the preprocessing steps by spatial averaging or median filtering the data through the entire depth of the fiber.

Based on the expected sound characteristics from the potential acoustic signal sources, the acoustic signature of each event can be defined relative to background noise contributions. For sand ingress, the acoustic signature can be seen as the presence of a distinct broadband response along with the presence of high frequency components in the resulting response. The uniqueness in the signature of sand enables application of selective signal isolation routines to extract the relevant information pertaining to sand ingress acoustics as described in the following description. Further, the characteristics of the portion of the acoustic signal resulting from the ingress of sand can allow for the location and potentially the nature and amount of sand in the fluid to be determined. The acoustic signatures of the other events can also be determined and used with the processing to enable identification of each event, even when the events occur at the same time in the same depth range.

Referring again to FIG. 1, the processor 168 within the acquisition device 160 can be configured to perform various data processing to detect the presence of one or more events along the length of the wellbore 114. The acquisition device 160 can comprise a memory 170 configured to store an application or program to perform the data analysis. While shown as being contained within the acquisition device 160, the memory 170 can comprise one or more memories, any of which can be external to the acquisition device 160. In an embodiment, the processor 168 can execute the program, which can configure the processor 168 to filter the acoustic data set spatially, determine one or more frequency domain features of the acoustic signal, compare the resulting frequency domain feature values to the acoustic signatures, and determine whether or not an event is occurring at the selected location based on the analysis and comparison. The analysis can be repeated across various locations along the length of the wellbore 114 to determine the occurrence of one or more events and/or event locations along the length of the wellbore 114.

When the acoustic sensor comprises a DAS system, the optical fiber 162 can return raw optical data in real time or near real time to the acquisition unit 160. The intensity of the raw optical data is proportional to the acoustic intensity of the sound being measured. In an embodiment, the raw data can be stored in the memory 170 for various subsequent uses. The sensor 164 can be configured to convert the raw optical data into an acoustic data set. Depending on the type of DAS system employed, the optical data may or may not be phase coherent and may be pre-processed to improve the signal quality (e.g., for opto-electronic noise normalization/de-trending single point-reflection noise removal through the use of median filtering techniques or even through the use of spatial moving average computations with averaging windows set to the spatial resolution of the acquisition unit, etc.).

In some cases, instead of producing a signal comprising raw optical data, it is also possible for the DAS system to determine the derivative of the raw optical data to produce a derivative signal.

Figure 6:
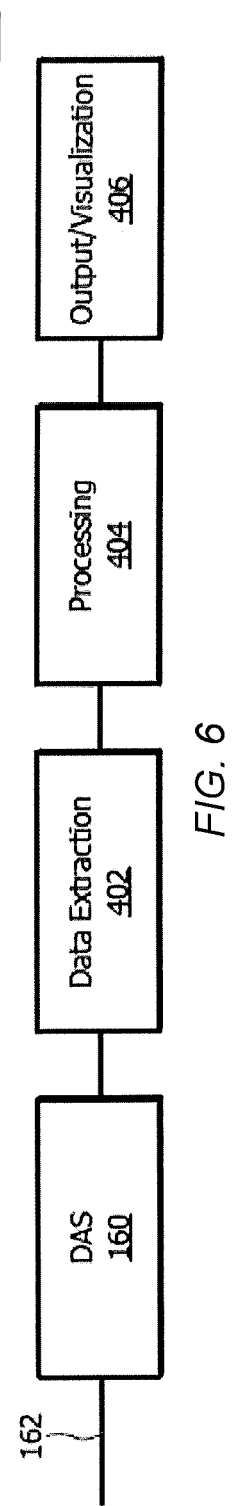
FIG. 6 illustrates an embodiment of a schematic processing flow for an acoustic signal.

As shown schematically in FIG. 6, an embodiment of a system for detecting sand inflow can comprise a data extraction unit 402, a processing unit 404, and/or an output or visualization unit 406. The data extraction unit 402 can obtain the optical data and perform the initial pre-processing steps to obtain the initial acoustic information from the signal returned from the wellbore. Various analysis can be performed including frequency band extraction, frequency analysis and/or transformation, intensity and/or energy calculations, and/or determination of one or more properties of the acoustic data. Following the data extraction unit 402, the resulting signals can be sent to a processing unit 404. Within the processing unit, the acoustic data can be analyzed, for example, by being compared to one or more acoustic signatures to determine if an event of interest is present. In some embodiments, the acoustic signatures can define thresholds or ranges of frequencies and/or frequency domain features. The analysis can then include comparing one or more thresholds or references to determine if a specific signal is present. The processing unit 404 can use the determination to determine the presence of one or more events (e.g., sand inflow, gas influx, fluid leaks, etc.) at one or more locations based on the presence of an acoustic signal matching one or more acoustic signatures, and in some embodiments, the presence of the acoustic signal matching the one or more acoustic signatures. The resulting analysis information can then be sent from the processing unit 404 to the output/visualization unit 406 where various information such as a visualization of the location of the one or more events and/or information providing quantification information (e.g., an amount of sand inflow, a type of fluid influx, an amount of fluid leaking, and the like) can be visualized in a number of ways. In an embodiment, the resulting event information can be visualized on a well schematic, on a time log, or any other number of displays to aid in understanding where the event is occurring, and in some embodiments, to display a relative amount of the flow of a fluid and/or sand occurring at one or more locations along the length of the wellbore. While illustrated in FIG. 6 as separate units, any two or more of the units shown in FIG. 6 can be incorporated into a single unit. For example, a single unit can be present at the wellsite to provide analysis, output, and optionally, visualization of the resulting information.

A number of specific processing steps can be performed to determine the presence of an event. In an embodiment, the noise detrended "acoustic variant" data can be subjected to an optional spatial filtering step following the pre-processing steps, if present. This is an optional step and helps focus primarily on an interval of interest in the wellbore. For example, the spatial filtering step can be used to focus on a producing interval where there is maximum likelihood of sand ingress when a sand ingress event is being examined. In an embodiment, the spatial filtering can narrow the focus of the analysis to a reservoir section and also allow a reduction in data typically of the order of ten times, thereby simplifying the data analysis operations. The resulting data set produced through the conversion of the raw optical data can be referred to as the acoustic sample data.

This type of filtering can provide several advantages in addition to the data set size reduction. Whether or not the acoustic data set is spatially filtered, the resulting data, for example the acoustic sample data, used for the next step of the analysis can be indicative of an acoustic sample over a defined depth (e.g., the entire length of the optical fiber, some portion thereof, or a point source in the wellbore 114). In some embodiments, the acoustic data set can comprise a plurality of acoustic samples resulting from the spatial filter to provide data over a number of depth ranges. In some embodiments, the acoustic sample may contain acoustic data over a depth range sufficient to capture multiple points of interest. In some embodiments, the acoustic sample data contains information over the entire frequency range at the depth represented by the sample. This is to say that the various filtering steps, including the spatial filtering, do not remove the frequency information from the acoustic sample data.

The processor 168 can be further configured to perform Discrete Fourier transformations (DFT) or a short time Fourier transform (STFT) of the acoustic variant time domain data measured at each depth section along the fiber or a section thereof to spectrally check the conformance of the acoustic sample data to one or more acoustic signatures. The spectral conformance check can be used to determine if the expected signature of an event is present in the acoustic sample data. Spectral feature extraction through time and space can be used to determine the spectral conformance and determine if an acoustic signature (e.g., a sand ingress fingerprint, gas influx, hydraulic fracturing signature, etc.) is present in the acoustic sample. Within this process, various frequency domain features can be calculated for the acoustic sample data.

The use of the frequency domain features to identify one or more events has a number of features. First, the use of the frequency domain features results in significant data reduction relative to the raw DAS data stream. Thus, a number of frequency domain features can be calculated to allow for event identification while the remaining data can be discarded or otherwise stored, while the remaining analysis can performed using the frequency domain features. Even when the raw DAS data is stored, the remaining processing power is significantly reduced through the use of the frequency domain features rather than the raw acoustic data itself. Further, the use of the frequency domain features provides a concise, quantitative measure of the spectral character or acoustic signature of specific sounds pertinent to downhole fluid surveillance and other applications that may directly be used for real-time, application-specific signal processing.

While a number of frequency domain features can be determined for the acoustic sample data, not every frequency domain feature may be used in the characterization of each acoustic signature. The frequency domain features represent specific properties or characteristics of the acoustic signals. There are a number of factors that can affect the frequency domain feature selection for each event. For example, a chosen descriptor should remain relatively unaffected by the interfering influences from the environment such as interfering noise from the electronics/optics, concurrent acoustic sounds, distortions in the transmission channel, and the like. In general, electronic/instrumentation noise is present in the acoustic signals captured on the DAS or any other electronic gauge, and it is usually an unwanted component that interferes with the signal. Thermal noise is introduced during capturing and processing of signals by analogue devices that form a part of the instrumentation (e.g., electronic amplifiers and other analog circuitry). This is primarily due to thermal motion of charge carriers. In digital systems additional noise may be introduced through sampling and quantization. The frequency domain features should avoid any interference from these sources.

As a further consideration in selecting the frequency domain feature(s) for an event, the dimensionality of the frequency domain feature should be compact. A compact representation is desired to decrease the computational complexity of subsequent calculations. The frequency domain feature should also have discriminant power. For example, for different types of audio signals, the selected set of descriptors should provide altogether different values. A measure for the discriminant power of a feature is the variance of the resulting feature vectors for a set of relevant input signals. Given different classes of similar signals, a discriminatory descriptor should have low variance inside each class and high variance over different classes. The frequency domain feature should also be able to completely cover the range of values of the property it describes. As an example, the chosen set of frequency domain features should be able to completely and uniquely identify the signatures of each of the acoustic signals pertaining to a selected downhole surveillance application or event as described herein. Such frequency domain features can include, but are not limited to, the spectral centroid, the spectral spread, the spectral roll-off, the spectral skewness, the root mean square (RMS) band energy (or the normalized subband energies/band energy ratios), a loudness or total RMS energy, a spectral flux, and a spectral autocorrelation function.

The spectral centroid denotes the "brightness" of the sound captured by the optical fiber 162 and indicates the center of gravity of the frequency spectrum in the acoustic sample. The spectral centroid can be calculated as the weighted mean of the frequencies present in the signal, where the magnitudes of the frequencies present can be used as their weights in some embodiments. The value of the spectral centroid, $C_i$, of the $i^{th}$ frame of the acoustic signal captured at a spatial location on the fibre, may be written as:

$$C_i = \frac{\sum_{k=1}^{N} f(k) X_i(k)}{\sum_{k=1}^{N} X_i(k)} \quad \text{(Eq. 1)}$$

Where $X_i(k)$, is the magnitude of the short time Fourier transform of the $i^{th}$ frame where 'k' denotes the frequency coefficient or bin index, N denotes the total number of bins and f(k) denotes the centre frequency of the bin. The computed spectral centroid may be scaled to value between 0 and 1. Higher spectral centroids typically indicate the presence of higher frequency acoustics and help provide an immediate indication of the presence of high frequency noise. The calculated spectral centroid can be compared to a spectral centroid threshold or range for a given event, and when the spectral centroid meets or exceeds the threshold, the event of interest may be present.

The discussion below relating to calculating the spectral centroid is based on calculating the spectral centroid of a sample data set comprising optical data produced by the DAS system. In this case, when assessing whether a sample data set comprises a high frequency component, the calculated spectral centroid should be equal to or greater than a spectral centroid threshold. However, if, as discussed above, the sample data set comprises a derivative of the optical data, the calculated spectral centroid should be equal to or less than the spectral centroid threshold.

The absolute magnitudes of the computed spectral centroids can be scaled to read a value between zero and one. The turbulent noise generated by other sources such as fluid flow and inflow may typically be in the lower frequencies (e.g., under about 100 Hz) and the centroid computation can produce lower values, for example, around or under 0.1 post rescaling. The introduction of sand can trigger broader frequencies of sounds (e.g., a broad band response) that can extend in spectral content to higher frequencies (e.g., up to and beyond 5,000 Hz). This can produce centroids of higher values (e.g., between about 0.2 and about 0.7, or between about 0.3 and about 0.5), and the magnitude of change would remain fairly independent of the overall concentration of sanding assuming there is a good signal to noise ratio in the measurement assuming a traditional electronic noise floor (e.g., white noise with imposed flicker noise at lower frequencies). It could however, depend on the size of sand particles impinging on the pipe.

The spectral spread can also be determined for the acoustic sample. The spectral spread is a measure of the shape of the spectrum and helps measure how the spectrum is distributed around the spectral centroid. In order to compute the spectral spread, $S_i$, one has to take the deviation of the spectrum from the computed centroid as per the following equation (all other terms defined above):

$$S_i = \sqrt{\frac{\sum_{k=1}^{N} (f(k) - C_i)^2 X_i(k)}{\sum_{k=1}^{N} X_i(k)}} \quad \text{(Eq. 2)}$$

Lower values of the spectral spread correspond to signals whose spectra are tightly concentrated around the spectral centroid. Higher values represent a wider spread of the spectral magnitudes and provide an indication of the presence of a broad band spectral response. The calculated spectral spread can be compared to a spectral spread threshold or range, and when the spectral spread meets exceeds the threshold or falls within the range, the event of interest may be present. As in the case of the spectral centroid, the magnitude of spectral spread would remain fairly independent of the overall concentration of sanding for a sand ingress event assuming there is a good signal to noise ratio in the measurement. It can however, depend on the size and shape of the sand particles impinging on the pipe.

The spectral roll-off is a measure of the bandwidth of the audio signal. The Spectral roll-off of the $i^{th}$ frame, is defined as the frequency bin 'y' below which the accumulated magnitudes of the short-time Fourier transform reach a certain percentage value (usually between 85%-95%) of the overall sum of magnitudes of the spectrum.

$$\sum_{k=1}^{y} |X_i(k)| = \frac{c}{100} \sum_{k=1}^{N} |X_i(k)| \quad \text{(Eq. 3)}$$

Where c=85 or 95. The result of the spectral roll-off calculation is a bin index and enables distinguishing acoustic events based on dominant energy contributions in the frequency domain. (e.g., between gas influx and fluid flow, etc.)

The spectral skewness measures the symmetry of the distribution of the spectral magnitude values around their arithmetic mean.

The RMS band energy provides a measure of the signal energy within defined frequency bins that may then be used for signal amplitude population. The selection of the bandwidths can be based on the characteristics of the captured acoustic signal. In some embodiments, a subband energy ratio representing the ratio of the upper frequency in the selected band to the lower frequency in the selected band can range between about 1.5:1 to about 3:1. In some embodiments, the subband energy ratio can range from about 2.5:1 to about 1.8:1, or alternatively be about 2:1. In some embodiment, selected frequency ranges for a signal with a 5,000 Hz Nyquist acquisition bandwidth can include: a first bin with a frequency range between 0 Hz and 20 Hz, a second bin with a frequency range between 20 Hz and 40 Hz, a third bin with a frequency range between 40 Hz and 80 Hz, a fourth bin with a frequency range between 80 Hz and 160 Hz, a fifth bin with a frequency range between 160 Hz and 320 Hz, a sixth bin with a frequency range between 320 Hz and 640 Hz, a seventh bin with a frequency range between 640 Hz and 1280 Hz, an eighth bin with a frequency range between 1280 Hz and 2500 Hz, and a ninth bin with a frequency range between 2500 Hz and 5000 Hz. While certain frequency ranges for each bin are listed herein, they are used as examples only, and other values in the same or a different number of frequency range bins can also be used. In some embodiments, the RMS band energies may also be expressed as a ratiometric measure by computing the ratio of the RMS signal energy within the defined frequency bins relative to the total RMS energy across the acquisition (Nyquist) bandwidth. This may help to reduce or remove the dependencies on the noise and any momentary variations in the broadband sound.

The total RMS energy of the acoustic waveform calculated in the time domain can indicate the loudness of the acoustic signal. In some embodiments, the total RMS energy can also be extracted from the temporal domain after filing the signal for noise.

The spectral flatness is a measure of the noisiness/tonality of an acoustic spectrum. It can be computed by the ratio of the geometric mean to the arithmetic mean of the energy spectrum value and may be used as an alternative approach to detect broadbanded signals (e.g., such as those caused by sand ingress). For tonal signals, the spectral flatness can be close to 0 and for broader band signals it can be closer to 1.

The spectral slope provides a basic approximation of the spectrum shape by a linearly regressed line. The spectral slope represents the decrease of the spectral amplitudes from low to high frequencies (e.g., a spectral tilt). The slope, the y-intersection, and the max and media regression error may be used as features.

The spectral kurtosis provides a measure of the flatness of a distribution around the mean value.

The spectral flux is a measure of instantaneous changes in the magnitude of a spectrum. It provides a measure of the frame-to-frame squared difference of the spectral magnitude vector summed across all frequencies or a selected portion of the spectrum. Signals with slowly varying (or nearly constant) spectral properties (e.g.: noise) have a low spectral flux, while signals with abrupt spectral changes have a high spectral flux. The spectral flux can allow for a direct measure of the local spectral rate of change and consequently serves as an event detection scheme that could be used to pick up the onset of acoustic events that may then be further analyzed using the feature set above to identify and uniquely classify the acoustic signal.

The spectral autocorrelation function provides a method in which the signal is shifted, and for each signal shift (lag) the correlation or the resemblance of the shifted signal with the original one is computed. This enables computation of the fundamental period by choosing the lag, for which the signal best resembles itself, for example, where the autocorrelation is maximized. This can be useful in exploratory signature analysis/even for anomaly detection for well integrity monitoring across specific depths where well barrier elements to be monitored are positioned.

Any of these frequency domain features, or any combination of these frequency domain features, can be used to provide an acoustic signature for a downhole event. In an embodiment, a selected set of characteristics can be used to provide the acoustic signature for each event, and/or all of the frequency domain features that are calculated can be used as a group in characterizing the acoustic signature for an event. The specific values for the frequency domain features that are calculated can vary depending on the specific attributes of the acoustic signal acquisition system, such that the absolute value of each frequency domain feature can change between systems. In some embodiments, the frequency domain features can be calculated for each event based on the system being used to capture the acoustic signal and/or the differences between systems can be taken into account in determining the frequency domain feature values for each signature between the systems used to determine the values and the systems used to capture the acoustic signal being evaluated.

Figure 7:
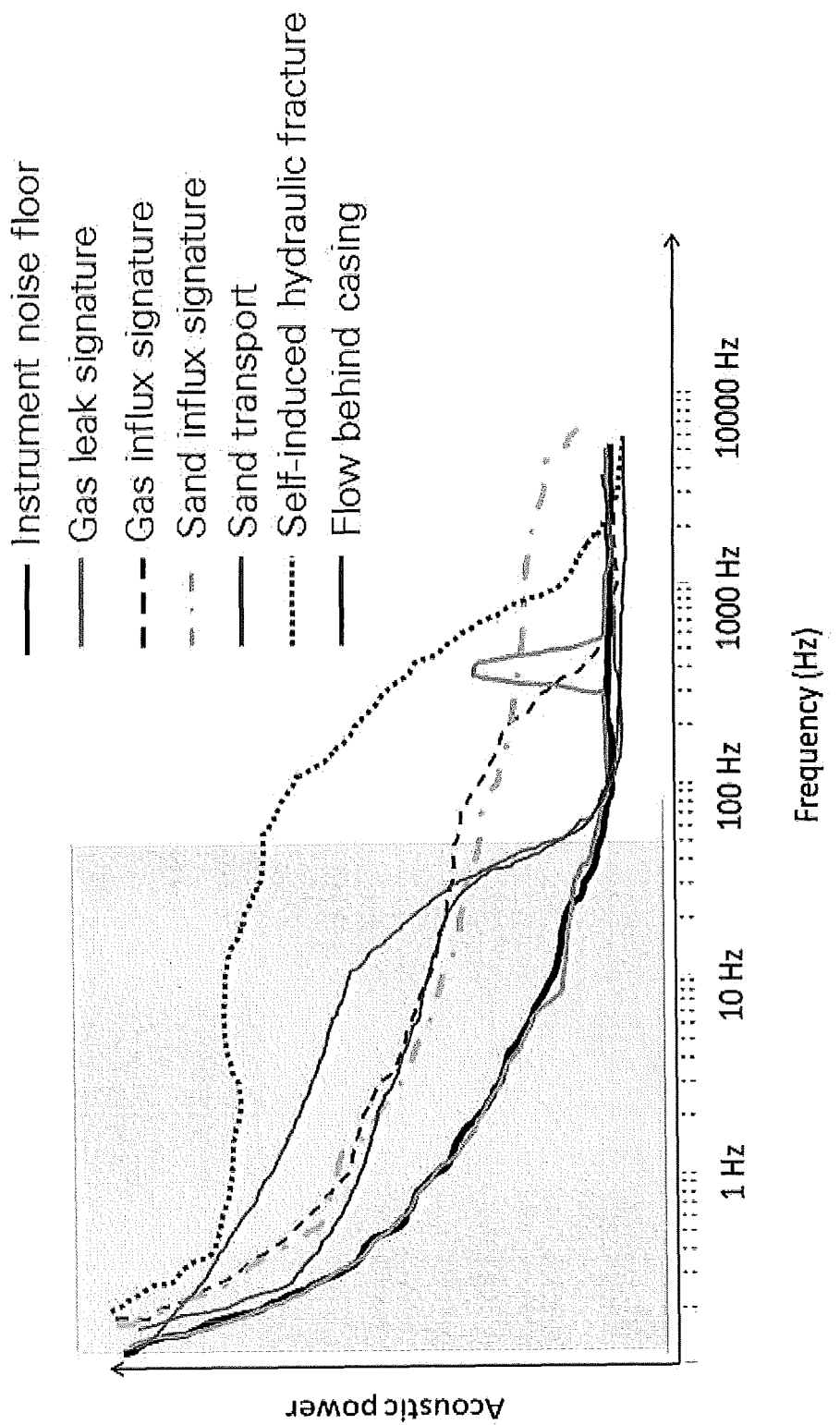
FIG. 7 illustrates an exemplary graph of acoustic power versus frequency for a plurality of downhole events.

FIG. 7 illustrates a number of different events on a chart of acoustic power versus frequency to demonstrate the differences in signatures. As shown, the event signatures for background instrument noise, gas leaks, gas influx into the wellbore, sand ingress or influx, sand transport within a tubular, a self-induced hydraulic fracture, and flow behind a casing are illustrated. A plurality of frequency domain features can be used to characterize each type of event. In an embodiment, at least two, alternatively at least three, alternatively at least four, alternatively at least five, alternatively at least six, alternatively at least seven, or alternatively at least eight different frequency domain features. While FIG. 7 only displays acoustic power, the relative frequencies present are illustrated for exemplary purposes to demonstrate the uniqueness of the acoustic signal result from different events, which can be characterized using a plurality of frequency domain features.

In an embodiment, an event comprising gas leaking from the formation into the wellbore can be characterized by an acoustic signature including a spectral centroid in a lower frequency range (e.g., in a range of about 0 Hz to about 500 Hz), with a relatively high normalized spectral centroid value. The spectral spread may be relative small as the expected signal may not be a broadband signal. In addition, the RMS band energy would be expected in the bins representative of frequencies up to about 500 Hz, while the bins representative of frequencies above about 500 Hz would have no RMS band energies (or subband energy ratios) or a significantly reduced RMS band energy relative to the bins representative of the frequencies between 0 Hz and about 500 Hz. In addition, the RMS band energy representative of the frequency range of about 300 Hz to about 500 Hz may demonstrate the largest RMS band energy (or subband energy ratio) as related to the bins representative of the other frequency ranges. Additional frequency domain features can also be determined for a gas leak event and can be used as part of a gas leak signature.

An event comprising gas influx from the formation into the wellbore can be characterized by an acoustic signature including a spectral centroid within a lower frequency range (e.g., in a range of about 0 Hz to about 500 Hz). The spectral spread may be relative small as the expected signal may not be a broadband signal. In addition, the RMS band energy would be expected in the bins representative of frequencies up to about 500 Hz, while the bins representative of frequencies above about 500 Hz would have no RMS band energies or a significantly reduced RMS band energy relative to the bins representative of the frequencies between 0 Hz and about 500 Hz. In addition, the RMS band energy representative of the frequency range of about 0 Hz to about 50 Hz may demonstrate the largest RMS band energy as related to the bins representative of the other frequency ranges. Additional frequency domain features can also be determined for a gas influx event and can be used as part of a gas influx signature.

An event comprising sand ingress can be characterized by an acoustic signature including a spectral centroid above about 500 Hz. The spectral spread may be relative large as the expected signal should be a broadband signal. In addition, the RMS band energy in the bins representative of frequencies above 500 Hz would be expected to have values above zero, thereby providing an indication of the presence of broadband frequencies. Additional frequency domain features can also be determined for a sand ingress event and can be used as part of a sand ingress signature.

An event comprising a high rate of fluid flow from the formation into the wellbore and/or within the completion assembly can be characterized by an acoustic signature including a spectral centroid at a lower frequency range (e.g., within a range of 0 Hz to about 50 Hz). The spectral spread may be relative small as the expected signal may not be a broadband signal. In addition, the RMS band energy would be expected in the bins representative of frequencies up to about 50 Hz, while the bins representative of frequencies above about 50 Hz would have no RMS band energies or a significantly reduced RMS band energy relative to the bins representative of the frequencies between 0 Hz and about 50 Hz. Additional frequency domain features can also be determined for a high rate fluid flow event and can be used as part of a high rate fluid flow signature.

An event comprising in-well sand transport and or the movement of a sand slug can be characterized by an acoustic signature including a spectral centroid within a low frequency range (e.g., in a range of 0 Hz to about 20 Hz). The spectral spread may be relative small as the expected signal may not be a broadband signal. In addition, the RMS band energy would be expected in the bins representative of frequencies up to about 20 Hz, while the bins representative of frequencies above about 20 Hz would have no RMS band energies or a significantly reduced RMS band energy relative to the bins representative of the frequencies between 0 Hz and about 20 Hz. In addition, the RMS energy in the bins representative of the frequencies between 0 Hz and about 20 Hz would have an increased energy or power level relative to the power or energy of the fluid flow noise. The spectral roll-off may also occur at about 50 Hz. Additional frequency domain features can also be determined for an in-well sand transport event and can be used as part of an in-well sand transport signature.

An event comprising the flow of a fluid past a restriction comprising a sand plug or sand dune in the wellbore tubular or production tubing can be characterized by an acoustic signature including a spectral centroid in a low frequency range (e.g., within a range of about 0 Hz to about 50 Hz). The spectral spread may be relative small as the expected signal may not be a broadband signal. In addition, the RMS band energy would be expected in the bins representative of frequencies up to about 50 Hz, while the bins representative of frequencies above about 50 Hz would have no RMS band energies or a significantly reduced RMS band energy relative to the bins representative of the frequencies between 0 Hz and about 50 Hz. Additional frequency domain features can also be determined for fluid flow past a restriction type event and can be used as part of a fluid flow past a restriction type signature.

An event comprising fluid flow behind a casing (e.g., between the casing and the formation) can be characterized by an acoustic signature including a spectral centroid within the a low frequency range (e.g., a range of about 0 Hz to about 300 Hz). The spectral spread may be relative small as the expected signal may not be a broadband signal. In addition, the RMS band energy would be expected in the bins representative of frequencies up to about 300 Hz, while the bins representative of frequencies above about 300 Hz would have little to no RMS band energies or a significantly reduced RMS band energy relative to the bins representative of the frequencies between 0 Hz and about 300 Hz. In addition, the RMS energy in the bins representative of the frequencies between 0 Hz and about 70 Hz would have an increased energy or power level relative to RMS energy in the remaining frequency bins. Additional frequency domain features can also be determined for fluid flow behind a casing and can be used as part of a flow behind a casing signature.

An event comprising a self-induced hydraulic fracture that could be caused by fluid movement in the near-wellbore region can be characterized by an acoustic signature including a spectral centroid within a mid-frequency range (e.g., a range of about 0 Hz to about 1000 Hz). The spectral spread may be relative large as the expected signal may include a broadband signal with frequencies extending up to about 5000 Hz. In addition, the RMS band energy would be expected in the bins representative of frequencies up to about 1000 Hz. In addition, the spectral flux may be indicative of the fracturing event. A large spectral flux can be expected at the initiation of the fracture due to the near instantaneous rise in spectral power during the creation of the hydraulic fracture. The spectral flux could similarly indicate the end of the event, if the event occurs for more than a single frame during the acoustic monitoring. Additional frequency domain features can also be determined for a self-induced hydraulic fracture event and can be used as part of a self-induced hydraulic fracture signature.

An event comprising a fluid leak past a downhole restriction or plug can be characterized by an acoustic signature including a spectral centroid in a low frequency range (e.g., in a range of 0 Hz to about 500 Hz). The spectral spread may be relative small as the expected signal may not be a broadband signal. In addition, the RMS band energy would be expected in the bins representative of frequencies up to about 500 Hz. Additional frequency domain features can also be determined for a fluid leak past a restriction type event and can be used as part of a fluid leak signature.

An event comprising a rock fracture propagation can be characterized by an acoustic signature including a spectral centroid in a high frequency range (e.g., in a range of 1000 Hz to about 5000 Hz). In addition, the RMS band energy would be expected in the bins representative of frequencies between about 1000 Hz and about 5000 Hz. In addition, the spectral flux may be indicative of the fracturing propagation event. A large spectral flux can be expected at the initiation of the fracture propagation due to the near instantaneous rise in spectral power during the fracture propagation. The spectral flux could similarly indicate the end of the event, if the event occurs for more than a single frame during the acoustic monitoring. Additional frequency domain features can also be determined for a rock fracturing event and can be used as part of a rock fracturing signature.

While exemplary numerical ranges are provided herein, the actual numerical results may vary depending on the data acquisition system and/or the values can be normalized or otherwise processed to provide different results. As a result, the signatures for each event may have different thresholds or ranges of values for each of a plurality of frequency domain features.

In order to obtain the frequency domain features, the acoustic sample data can be converted to the frequency domain. In an embodiment, the raw optical data may contain or represent acoustic data in the time domain. A frequency domain representation of the data can be obtained using a Fourier Transform. Various algorithms can be used as known in the art. In some embodiments, a Short Time Fourier Transform technique or a Discrete Time Fourier transform can be used. The resulting data sample may then be represented by a range of frequencies relative to their power levels at which they are present. The raw optical data can be transformed into the frequency domain prior to or after the application of the spatial filter. In general, the acoustic sample will be in the frequency domain in order to determine the spectral centroid and the spectral spread. In an embodiment, the processor 168 can be configured to perform the conversion of the raw acoustic data and/or the acoustic sample data from the time domain into the frequency domain. In the process of converting the signal to the frequency domain, the power across all frequencies within the acoustic sample can be analyzed. The use of the processor 168 to perform the transformation may provide the frequency domain data in real time or near real time.

The processor 168 can then be used to analyze the acoustic sample data in the frequency domain to obtain one or more of the frequency domain features and provide an output with the determined frequency domain features for further processing. In some embodiments, the output of the frequency domain features can include features that are not used to determine the presence of every event.

The output of the processor with the frequency domain features for the acoustic sample data can then be used to determine the presence of one or more events at one or more locations in the wellbore corresponding to depth intervals over which the acoustic data is acquired or filtered. In some embodiments, the determination of the presence of one or more events can include comparing the frequency domain features with the frequency domain feature thresholds or ranges in each event signature. When the frequency domain features in the acoustic sample data match one or more of the event signatures, the event can be identified as having occurred during the sample data measurement period, which can be in real time. Various outputs can be generated to display or indicate the presence of the one or more events.

The matching of the frequency domain features to the event signatures can be accomplished in a number of ways. In some embodiments, a direct matching of the frequency domain features to the event signature thresholds or ranges can be performed across a plurality of frequency domain features. In some embodiments, machine learning or even deterministic techniques may be incorporated to allow new signals to be patterned automatically based on the descriptors. As an example, k-means clustering and k-nearest neighbor classification techniques may be used to cluster the events and classify them to their nearest neighbor to offer exploratory diagnostics/surveillance capability for various events, and in some instances, to identify new downhole events that do not have established event signatures. The use of learning algorithms may also be useful when multiple events occur simultaneously such that the acoustic signals stack to form the resulting acoustic sample data. In an embodiment, the frequency domain features can be used to determine the presence of sand ingress in one or more locations in the wellbore. The determination of the spectral centroid and the spectral spread, and the comparison with the thresholds may allow for a determination of the presence of particles in the fluid at the selected depth in the wellbore. Since the high frequency components tend to be present at the location at which the sand is entering the wellbore tubular with the fluid, the locations meeting the spectral spread and spectral centroid criteria indicate those locations at which sand ingress is occurring. This may provide information on the ingress point rather than simply a location at which sand is present in the wellbore tubular (e.g., present in a flowing fluid), which can occur at any point above the sand ingress location as the fluid flows to the surface of the wellbore 114.

As above, the spectral spread can be computed using the spectral centroid, and so typically the spectral centroid is calculated first, followed by the spectral spread. The comparison of the spectral spread and the spectral centroid with the corresponding threshold can occur in any order. In some embodiments, both values can be calculated, alone or along with additional frequency domain features, and compared to the corresponding threshold values or ranges to determine if sand ingress is present at the depth represented by the acoustic sample data. In other embodiments, only one of the two properties may be determined first. If the value of the spectral spread or the spectral centroid, whichever is determined first, is not above the corresponding threshold, the energy value for the depth or depth range represented by the acoustic sample data can be set to zero, and another sample can be processed. If the value is greater than the corresponding threshold, then the other property can be determined and compared to the corresponding threshold. If the second comparison does not result in the property exceeding the threshold, the energy value for the depth range represented by the acoustic sample data can be set to zero. This may result in a data point comprising a value of zero such that a resulting log may comprise a zero value at the corresponding depth. Only when both properties meet or exceed the corresponding threshold is another value such as the energy or intensity value recorded on a data log for the well. The calculated values for the energy or intensity can be stored in the memory 170 for those acoustic sample data sets in depth and time meeting or exceeding the corresponding thresholds, and a value of zero can be stored in the memory 170 for those acoustic sample data sets not meeting or exceeding one or both of the corresponding thresholds.

The other events can also be identified in a similar manner to the presence of the sand ingress. In an embodiment, a gas leak event can be characterized by a gas leak signature that comprises a threshold range for each of a plurality of spectral descriptors (e.g., the spectral spread, the spectral roll-off, the spectral skewness, the root mean square (RMS) band energy (or the normalized sub-band energies/band energy ratios), a loudness or total RMS energy, a spectral flux, and a spectral autocorrelation function). The gas leak signature can be indicative of a gas leak from a formation in the wellbore through a leak path. The processor, using the analysis application, can be configured to compare the spectral descriptor values to the thresholds and/or ranges and determine if a gas leak from the formation to the annulus in the wellbore has occurred. The determination of the spectral descriptor values can be performed in any order, and the determination can be made sequentially (e.g., verifying a first frequency domain feature is within a threshold and/or range, followed by a second frequency domain feature, etc.), or in parallel using the frequency domain features in the event signature.

In an embodiment, gas influx into the wellbore can be characterized by a gas influx signature comprising a threshold range for each of a plurality of spectral descriptors (e.g., the spectral spread, the spectral roll-off, the spectral skewness, the root mean square (RMS) band energy (or the normalized sub-band energies/band energy ratios), a loudness or total RMS energy, a spectral flux, and/or a spectral autocorrelation function). The gas influx signature can be indicative of a gas inflow from a formation into the wellbore. The processor, using the analysis application, can be configured to compare the plurality of spectral descriptor values to the thresholds and/or ranges and determine if gas influx from the formation to the annulus in the wellbore has occurred. The determination of the spectral descriptor values can be performed in any order, and the determination can be made sequentially (e.g., verifying a first frequency domain feature is within a threshold and/or range, followed by a second frequency domain feature, etc.), or in parallel using the frequency domain features in the event signature.

In an embodiment, liquid inflow into the wellbore can be characterized by a liquid inflow signature that comprises a spectral centroid threshold range and an RMS band energy range, and the frequency domain features can include a spectral centroid and RMS band energies in a plurality of bins. The liquid inflow signature can be indicative of a liquid inflow from a formation into the wellbore. The processor, using the analysis application, can be configured to compare the plurality of spectral descriptor values to the thresholds and/or ranges and determine if liquid inflow from the formation has occurred. The determination of the spectral descriptor values can be performed in any order, and the determination can be made sequentially (e.g., verifying a first frequency domain feature is within a threshold and/or range, followed by a second frequency domain feature, etc.), or in parallel using the frequency domain features in the event signature.

In an embodiment, sand transport within the wellbore can be characterized by a sand transport signature that comprises a spectral centroid threshold range and a spectral rolloff threshold, and the frequency domain features can include a spectral centroid and a spectral rolloff. The sand transport signature can be indicative of sand flowing within a carrier fluid within the wellbore. The processor, using the analysis application, can be configured to compare the plurality of spectral descriptor values to the thresholds and/or ranges and determine if sand transport within the wellbore has occurred. The determination of the spectral descriptor values can be performed in any order, and the determination can be made sequentially (e.g., verifying a first frequency domain feature is within a threshold and/or range, followed by a second frequency domain feature, etc.), or in parallel using the frequency domain features in the event signature.

In an embodiment, fluid flow past a sand restriction can be characterized by a sand restriction signature that comprises a spectral power threshold range, and the frequency domain features can comprise a spectral power. The sand restriction signature can be indicative of a liquid flow past a sand restriction in a tubular within the wellbore. The processor, using the analysis application, can be configured to compare the plurality of spectral descriptor values to the thresholds and/or ranges and determine if fluid flow past a sand restriction has occurred. The determination of the spectral descriptor values can be performed in any order, and the determination can be made sequentially (e.g., verifying a first frequency domain feature is within a threshold and/or range, followed by a second frequency domain feature, etc.), or in parallel using the frequency domain features in the event signature.

In an embodiment, fluid flow behind a casing (e.g., fluid flow through a leak path, etc.) can be characterized by a casing fluid flow signature that comprises a spectral power threshold range and one or more an RMS band energy ranges, and the frequency domain features can comprise a spectral centroid and RMS band energies in a plurality of bins. The casing fluid flow signature can be indicative of a fluid flow between a casing and a formation. The processor, using the analysis application, can be configured to compare the plurality of spectral descriptor values to the thresholds and/or ranges and determine if fluid flow behind a casing has occurred. The determination of the spectral descriptor values can be performed in any order, and the determination can be made sequentially (e.g., verifying a first frequency domain feature is within a threshold and/or range, followed by a second frequency domain feature, etc.), or in parallel using the frequency domain features in the event signature.

In an embodiment, the occurrence of a self-induced hydraulic fracture can be characterized by a self-induced hydraulic fracturing signature that comprises a spectral centroid threshold range and an RMS band energy range, and the frequency domain features can comprise a spectral centroid and RMS band energies in a plurality of bins. The self-induced hydraulic fracturing signature can be indicative of a formation of a self-induced fracture within a formation. The processor, using the analysis application, can be configured to compare the plurality of spectral descriptor values to the thresholds and/or ranges and determine if a self-induced hydraulic fracture has occurred. The determination of the spectral descriptor values can be performed in any order, and the determination can be made sequentially (e.g., verifying a first frequency domain feature is within a threshold and/or range, followed by a second frequency domain feature, etc.), or in parallel using the frequency domain features in the event signature.

In an embodiment, the presence of a fluid leak can be characterized by a fluid leak signature that comprises a spectral centroid threshold range and an RMS band energy range, and the frequency domain features can comprise a spectral centroid and RMS band energies in a plurality of bins. The fluid leak signature can be indicative of a liquid flow past a downhole plug within the wellbore. The processor, using the analysis application, can be configured to compare the plurality of spectral descriptor values to the thresholds and/or ranges and determine if fluid flow past a restriction such as a downhole plug has occurred. The determination of the spectral descriptor values can be performed in any order, and the determination can be made sequentially (e.g., verifying a first frequency domain feature is within a threshold and/or range, followed by a second frequency domain feature, etc.), or in parallel using the frequency domain features in the event signature.

In an embodiment, the occurrence of a fracture within the formation can be characterized by a fracturing signature that comprises a spectral centroid threshold range and an RMS band energy range, and the frequency domain features can comprise a spectral centroid and RMS band energies in a plurality of bins. The fracturing signature is indicative of a formation of a fracturing within a formation. The processor, using the analysis application, can be configured to compare the plurality of spectral descriptor values to the thresholds and/or ranges and determine if a fracture in the formation has occurred. The determination of the spectral descriptor values can be performed in any order, and the determination can be made sequentially (e.g., verifying a first frequency domain feature is within a threshold and/or range, followed by a second frequency domain feature, etc.), or in parallel using the frequency domain features in the event signature.

In addition to detecting the presence of one or more events at a depth or location in the wellbore 114, the analysis software executing on the processor 168 can be used to visualize the event locations or transfer the calculated energy values over a computer network for visualization on a remote location. In order to visualize one or more of the events, the energy or intensity of the acoustic signal can be determined at the depth interval of interest (e.g., reservoir section where the sand ingress locations are to be determined)

The intensity of the acoustic signal in the filtered data set can then be calculated, where the intensity can represent the energy or power in the acoustic data. A number of power or intensity values can be calculated. In an embodiment, the root mean square (RMS) spectral energy or sub-band energy ratios across the filtered data set frequency bandwidth can be calculated at each of the identified event depth sections over a set integration time to compute an integrated data trace of the acoustic energies over all or a portion of the length of the fiber as a function of time. This computation of an event log may be done repeatedly, such as every second, and later integrated/averaged for discrete time periods—for instance, at times of higher well drawdowns, to display a time-lapsed event log at various stages of the production process (e.g., from baseline shut-in, from during well ramp-up, from steady production, from high drawdown/production rates etc.). The time intervals may be long enough to provide suitable data, though longer times may result in larger data sets. In an embodiment, the time integration may occur over a time period between about 0.1 seconds to about 10 seconds, or between about 0.5 seconds and about a few minutes or even hours.

The resulting event log(s) computed every second can be stored in the memory 170 or transferred across a computer network, to populate an event database. The data stored/transferred in the memory 170 can include any of the frequency domain features, the filtered energy data set, and/or the RMS spectral energy through time, for one or more of the data set depths and may be stored every second. This data can be used to generate an integrated event log at each event depth sample point along the length of the optical fiber 162 along with a synchronized timestamp that indicates the times of measurement. In producing a visualization event log, the RMS spectral energy for depth sections that do not exhibit or match one or more event signatures can be set to zero. This allows those depth points or zones exhibiting or matching one or more of the event signatures to be easily identified.

As an example, the analysis software executing on the processor 168 can be used to visualize sand ingress locations or transfer the calculated energy values over a computer network for visualization on a remote location. In order to visualize the sand ingress, the energy or intensity of the acoustic signal, or at least the high frequency portion of the acoustic signal, can be determined at the depth interval of interest (e.g., reservoir section where the sand ingress locations are to be determined)

When the spectral descriptors have values above the corresponding thresholds in the event signature, the acoustic sample data can be filtered to obtain the sand ingress acoustic data. In some embodiments, only the acoustic sample data meeting or exceeding the corresponding thresholds may be further analyzed, and the remaining acoustic sample data can have the value set to zero. The acoustic sample data sets meeting or exceeding the corresponding thresholds can be filtered with a high frequency filter. In an embodiment, the acoustic sample data sets meeting or exceeding the corresponding thresholds can be filtered with a high frequency filter to remove the frequencies below about 0.5 kHz, below about 1 kHz, below about 1.5 kHz, or below about 2 kHz. The upper frequency range may be less than about 10 kHz, less than about 7 kHz, less than about 6 kHz, or less than about 5 kHz, where the filter bandwidth can have a frequency range between any of the lower values and any of the upper values. In an embodiment, the acoustic sample can be filtered to produce a filtered data set comprising the frequencies between about 0.5 kHz and about 10 kHz, or between about 2 kHz and about 5 kHz from the acoustic sample. The filtered data set allows the broad band acoustic energy in the higher frequencies to be isolated, and thereby allow the sand ingress acoustics to be distinguished from the general, low frequency fluid flow noise captured by the acoustic sensor resulting from fluid flow and mechanical sources of acoustic signals.

The intensity of the acoustic signal in the filtered data set can then be calculated, where the intensity can represent the energy or power in the acoustic data. In an embodiment, the root mean square (RMS) spectral energy across the filtered data set frequency bandwidth can be calculated at each of the identified sanding depth sections over a set integration time to compute an integrated data trace of sand ingress energies over all or a portion of the length of the fiber as a function of time. This computation of a 'sand ingress log' may be done repeatedly, such as every second, and later integrated/averaged for discrete time periods—for instance, at times of higher well drawdowns, to display a time-lapsed sand ingress log at various stages of the production process (e.g., from baseline shut-in, from during well ramp-up, from steady production, from high drawdown/production rates etc.). The time intervals may be long enough to provide suitable data, though longer times may result in larger data sets. In an embodiment, the time integration may occur over a time period between about 0.1 seconds to about 10 seconds, or between about 0.5 seconds and about a few minutes or even hours.

Sand logs computed every second can be stored in the memory 170 or transferred across a computer network, to populate an event database. The data stored/transferred in the memory 170 can include the measured spectral centroid, the measured spectral spread, the filtered energy data set, and/or the RMS spectral energy through time, for one or more of the data set depths and may be stored every second. This data can be used to generate an integrated high frequency sanding energy log at each event depth sample point along the length of the optical fiber 162 along with a synchronized timestamp that indicates the times of measurement.

Figure 8:
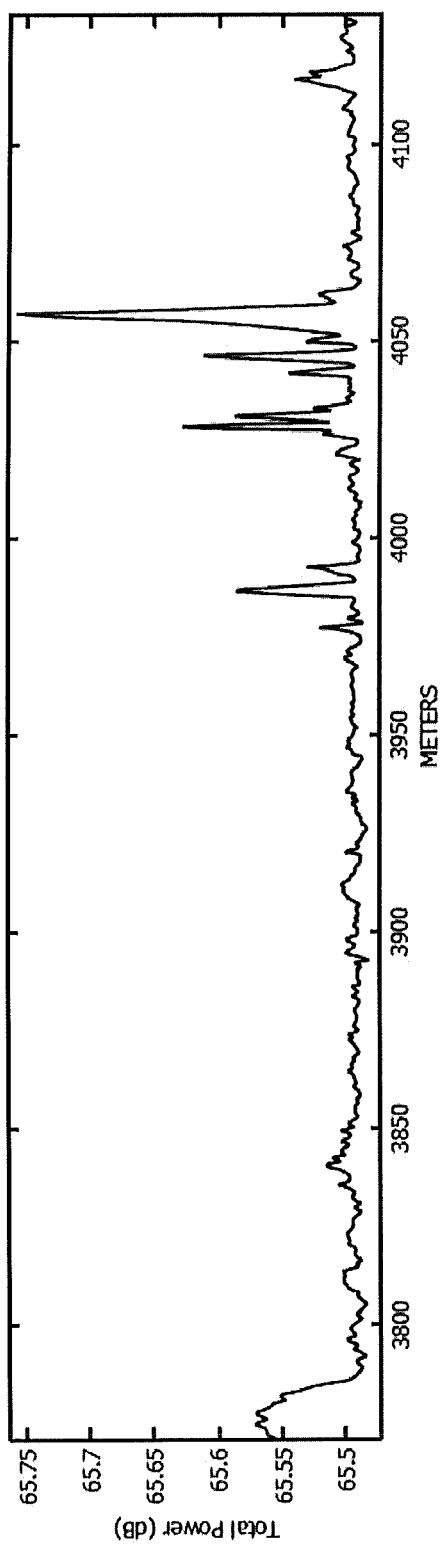
FIG. 8 is a generic representation of a sand log according to an embodiment.

In producing a visualization sanding log, the RMS spectral energy for depth sections that do not exhibit the spectral conformance can be set to zero. This allows those depth points or zones having spectral centroids and spectral spreads greater than the thresholds to be easily observed. FIG. 8 represents an example of an embodiment of a sanding log showing RMS spectral energy against depth. The figure illustrates the locations having sand ingress locations as peaks in the total RMS spectral energy. In an embodiment, the band filtered spectral energy data can be visualized alongside or on a well completion schematic or an open hole petrophysical log indicating zones of sanding at the integration time intervals to allow for easy identification relative to the equipment and producing zones in a wellbore. The sand ingress log can also be visualized as a 3D plot with the RMS spectral energy along the vertical axis (x axis); sample point depth along the y axis and time along the z axis. This embodiment provides a DAS sand log that can allow for a visualization of the zonal sand contributions in near real time. In some instances, the sanding events may not be continuous, and the time-based log may allow for the visualization of the sand ingress in a time dependent fashion.

The RMS spectral energy and its visualization on the sand log can therefore be used to identify the relative contribution of the sanding ingress at different points along the wellbore. For example, it may be possible to determine which zone is contributing the greatest proportion of the sand ingress, which zone contributes the second greatest portion of the sand ingress, and so on.

In some embodiments, a qualitative determination of the amount of sand entering the wellbore can occur at one or more locations. In order to determine qualitative amount of sand entering the wellbore, the processor can be configured to determine an integrated (cumulative) magnitude and quality factor and/or width of one or more of the peaks in the power data representing the intensity or power relative to a depth over a discrete time period. The quality factor or the half power bandwidth represents the sharpness of the peak. The quality factor, in addition to the magnitude of peaks at each sanding zones, provides a qualitative indication of the concentration of sand where low concentrations produce low amplitudes with high quality factors, high concentrations of sanding produce large magnitude peaks with a relatively poorer quality factor, and intermediate sand concentrations produce peaks of large magnitudes with relatively high quality factors. By determining the quality factor, width of the peaks, and/or relative magnitude of the peaks, the relative amount of sand ingress at various zones can be determined. For example, the qualitative sand ingress amount may be classified based on the quality factor and/or width of the peaks, using terms such as "high; medium; low", "severe; moderate; low" or "3; 2; 1" or similar. This qualitative sand intensity estimate across each of the sanding zones may also be proportionally translated into a sand allocation in pptb (parts per thousand barrels) by correlating the data to the sand measured on the surface in cases where the well is operated with enough rate to lift sand produced to surface. This surface sand measurement may be done by taking lab samples/through the use of other quantitative surface sand detection systems. This information may be useful in planning for a remediation action to reduce the amount of sand entering the wellbore.

The data output by the system may generally indicate one or more sanding locations or depths, and optionally, a relative amount of sand ingress between the identified locations or depths and/or a qualitative indicator of sand entering the wellbore at a location. If sand ingress is observed in the produced fluid (as determined by methods such as surface sand detectors, visual observation, etc.), but the location and/or amount of the sand ingress cannot be identified with sufficient clarity using the methods described herein, various actions can be taken in order to obtain a better visualization of the acoustic data. In an embodiment, the production rate can be temporarily increased. The resulting data analysis can be performed on the data during the increased production period. In general, an increased fluid flow rate into the wellbore may be expected to increase the acoustic signal intensity at the sand ingress locations. This may allow a signal to noise ratio to be improved in order to more clearly identify sand ingress at one or more locations by, for example, providing for an increased signal strength to allow the spectral conformance to be determined. The sand energies can also be more clearly calculated based on the increased signal outputs. Once the zones of interest are identified, the production levels can be adjusted based on the sand ingress locations and amounts. Any changes in sand production amounts over time can be monitored using the techniques described herein and the operating conditions can be adjusted accordingly (e.g., dynamically adjusted, automatically adjusted, manually adjusted, etc.).

In some embodiments, the change in the production rate can be used to determine a production rate correlation with the sand ingress locations and inflow rates at one or more points along the wellbore. In general, decreasing the production rate may be expected to reduce the sand ingress rates. By determining production rate correlations with the sand ingress rates, the production rate from the well and/or one or more zones can be adjusted to reduce the sand ingress rate at the identified locations. For example, an adjustable production sleeve or choke can be altered to adjust specific sand ingress rates in one or more production zones. If none of the production zones are adjustable, various workover procedures can be used to alter the production from specific zones. For example, various intake sleeves can be blocked off, zonal isolation devices can be used to block off production from certain zones, and/or some other operations can be carried out to reduce the amount of sand ingress (e.g., consolidation procedures, etc.).

The same analysis procedure can be used with any of the event signatures described herein. For example, the presence of one or more events can be determined. In some embodiments, the location and or discrimination between events may not be clear. One or more characteristics of the wellbore can then be changed to allow a second measurement of the acoustic signal to occur. For example, the production rate can be changed, the pressures can be changed, one or more zones can be shut-in, or any other suitable production change. For example, the production rate can be temporarily increased. The resulting data analysis can be performed on the data during the increased production period. In general, an increased fluid flow rate into the wellbore may be expected to increase the acoustic signal intensity at certain event locations such as a gas influx location, a sand ingress location, a fluid inflow location, or the like. Similarly, such a change may not change the intensity in other types of events such as fluid leaks, hydraulic fractures, and similar events. This may allow a signal to noise ratio to be improved in order to more clearly identify one event relative to another at one or more locations by, for example, providing for an increased signal strength to allow the event signatures to be compared to the resulting acoustic signal. The event energies can also be more clearly calculated based on the increased signal outputs. Once the zones of interest are identified, the production levels can be adjusted based on the event locations and amounts. Any changes in the presence of the events over time can be monitored using the techniques described herein and the operating conditions can be adjusted accordingly (e.g., dynamically adjusted, automatically adjusted, manually adjusted, etc.). While the data analysis has been described above with respect to the system 100, methods of identifying events within the wellbore (e.g., sand ingress locations along the length of a wellbore, hydraulic fractures, gas influx, etc.) can also be carried out using any suitable system. For example, the system of FIG. 1 can be used to carry out the identification method, a separate system at a different time and/or location can be used with acoustic data to perform the event identification method, and/or the method can be performed using acoustic data obtained from a different type of acoustic sensor where the data is obtained in an electronic form useable with a device capable of performing the method.

Additional data processing techniques can also be used to detect events in the wellbore. In some embodiments, the processor 168 can execute a program, which can configure the processor 168 to filter the acoustic data set spatially and spectrally to provide frequency band extracted (FBE) acoustic data over multiple frequency bands. This can be similar to the frequency bands described with respect to the RMS energies. The acoustic data set can be pre-processed and then frequency filtered in to multiple frequency bands at given intervals such as every second of data acquisition. The multiple frequency bands can include various ranges. As an example, the multiple frequency bands can include a first band from about 5 Hz to about 50 Hz; a second band from about 50 Hz to about 100 Hz; a third band from about 100 Hz to about 500 Hz; a fourth band from about 500 Hz to about 2000 Hz; a fifth band from about 2000 Hz to about 5000 Hz, and so on along the length of the fiber or a selected portion thereof, though other ranges for the frequency bands can also be used.).

The resulting FBE data can then be cross compared to identify zones with event signature corresponding to the FBE data. For example, the acoustic amplitudes in each of the multiple frequency bands can be compared to determine depths with response relative to a baseline acoustic signal. The baseline acoustic signal can be taken as the measured acoustics captured when the well is shut-in (e.g., without producing a fluid). In some embodiments, the baseline acoustic signal can comprise a time averaged acoustic signal over one or more portions of the wellbore. The time period for considering the average may be taken as long enough to avoid the potential of an event over the entire average. Any comparison of an acoustic signal comprising an event to the time average should then indicate an increased signal in at least one frequency ranges corresponding to the event frequency ranges of interest.

Using sand ingress detection as an example, additional data processing techniques can also be used to detect sand ingress locations. The resulting FBE data can then be cross compared to identify zones with the sand ingress signature to compute a representative sand log. For example, the acoustic amplitudes in each of the multiple frequency bands can be compared to determine depths with broadband response (e.g., zones where a response in all of the bands is observed) relative to a baseline acoustic signal. The baseline acoustic signal can be taken as the measured acoustics captured when the well is shut-in (e.g., without producing a fluid). In some embodiments, the baseline acoustic signal can comprise a time averaged acoustic signal over one or more portions of the wellbore. Any comparison of an acoustic signal comprising sand inflow to the time average should then indicate an increased signal in at least one broadband frequency range (e.g., in a frequency range having a frequency greater than 0.5 kHz such as 0.5 kHz to about 5 kHz). The zones having a broadband response can then be identified, and the acoustic RMS energies in the higher frequencies in the identified zones can be populated as the sand noise intensity as done in the previous described processing workflow. In addition to the systems described herein, various methods of determining the presence of one or more events can also be carried out. The methods can be performed using any of the systems described herein, or any other suitable systems. In an embodiment, a method of detecting an event within a wellbore can include obtaining a sample data set. The sample data set can be a sample of an acoustic signal originating within a wellbore comprising a fluid, and be representative of the acoustic signal across a frequency spectrum. A plurality of frequency domain features of the sample data set can be determined, and the plurality of spectral characteristics can be compared with corresponding threshold and/or ranges an event signature. When the plurality of frequency domain features match the event signature, the presence of the event within the wellbore can be determined based on the determination that that at least one spectral characteristic matches the event signature.

The event signature can include any of those described herein such as a gas leak from a subterranean formation into an annulus in the wellbore, a gas inflow from the subterranean formation into the wellbore, sand ingress into the wellbore, a liquid inflow into the wellbore, sand transport within a tubular in the wellbore, fluid flow past a sand plug in a tubular in the wellbore, fluid flow behind a casing, a self-induced hydraulic fracture within the subterranean formation, a fluid leak past a downhole seal, or a rock fracture propagation event.

In an embodiment, the method can be used to determine the presence of a sand inflow into a wellbore using a sand ingress signature. The sample data set can be analyzed to determine that the sample data set comprises acoustic frequencies greater than about 0.5 kHz, and the spectral characteristic can include a spectral centroid of the sample data set and a spectral spread of the sample data set. The sand ingress signature can include a spectral centroid threshold and a spectral spread threshold. A determination that the at least one spectral characteristic matches the event signature can be made by determining that the spectral centroid is greater than a spectral centroid threshold, determining that the spectral spread is greater than a spectral spread threshold, and determining a presence of sand inflow into the wellbore based on determining that the at least one spectral characteristic matches the event signature.

In an embodiment, the method can be used to determine the presence of a gas leak using a gas leak signature that is indicative of a gas leak from a formation through a leak path in the wellbore. The frequency domain features can include a plurality of the frequency domain features described herein (e.g., the spectral spread, the spectral roll-off, the spectral skewness, the root mean square (RMS) band energy (or the normalized sub-band energies/band energy ratios), a loudness or total RMS energy, a spectral flux, and/or a spectral autocorrelation function). The determination of the presence of the gas leak can be made by comparing the plurality of frequency domain features to the thresholds and/or ranges and determining if a gas leak from the formation to the annulus in the wellbore has occurred.

In an embodiment, the method can be used to determine the presence of gas influx into the wellbore using a gas influx signature that comprises thresholds and/or ranges for a plurality of frequency domain features. The frequency domain features can include a plurality of the frequency domain features described herein (e.g., the spectral spread, the spectral roll-off, the spectral skewness, the root mean square (RMS) band energy (or the normalized sub-band energies/band energy ratios), a loudness or total RMS energy, a spectral flux, and/or a spectral autocorrelation function). The determination of the presence of the gas leak can be made by comparing a plurality of frequency domain feature values in an acoustic sample to the thresholds and/or ranges and determining if a gas leak from the formation to the annulus in the wellbore has occurred.

In an embodiment, the method can be used to determine the presence of liquid inflow into the wellbore using a liquid inflow signature that comprises thresholds and/or ranges for a plurality of frequency domain features. The frequency domain features can include a plurality of the frequency domain features described herein (e.g., the spectral spread, the spectral roll-off, the spectral skewness, the root mean square (RMS) band energy (or the normalized sub-band energies/band energy ratios), a loudness or total RMS energy, a spectral flux, and/or a spectral autocorrelation function). The liquid inflow signature can be indicative of a liquid inflow from a formation into the wellbore. The determination of the presence of the liquid inflow can be made by comparing a plurality of frequency domain feature values in an acoustic sample to the thresholds and/or ranges and determining if the liquid inflow has occurred.

In an embodiment, the method can be used to determine the presence of sand being transported within the wellbore in a carrier fluid using a sand transport signature that comprises thresholds and/or ranges for a plurality of frequency domain features. The frequency domain features can include a plurality of the frequency domain features described herein (e.g., the spectral spread, the spectral roll-off, the spectral skewness, the root mean square (RMS) band energy (or the normalized sub-band energies/band energy ratios), a loudness or total RMS energy, a spectral flux, and/or a spectral autocorrelation function). The sand transport signature can be indicative of a sand being transported within a tubular. The determination of the presence of the sand transport can be made by comparing a plurality of frequency domain feature values in an acoustic sample to the thresholds and/or ranges and determining if the sand transport has occurred.

In an embodiment, the method can be used to determine the presence of fluid flowing past a sand restriction. using a sand restriction signature comprising thresholds and/or ranges for a plurality of frequency domain features. The frequency domain features can include a plurality of the frequency domain features described herein (e.g., the spectral spread, the spectral roll-off, the spectral skewness, the root mean square (RMS) band energy (or the normalized sub-band energies/band energy ratios), a loudness or total RMS energy, a spectral flux, and/or a spectral autocorrelation function). The determination of the presence of the sand restriction can be made by comparing a plurality of frequency domain feature values in an acoustic sample to the thresholds and/or ranges and determining if the sand restriction is present.

In an embodiment, the method can be used to determine the presence of fluid flowing between a casing and the formation using a casing fluid flow signature that comprises thresholds and/or ranges for a plurality of frequency domain features. The frequency domain features can include a plurality of the frequency domain features described herein (e.g., the spectral spread, the spectral roll-off, the spectral skewness, the root mean square (RMS) band energy (or the normalized sub-band energies/band energy ratios), a loudness or total RMS energy, a spectral flux, and/or a spectral autocorrelation function). The liquid inflow signature can be indicative of a liquid inflow from a formation into the wellbore. The determination of the presence of the fluid flow behind a casing can be made by comparing a plurality of frequency domain feature values in an acoustic sample to the thresholds and/or ranges and determining if the fluid flow behind the casing has occurred.

In an embodiment, the method can be used to determine the occurrence of a self-induced hydraulic fracture within the formation using a self-induced hydraulic fracturing signature that comprises thresholds and/or ranges for a plurality of frequency domain features. The frequency domain features can include a plurality of the frequency domain features described herein (e.g., the spectral spread, the spectral roll-off, the spectral skewness, the root mean square (RMS) band energy (or the normalized sub-band energies/band energy ratios), a loudness or total RMS energy, a spectral flux, and/or a spectral autocorrelation function). The self-induced hydraulic fracturing signature can be indicative of a formation of a self-induced fracture within a formation. The determination of the presence of the self-induced hydraulic fracture can be made by comparing a plurality of frequency domain feature values in an acoustic sample to the thresholds and/or ranges and determining if the self-induced hydraulic fracture has occurred.

In an embodiment, the method can be used to determine the presence of fluid leaking past a restriction using a fluid leak signature that comprises thresholds and/or ranges for a plurality of frequency domain features. The frequency domain features can include a plurality of the frequency domain features described herein (e.g., the spectral spread, the spectral roll-off, the spectral skewness, the root mean square (RMS) band energy (or the normalized sub-band energies/band energy ratios), a loudness or total RMS energy, a spectral flux, and/or a spectral autocorrelation function). The determination of the presence of the fluid leaking past the restriction can be made by comparing a plurality of frequency domain feature values in an acoustic sample to the thresholds and/or ranges and determining if the fluid leak past the restriction has occurred.

In an embodiment, the method can be used to determine the occurrence of a fracture within the formation using a fracturing signature that comprises thresholds and/or ranges for a plurality of frequency domain features. The frequency domain features can include a plurality of the frequency domain features described herein (e.g., the spectral spread, the spectral roll-off, the spectral skewness, the root mean square (RMS) band energy (or the normalized sub-band energies/band energy ratios), a loudness or total RMS energy, a spectral flux, and/or a spectral autocorrelation function). The determination of the presence of the fracture can be made by comparing a plurality of frequency domain feature values in an acoustic sample to the thresholds and/or ranges and determining if the fracture has occurred.

In addition to other methods described herein, a method of determining the presence of sand ingress within a wellbore can start with obtaining an acoustic signal from within a wellbore. The wellbore can comprise a fluid serving as a carrier fluid for the sand. In some embodiments, the fluid can produced from the well during the time the acoustic signal is obtained so that the fluid carrying the sand is flowing within the wellbore or wellbore tubular serving as the production tubing, and/or the fluid can be flowing from the formation into the wellbore.

The acoustic signal can include data for all of the wellbore or only a portion of the wellbore. An acoustic sample data set can be obtained from the acoustic signal. In an embodiment, the sample data set may represent a portion of the acoustic signal for a defined depth range or point. In some embodiments, the acoustic signal can be obtained in the time domain. For example, the acoustic signal may be in the form of an acoustic amplitude relative to a collection time. The sample data set may also be in the time domain and be converted into the frequency domain using a suitable transform such as a Fourier transform. In some embodiments, the sample data set can be obtained in the frequency domain such that the acoustic signal can be converted prior to obtaining the sample data set. While the sample data set can be obtained using any of the methods described herein, the sample data set can also be obtained by receiving it from another device. For example, a separate extraction or processing step can be used to prepare one or more sample data sets and transmit them for separate processing using any of the processing methods or systems disclosed herein.

The spectral conformance of the sample data set can then be obtained using various conformance checks. In an embodiment, a spectral centroid of the sample data set can be determined and compared to a spectral centroid threshold. Similarly, a spectral spread of the sample data set can be determined and compared to a spectral spread threshold. If either the spectral centroid or the spectral spread does not exceed the corresponding threshold, sand ingress may not be occurring at the depth represented by the sample data set. In some embodiments, the spectral spread and the spectral centroid can be determined and compared to the applicable threshold serially, and the failure of either one to meet the corresponding threshold may stop the process such that the other spectral property may not be determined. When both the spectral spread and the spectral centroid meet or exceed the applicable threshold, the presence of sand in the fluid (e.g., in the fluid entering the wellbore) can be determined to be occurring.

Figure 9:
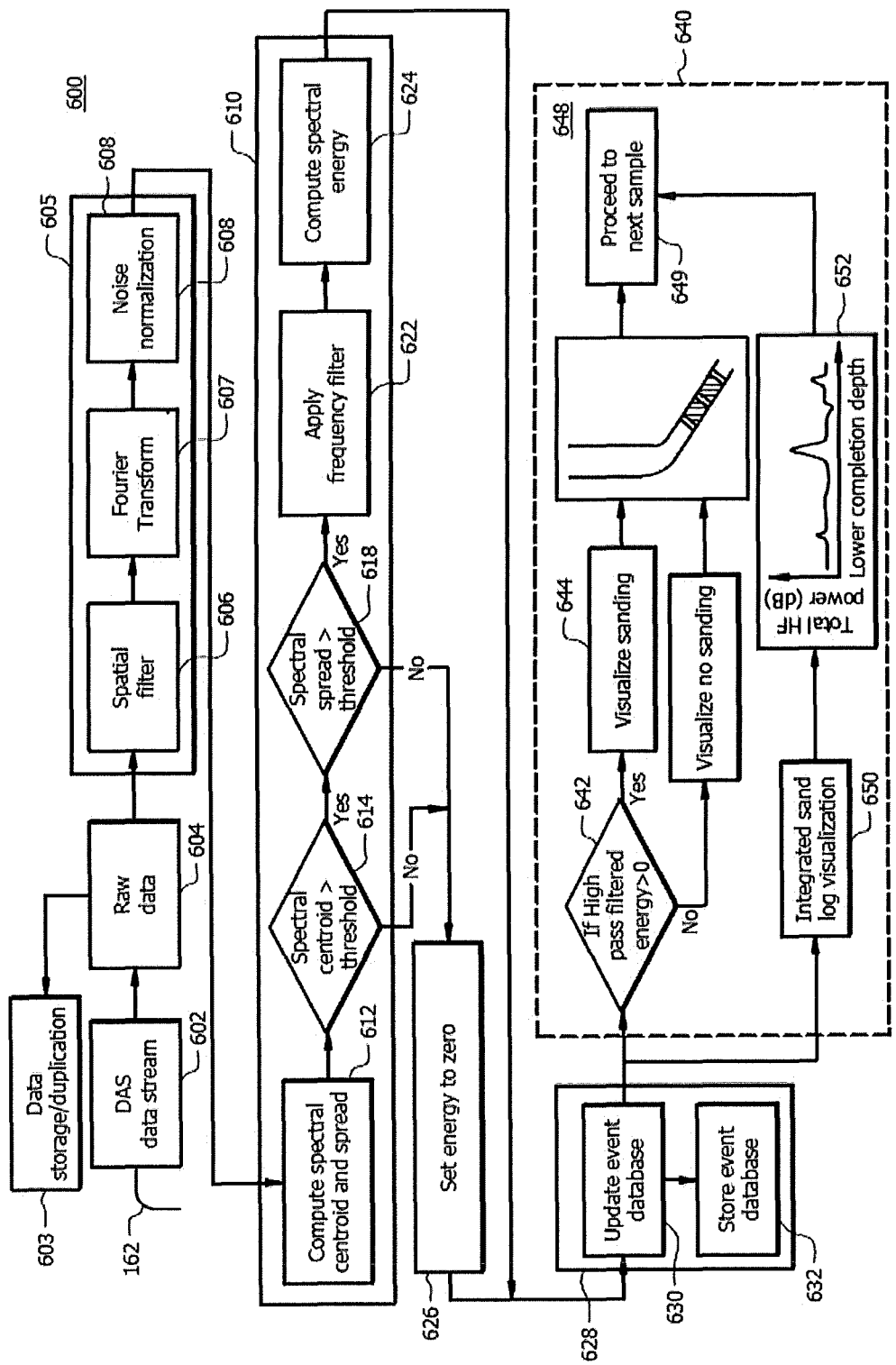
FIG. 9 schematically illustrates a flowchart of a method for detecting sand ingress in a wellbore according to an embodiment.

The overall method and corresponding steps are schematically illustrated as a flowchart show in FIG. 9. As shown in FIG. 9, an embodiment of a method 600 for detecting sand ingress into a wellbore can begin with an acoustic sensor such as a DAS system obtaining, detecting, or receiving an acoustic signal, for example, from an optical fiber 162, as shown in step 602. The acoustic signal can be generated within the wellbore as described herein. The raw optical data from the acoustic sensor can be received and generated by the sensor to produce the acoustic signal, as shown in step 604. The data rate generated by various acoustic sensors such as the DAS system can be large. For example, the DAS system may generate data on the order of 0.5 to about 2 terabytes per hour. This raw data can optionally be stored in a memory in step 603.

The raw data can then be optionally pre-processed in step 605. As shown in FIG. 9, the pre-processing can be performed using a number of optional steps. For example, a spatial sample point filter can be applied in step 606. This filter uses a filter to obtain a portion of the acoustic signal corresponding to a desired depth in the wellbore. Since the time the light pulse sent into the optical fiber returns as backscattered light can correspond to the travel distance, and therefore depth in the wellbore, the acoustic data can be processed to obtain a sample indicative of the desired depth or depth range. This may allow a specific location within the wellbore to be isolated for further analysis. The pre-processing step may also include removal of spurious back reflection type noises at specific depths through spatial median filtering or spatial averaging techniques.

In step 607, the filtered data can be transformed from the time domain into the frequency domain using a transform such as a Fourier transform (e.g., a Short time Fourier Transform or through Discrete Fourier transformation). By transforming the data after applying the spatial filter, the amount of data processed in the transform can be reduced.

In step 608, a noise normalization routine can be performed on the data to improve the signal quality. This step can vary depending on the type of acquisition device used as well as the configuration of the light source, the sensor, and the other processing routines. While shown in a specific order in FIG. 9, the order of the steps within the pre-processing routines can be varied, and any order of the steps 606, 607, 608 can be used. The resulting sample data set may have a reduced data size compared to the raw data set. In an embodiment, a ratio of the sample data file size after the pre-processing to the raw data file size before the pre-processing can be between about 0.05 and about 0.5, or around 0.1, or less if the data is spatially/temporally averaged.

After the acoustic signal is pre-processed, the sample data set can be used in a spectral conformance check process or routine in step 610. The spectral conformance process can include first determining at least one of the spectral centroid or the spectral spread. As shown in FIG. 9, the first step in the spectral conformance check can include determining the spectral centroid of the sample data set. The spectral centroid can then be compared against a spectral centroid threshold in the comparison step 614. When the spectral centroid meets or is greater than the spectral centroid threshold, the process can proceed to the next comparison step 618. In step 618, a spectral spread for the sample data set can be determined. The spectral spread can then be compared to a spectral spread threshold in step 618. When the spectral spread meets or is greater than the spectral spread threshold, the process can proceed to the next step 622. When the sample data set has both a spectral spread and a spectral centroid above the corresponding threshold, it can be determined that the acoustic data at the depth represented by the sample data set represents the ingress of sand. This can include the presence of sand in the fluid at the depth location as well as the presence of sand entering the well and/or wellbore tubular at the depth or depth range. Thus, the spectral conformance process can be used by itself to identify the presence of sand ingress in the well.

Before turning to step 622, it can be noted that if either the comparison in step 614 between the determined spectral centroid and the spectral centroid threshold or the comparison in step 618 between the determined spectral spread and the spectral spread threshold results in either property being below the corresponding threshold, the process may set an energy value for the sample data set to zero in step 626 before allowing the process to proceed to the data integration routine in step 628. The spectral conformance checks can occur in any order, and the serial comparisons may allow those sample data sets that fail the first comparison of either the spectral centroid or the spectral spread to proceed to the post-processing routine without the need to pass through the remaining elements of the spectral conformance process or routine.

Returning to the spectral conformance process or routine 610, the sample data set can optionally be further processed to allow for the determination of a relative amount of sand entering the wellbore at the depth or depth range represented by the sample data set. In step 622, the sample data set can be filtered to isolate the high frequency, broadband components of the acoustic data. The sample data set can be filtered within a predefined frequency range to produce a second data set. In an embodiment, the sample data set can be filtered in a bandwidth as described herein. For example, the sample data set can be filtered in a frequency bandwidth between about 0.5 kHz to about 10 kHz or between about 2 kHz and about 5 kHz. The frequency filter applied in step 622 may isolate the acoustic signature of the sand ingress while removing the lower frequency portions attributable to fluid flow and other potential acoustic sources. The resulting second data set can then be processed in step 624 to compute the spectral energy of the second data set. In an embodiment, the spectral energy can be calculated as the root mean square spectral energy of the second data set. The spectral energy can represent the power or energy of the acoustic signal over the time period at the depth represented by the second data set. The value of the determined spectral energy can then be stored in a memory as being associated with the depth at the time of collection of the acoustic signal.

In some embodiments, the processing in the spectral conformance process or routine 610 can include determining magnitude and a quality factor of the sand ingress peaks in the second data set. The quality factors can then be used to determine or approximate an amount or rate of sand ingress at the location of the peaks. This information can be passed to and stored as part of the event data log.

The resulting determination can then be passed to the data integration processing in step 628. In general, the processing steps determine the presence of sand ingress at a depth represented by the sample data set. In order to obtain an analysis along the length of the wellbore, the processing steps between the data pre-processing steps and the spectral conformance check can be repeated for a plurality of sample data sets representing various depths along the wellbore. As the data is analyzed, the resulting information can pass to the data integration process 628 to be integrated into a sand log representing the results along the length of the wellbore for a given time period. When the data is analyzed along the length of the wellbore, the process can begin again in order to analyze the data along the length of the wellbore for a subsequent time period. This process can then be repeated as needed to track the sand ingress in the wellbore over time.

In the data integration process, the data from each analysis can be received and used to update an event database in step 630. The data can also be sent to another database and/or the event database can be located remotely from the processing location. The data can then be further analyzed for data integration and visualization in near real time or at any later time. The data can include the spectral centroid, the spectral spread, the spectral energy (assuming both the spectral centroid and the spectral spread meet or exceed the corresponding thresholds), or a zero value for the spectral energy when the spectral centroid, the spectral spread, or both are below the corresponding threshold, the depth associated with the sample data set, a time associated with the acoustic signal acquisition, or any combination thereof. The data from a plurality of analysis can then be stored in an event database or log in step 632.

The processing steps in the spectral conformance and storage steps can be used to reduce the amount of data stored relative to sample data set. In an embodiment, the data stored in the event database in the data integration process may have a reduced file size such that a ratio of the sample data set file size to the stored data file size can be between about 500:1 and about 4,000:1. The overall file size reduction, when taking into account the file reduction in the pre-processing steps 605 can result a ratio of the raw acoustic data file size to the data file size of the data stored in the data integration process of between about 5,000:1 to about 40,000:1 or between about 10,000:1 to about 30,000:1. Thus, the process disclosed herein advantageously reduces the amount of raw acoustic data obtained from the wellbore to produce a useful and manageable representation of the sand ingress locations as well as optionally the relative amount of sand ingress at the sand ingress locations.

The data stored in the data integration process can be passed to the data visualization process 640. In this process, a number of logs can be created to allow for the visualization and/or representation of the sand ingress locations and/or amounts through different times/stages of production. In an embodiment, the data, which can optionally be integrated in the data integration process 628 but does not have to be integrated, can be passed to the data visualization process 640. In step 642, the spectral energy calculated for a sample data set can be analyzed to determine if the spectral energy value is greater than zero. In this instance, a zero or null value can be used to indicate that sand ingress is not occurring (or at least not occurring at detectable levels) at the depth. When a zero value is detected, the process can proceed to step 646, where a zero is entered along a well schematic or representation to indicate that sand ingress is not detected at the depth represented by the sample data set. When the spectral energy value is not zero, the process can proceed to step 644. In step 644, a visual representation of the spectral energy can be associated with a corresponding depth on a well schematic or representation. The visual representation can be displayed in step 648. From either steps 644 or step 646, the process can be repeated in step 649 in order to process a subsequent data set or another entry in an integrated log. Once all of the data sets and/or entries in the integrated log have been processed, a complete visual representation of sand ingress locations and relative sand ingress rates or amounts along the length of the wellbore can be presented for a given time. This process can be repeated over a plurality of times to provide and display a real time or near real time representation of sand ingress along the length of the wellbore.

The visualization process 640 can also include the generation and display of a sand ingress log or 'sand log'. The sand log generally represents the total acoustic power or spectral energy caused by sand ingress on one axis and a depth represented by the sample data set on another axis. This log can be obtained using the integrated log data from the data integration process 628 and/or individual data sets can be iteratively analyzed in step 650 to create the integrated sand log. In this embodiment, the locations at which no sand ingress is detected can have a spectral energy set to zero. In step 622, the integrated sand log can be displayed on a display to provide a representation of the locations or depths having sand ingress. A plurality of sand logs can be created for different acoustic data collection times in order to provide and display multiple sand logs in real time or near real time for varying production settings.

As described above, various actions can be taken based on the identification of sand ingress locations or locations where sand ingress is not occurring. In some embodiments, the sand ingress identification methods can be performed, and no sand ingress locations may be located or an amount of sand ingress identified may be below that observed in the fluid being produced from the wellbore. For example, if sand is identified within the produced fluid, but no sand ingress locations have been identified, it can be determined that the acoustic signal is not detecting the sand acoustics at a sufficient level to allow for the detection and location identification. In this instance, the production rate of the fluid from the wellbore can be temporarily increased. The resulting data analysis can be performed on the data during the increased production period while the fluid is being produced. In general, an increased fluid flow rate into the wellbore may be expected to increase the acoustic signal intensity at the sand ingress locations. This may allow a signal to noise ratio to be improved in order to more clearly identify sand ingress at one or more locations by, for example, providing for a greater signal strength to allow the spectral conformance to be determined. The sand energies can also be more clearly calculated based on the increased signal outputs. Once the zones of interest are identified, the production levels can be adjusted based on the sand ingress locations and amounts.

Any of the systems and methods disclosed herein can be carried out on a computer or other device comprising a processor, such as the acquisition device 160 of FIG. 1. FIG. 10 illustrates a computer system 780 suitable for implementing one or more embodiments disclosed herein such as the acquisition device or any portion thereof. The computer system 780 includes a processor 782 (which may be referred to as a central processor unit or CPU) that is in communication with memory devices including secondary storage 784, read only memory (ROM) 786, random access memory (RAM) 788, input/output (I/O) devices 790, and network connectivity devices 792. The processor 782 may be implemented as one or more CPU chips.

It is understood that by programming and/or loading executable instructions onto the computer system 780, at least one of the CPU 782, the RAM 788, and the ROM 786 are changed, transforming the computer system 780 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 780 is turned on or booted, the CPU 782 may execute a computer program or application. For example, the CPU 782 may execute software or firmware stored in the ROM 786 or stored in the RAM 788. In some cases, on boot and/or when the application is initiated, the CPU 782 may copy the application or portions of the application from the secondary storage 784 to the RAM 788 or to memory space within the CPU 782 itself, and the CPU 782 may then execute instructions that the application is comprised of. In some cases, the CPU 782 may copy the application or portions of the application from memory accessed via the network connectivity devices 792 or via the I/O devices 790 to the RAM 788 or to memory space within the CPU 782, and the CPU 782 may then execute instructions that the application is comprised of. During execution, an application may load instructions into the CPU 782, for example load some of the instructions of the application into a cache of the CPU 782. In some contexts, an application that is executed may be said to configure the CPU 782 to do something, e.g., to configure the CPU 782 to perform the function or functions promoted by the subject application. When the CPU 782 is configured in this way by the application, the CPU 782 becomes a specific purpose computer or a specific purpose machine.

The secondary storage 784 is typically comprised of one or more disk drives or tape drives and is used for non-volatile storage of data and as an over-flow data storage device if RAM 788 is not large enough to hold all working data. Secondary storage 784 may be used to store programs which are loaded into RAM 788 when such programs are selected for execution. The ROM 786 is used to store instructions and perhaps data which are read during program execution. ROM 786 is a non-volatile memory device which typically has a small memory capacity relative to the larger memory capacity of secondary storage 784. The RAM 788 is used to store volatile data and perhaps to store instructions. Access to both ROM 786 and RAM 788 is typically faster than to secondary storage 784. The secondary storage 784, the RAM 788, and/or the ROM 786 may be referred to in some contexts as computer readable storage media and/or non-transitory computer readable media.

I/O devices 790 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 792 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 792 may enable the processor 782 to communicate with the Internet or one or more intranets. With such a network connection, it is contemplated that the processor 782 might receive information from the network, or might output information to the network (e.g., to an event database) in the course of performing the above-described method steps. Such information, which is often represented as a sequence of instructions to be executed using processor 782, may be received from and outputted to the network, for example, in the form of a computer data signal embodied in a carrier wave.

Such information, which may include data or instructions to be executed using processor 782 for example, may be received from and outputted to the network, for example, in the form of a computer data baseband signal or signal embodied in a carrier wave. The baseband signal or signal embodied in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 782 executes instructions, codes, computer programs, scripts which it accesses from hard disk, floppy disk, optical disk (these various disk based systems may all be considered secondary storage 784), flash drive, ROM 786, RAM 788, or the network connectivity devices 792. While only one processor 782 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 784, for example, hard drives, floppy disks, optical disks, and/or other device, the ROM 786, and/or the RAM 788 may be referred to in some contexts as non-transitory instructions and/or non-transitory information.

In an embodiment, the computer system 780 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 780 to provide the functionality of a number of servers that is not directly bound to the number of computers in the computer system 780. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 780, at least portions of the contents of the computer program product to the secondary storage 784, to the ROM 786, to the RAM 788, and/or to other non-volatile memory and volatile memory of the computer system 780. The processor 782 may process the executable instructions and/or data structures in part by directly accessing the computer program product, for example by reading from a CD-ROM disk inserted into a disk drive peripheral of the computer system 780. Alternatively, the processor 782 may process the executable instructions and/or data structures by remotely accessing the computer program product, for example by downloading the executable instructions and/or data structures from a remote server through the network connectivity devices 792. The computer program product may comprise instructions that promote the loading and/or copying of data, data structures, files, and/or executable instructions to the secondary storage 784, to the ROM 786, to the RAM 788, and/or to other non-volatile memory and volatile memory of the computer system 780.

In some contexts, the secondary storage 784, the ROM 786, and the RAM 788 may be referred to as a non-transitory computer readable medium or a computer readable storage media. A dynamic RAM embodiment of the RAM 788, likewise, may be referred to as a non-transitory computer readable medium in that while the dynamic RAM receives electrical power and is operated in accordance with its design, for example during a period of time during which the computer system 780 is turned on and operational, the dynamic RAM stores information that is written to it. Similarly, the processor 782 may comprise an internal RAM, an internal ROM, a cache memory, and/or other internal non-transitory storage blocks, sections, or components that may be referred to in some contexts as non-transitory computer readable media or computer readable storage media.

Having described various systems and methods, specific aspects of the disclosure can include, but are not limited to:

In a first aspect, a system for processing acoustic data to identify an event comprises: a receiver unit comprising a processor and a memory, wherein the receiver unit is configured to receive a signal from a sensor disposed along a sensor path or across a sensor area, wherein a processing application is stored in the memory, and wherein the processing application, when executed on the processor, configures the processor to: receive the signal from the sensor, wherein the signal comprises an indication of an acoustic signal received at one or more lengths along the sensor path or across a portion of the sensor area, wherein the signal is indicative of the acoustic signal across a frequency spectrum; determine a plurality of frequency domain features of the signal across the frequency spectrum; and generate an output comprising the plurality of frequency domain features.

In a second aspect, a system for processing acoustic data comprises: a receiver unit comprising a processor and a memory, wherein the receiver unit is configured to receive a signal from a sensor disposed along a sensor path or a sensor area provided that the sensor path or sensor area does not extend through a wellbore, wherein a processing application is stored in the memory, and wherein the processing application, when executed on the processor, configures the processor to: receive the signal from the sensor, wherein the signal comprises an indication of an acoustic signal received at one or more lengths along the sensor path or across a portion of the sensor area, wherein the signal is indicative of the acoustic signal across a frequency spectrum; determine a plurality of frequency domain features of the signal across the frequency spectrum; and generate an output comprising the plurality of frequency domain features.

In a third aspect, a system for detecting an event using acoustic data comprises: a processor unit comprising a processor and a memory, wherein the processor unit is adapted for signal communication with a receiver, and wherein the memory comprises an analysis application, that when executed on the processor, configures the processor to: receive, from the receiver, a signal comprising a plurality of frequency domain features, wherein the frequency domain features are indicative of an acoustic signal, and wherein the frequency domain features are indicative of the acoustic signal across a frequency spectrum; compare the plurality of frequency domain features with one or more event signatures, wherein the one or more event signatures comprise thresholds or ranges for each of the plurality of frequency domain features; determine that the plurality of frequency domain features match at least one event signature of the one or more event signatures; determine the occurrence of at least one event based on the determination that the plurality of frequency domain features match the at least one event signature; and generate an output of the occurrence of the at least one event based on the determination.

In a fourth aspect, a system for detecting an event using acoustic data comprises: a processor unit comprising a processor and a memory, wherein the processor unit is adapted for signal communication with a receiver, and wherein the memory comprises an analysis application, that when executed on the processor, configures the processor to: receive, from the receiver, a signal comprising a plurality of frequency domain features, wherein the frequency domain features are indicative of an acoustic signal provided that the acoustic signal is not an acoustic signal from within a wellbore, and wherein the frequency domain features are indicative of the acoustic signal across a frequency spectrum; compare the plurality of frequency domain features with one or more event signatures, wherein the one or more event signatures comprise thresholds or ranges for each of the plurality of frequency domain features; determine that the plurality of frequency domain features match at least one event signature of the one or more event signatures; determine the occurrence of at least one event based on the determination that the plurality of frequency domain features match the at least one event signature; and generate an output of the occurrence of the at least one event based on the determination.

In a fifth aspect, a method of detecting an event using acoustic data comprises: obtaining a sample data set, wherein the sample data set is a sample of an acoustic signal originating from an acoustic sensor, and wherein the sample data set is representative of the acoustic signal across a frequency spectrum; determining a plurality of frequency domain features of the sample data set; comparing the plurality of frequency domain features with an event signature, wherein the event signature comprises a plurality of thresholds, ranges, or both corresponding to the plurality of frequency domain features; determining that the plurality of frequency domain features matches the thresholds, ranges, or both of the event signature; and determining the presence of the event based on determining that the plurality of frequency domain features match the thresholds, ranges, or both of the event signature.

In a sixth aspect, a method of detecting an event using acoustic data comprises: obtaining a sample data set, wherein the sample data set is a sample of an acoustic signal originating from an acoustic sensor excluding an acoustic sensor located inside a wellbore, and wherein the sample data set is representative of the acoustic signal across a frequency spectrum; determining a plurality of frequency domain features of the sample data set; comparing the plurality of frequency domain features with an event signature, wherein the event signature comprises a plurality of thresholds, ranges, or both corresponding to the plurality of frequency domain features; determining that the plurality of frequency domain features matches the thresholds, ranges, or both of the event signature; and determining the presence of the event based on determining that the plurality of frequency domain features match the thresholds, ranges, or both of the event signature.

In a seventh aspect, a system for processing acoustic data comprises: a receiver unit comprising a processor and a memory, wherein the receiver unit is configured to receive a signal from a sensor disposed along a sensor path, wherein a processing application is stored in the memory, and wherein the processing application, when executed on the processor, configures the processor to: receive the signal from the sensor, wherein the signal comprises acoustic signal received at one or more lengths along the sensor path; determine a plurality of frequency domain features of the signal across a frequency spectrum; generate an output comprising the plurality of frequency domain features; compare the plurality of frequency domain features with an event signature; and determine the presence of an event corresponding to the event signature based on determining that the plurality of frequency domain features match the event signature.

In an eighth aspect, a system for processing acoustic data comprises: a receiver unit comprising a processor and a memory, wherein the receiver unit is configured to receive a signal from a sensor disposed along a sensor path or a sensor area, provided that the sensor path or sensor area does not extend through a wellbore, wherein a processing application is stored in the memory, and wherein the processing application, when executed on the processor, configures the processor to: receive the signal from the sensor, wherein the signal comprises acoustic signal received at one or more lengths along the sensor path or across a portion of the sensor area; determine a plurality of frequency domain features of the signal across a frequency spectrum; generate an output comprising the plurality of frequency domain features; compare the plurality of frequency domain features with an event signature; and determine the presence of an event corresponding to the event signature based on determining that the plurality of frequency domain features match the event signature.

In a ninth aspect, a method of processing acoustic data, the system comprising: a receiver unit comprising a processor and a memory, wherein the receiver unit is configured to receive a signal from a sensor disposed along a sensor path or a sensor area, provided that the sensor path or sensor area does not extend through a wellbore, wherein a processing application is stored in the memory, and wherein the processing application, when executed on the processor, configures the processor to: receive the signal from the sensor, wherein the signal comprises an indication of an acoustic signal received at one or more lengths along the sensor path or across a portion of the sensor area, wherein the signal is indicative of the acoustic signal across a frequency spectrum; determine a plurality of frequency domain features of the signal across the frequency spectrum; and generate an output comprising the plurality of frequency domain features.

In a tenth aspect, the system in any of the first to ninth aspects can further comprise: the sensor, wherein the sensor comprises a fiber optic cable disposed along the sensor path; and an optical generator coupled to the fiber optic cable, wherein the optical generator is configured to generate a light beam and pass the light beam into the fiber optic cable.

In an eleventh aspect, the system can include any of the first to tenth aspects wherein the plurality of frequency domain features of the signal comprise a spectral centroid, and wherein the spectral centroid is indicative of a center of mass of the frequency spectrum of the acoustic signal.

In a twelfth aspect, the system can include any of the first to eleventh aspects wherein the plurality of frequency domain features of the signal comprise a spectral spread, wherein the spectral spread is indicative of an energy distribution of the acoustic signal around a spectral centroid.

In a thirteenth aspect, the system can include any of the first to twelfth aspects wherein the plurality of frequency domain features of the signal comprise a spectral roll-off, wherein the spectral roll-off is indicative of a frequency band comprising a predetermined percentage of a magnitude of signal strengths across the frequency spectrum.

In a fourteenth aspect, the system can include any of the first to thirteenth aspects wherein the plurality of frequency domain features of the signal comprise a spectral skewness, wherein the spectral skewness is indicative of a symmetry of a distribution of spectral magnitude values around an arithmetic mean of the spectral magnitude values.

In a fifteenth aspect, the system can include any of the first to fourteenth aspects wherein the plurality of frequency domain features of the signal comprise an RMS band energy, wherein the RMS band energy is a measure of signal energy of the signal in predetermined frequency bands across the frequency spectrum.

In a sixteenth aspect, the system can include any of the first to fifteenth aspects wherein the signal energy in each frequency band of the predetermined frequency bands is a normalized energy based on a total RMS energy across the frequency spectrum.

In a seventeenth aspect, the system can include any of the first to sixteenth aspects wherein the plurality of frequency domain features of the signal comprise a total RMS energy, wherein the total RMS energy comprises a root mean square of a waveform of the signal calculated in the time domain.

In an eighteenth aspect, the system can include any of the first to seventeenth aspects wherein the plurality of frequency domain features of the signal comprise a spectral flatness, wherein the spectral flatness is a ratio of a geometric mean to an arithmetic mean of an energy spectrum value of the signal.

In a nineteenth aspect, the system can include any of the first to eighteenth aspects wherein the plurality of frequency domain features of the signal comprise a spectral slope, wherein the spectral slope comprises a linear approximation of a shape of the spectrum of the signal.

In a twentieth aspect, the system can include any of the first to nineteenth aspects wherein the plurality of frequency domain features of the signal comprise a spectral kurtosis, wherein the spectral kurtosis comprises an indication of a flatness of the spectrum around a mean of the spectrum in the signal.

In a twenty first aspect, the system can include any of the first to twentieth aspects wherein the plurality of frequency domain features of the signal comprise a spectral flux, wherein the spectral flux is a measure of a change in spectral magnitude summed across at least a portion of frequencies present in the signal between successive determinations of the frequency domain features.

In a twenty second aspect, the system can include any of the first to twenty first aspects wherein the plurality of frequency domain features of the signal comprise a spectral autocorrelation function, wherein the spectral autocorrelation function is indicative of a lag of the signal that maximizes the correlation between the signal and a shifted signal.

In a twenty third aspect, the system can include any of the first to twenty second aspects wherein the plurality of frequency domain features of the signal comprise at least two of: a spectral centroid, a spectral spread, a spectral roll-off, a spectral skewness, an RMS band energy, a total RMS energy, a spectral flatness, a spectral slope, a spectral kurtosis, a spectral flux, or a spectral autocorrelation function.

In a twenty fourth aspect, the system can include any of the first to twenty third aspects wherein the signal comprises a first data size, wherein the output comprises a second data size, and wherein the first data size is greater than the second data size.

In a twenty fifth aspect, the system can include any of the first to twenty fourth aspects wherein the event signatures comprise at least one of a rail car signature, a traffic signature, a security signature, a rotational or vibrational equipment signature, a building signature.

In a twenty sixth aspect, the system can include any of the first to twenty fifth aspects wherein the acoustic signal is generated by at least one of a mechanical source, a biological source, a fluid turbulence source, a fluid leak source, a weather source, or an object collision.

In a twenty seventh aspect, the system can include any of the first to twenty sixth aspects wherein the sensor is disposed within or along at least one of a rail line, a road, a pipeline, a fence, industrial equipment.

In a twenty eighth aspect, the system can include any of the first to twenty seventh aspects wherein the plurality of frequency domain features comprise at least two different frequency domain features of the signal across the frequency spectrum While various embodiments in accordance with the principles disclosed herein have been shown and described above, modifications thereof may be made by one skilled in the art without departing from the spirit and the teachings of the disclosure. The embodiments described herein are representative only and are not intended to be limiting. Many variations, combinations, and modifications are possible and are within the scope of the disclosure. Alternative embodiments that result from combining, integrating, and/or omitting features of the embodiment(s) are also within the scope of the disclosure. For example, features described as method steps may have corresponding elements in the system embodiments described above, and vice versa. Accordingly, the scope of protection is not limited by the description set out above, but is defined by the claims which follow, that scope including all equivalents of the subject matter of the claims. Each and every claim is incorporated as further disclosure into the specification and the claims are embodiment(s) of the present invention(s). Furthermore, any advantages and features described above may relate to specific embodiments, but shall not limit the application of such issued claims to processes and structures accomplishing any or all of the above advantages or having any or all of the above features.

Additionally, the section headings used herein are provided for consistency with the suggestions under 37 C.F.R. 1.77 or to otherwise provide organizational cues. These headings shall not limit or characterize the invention(s) set out in any claims that may issue from this disclosure. Specifically and by way of example, although the headings might refer to a "Field," the claims should not be limited by the language chosen under this heading to describe the so-called field. Further, a description of a technology in the "Background" is not to be construed as an admission that certain technology is prior art to any invention(s) in this disclosure. Neither is the "Summary" to be considered as a limiting characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of the claims shall be considered on their own merits in light of this disclosure, but should not be constrained by the headings set forth herein.

Use of broader terms such as comprises, includes, and having should be understood to provide support for narrower terms such as consisting of, consisting essentially of, and comprised substantially of. Use of the term "optionally," "may," "might," "possibly," and the like with respect to any element of an embodiment means that the element is not required, or alternatively, the element is required, both alternatives being within the scope of the embodiment(s). Also, references to examples are merely provided for illustrative purposes, and are not intended to be exclusive.

While preferred embodiments have been shown and described, modifications thereof can be made by one skilled in the art without departing from the scope or teachings herein. The embodiments described herein are exemplary only and are not limiting. Many variations and modifications of the systems, apparatus, and processes described herein are possible and are within the scope of the disclosure. For example, the relative dimensions of various parts, the materials from which the various parts are made, and other parameters can be varied. Accordingly, the scope of protection is not limited to the embodiments described herein, but is only limited by the claims that follow, the scope of which shall include all equivalents of the subject matter of the claims. Unless expressly stated otherwise, the steps in a method claim may be performed in any order. The recitation of identifiers such as (a), (b), (c) or (1), (2), (3) before steps in a method claim are not intended to and do not specify a particular order to the steps, but rather are used to simplify subsequent reference to such steps.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

The invention claimed is:

1. A system for processing acoustic data to identify an event, the system comprising:
  a receiver unit comprising a processor and a memory, wherein the receiver unit is configured to receive a signal from a sensor disposed along a sensor path or across a sensor area, wherein a processing application is stored in the memory, and wherein the processing application, when executed on the processor, configures the processor to:
    receive the signal from the sensor, wherein the signal comprises an indication of an acoustic signal received at one or more lengths along the sensor path or across a portion of the sensor area, wherein the signal is indicative of the acoustic signal across a frequency spectrum;
    determine a plurality of frequency domain features of the acoustic signal across the frequency spectrum, wherein each frequency domain feature of the plurality of frequency domain features is indicative of the acoustic signal across the frequency spectrum;
    identify a location, a type, and an occurrence of an event using the plurality of frequency domain features and at least one of an event signature, machine learning, or deterministic techniques; and
    generate an output comprising the plurality of frequency domain features.

2. The system of claim 1, wherein the receiver unit is configured to receive the signal from the sensor disposed along the sensor path or the sensor area provided that the sensor path or sensor area does not extend through a wellbore.

3. The system of claim 1, further comprising:
  the sensor, wherein the sensor comprises a fiber optic cable disposed along the sensor path; and
  an optical generator coupled to the fiber optic cable, wherein the optical generator is configured to generate a light beam and pass the light beam into the fiber optic cable.

4. The system of claim 1, wherein the plurality of frequency domain features of the signal comprise a spectral centroid, and wherein the spectral centroid is indicative of a center of mass of the frequency spectrum of the acoustic signal.

5. The system of claim 1, wherein the plurality of frequency domain features of the signal comprise a spectral spread, wherein the spectral spread is indicative of an energy distribution of the acoustic signal around a spectral centroid.

6. The system of claim 1, wherein the plurality of frequency domain features of the signal comprise a spectral roll-off, wherein the spectral roll-off is indicative of a frequency band comprising a predetermined percentage of a magnitude of signal strengths across the frequency spectrum.

7. The system of claim 1, wherein the plurality of frequency domain features of the signal comprise a spectral skewness, wherein the spectral skewness is indicative of a symmetry of a distribution of spectral magnitude values around an arithmetic mean of the spectral magnitude values.

8. The system of claim 1, wherein the plurality of frequency domain features of the signal comprise an RMS band energy, wherein the RMS band energy is a measure of signal energy of the signal in predetermined frequency bands across the frequency spectrum, and wherein the signal energy in each frequency band of the predetermined frequency bands is a normalized energy based on a total RMS energy across the frequency spectrum, and wherein the signal energy in each frequency band of the predetermined frequency bands is a normalized energy based on a total RMS energy across the frequency spectrum.

9. The system of claim 1, wherein the plurality of frequency domain features of the signal comprise a total RMS energy, wherein the total RMS energy comprises a root mean square of a waveform of the signal calculated in the time domain.

10. The system of claim 1, wherein the plurality of frequency domain features of the signal comprise a spectral flatness, wherein the spectral flatness is a ratio of a geometric mean to an arithmetic mean of an energy spectrum value of the signal.

11. The system of claim 1, wherein the plurality of frequency domain features of the signal comprise a spectral slope, wherein the spectral slope comprises a linear approximation of a shape of the spectrum of the signal.

12. The system of claim 1, wherein the plurality of frequency domain features of the signal comprise a spectral kurtosis, wherein the spectral kurtosis comprises an indication of a flatness of the spectrum around a mean of the spectrum in the signal.

13. The system of claim 1, wherein the plurality of frequency domain features of the signal comprise a spectral flux, wherein the spectral flux is a measure of a change in spectral magnitude summed across at least a portion of frequencies present in the signal between successive determinations of the frequency domain features.

14. The system of claim 1, wherein the plurality of frequency domain features of the signal comprise a spectral autocorrelation function, wherein the spectral autocorrelation function is indicative of a lag of the signal that maximizes the correlation between the signal and a shifted signal.

15. The system of claim 1, wherein the signal comprises a first data size, wherein the output comprises a second data size, and wherein the first data size is greater than the second data size.

16. The system of claim 1, wherein the processing application, when executed on the processor, further configures the processor to:
compare the plurality of frequency domain features with the event signature;
identify the type of the event for the at least one event signature based on the determination that the plurality of frequency domain features match the at least one event signature; and
determine the presence of the event corresponding to the event signature based on determining that the plurality of frequency domain features match the event signature.

17. A system for detecting an event using acoustic data, the system comprising:
a processor unit comprising a processor and a memory, wherein the processor unit is adapted for signal communication with a receiver, and wherein the memory comprises an analysis application, that when executed on the processor, configures the processor to:
receive, from the receiver, a signal comprising a plurality of frequency domain features, wherein the frequency domain features are indicative of an acoustic signal, and wherein each frequency domain feature of the plurality of frequency domain features is indicative of the acoustic signal across a frequency spectrum;
compare the plurality of frequency domain features with one or more event signatures, wherein the one or more event signatures comprise thresholds or ranges for each of the plurality of frequency domain features;
determine that the plurality of frequency domain features match at least one event signature of the one or more event signatures;
identify a type of event for the at least one event signature based on the determination that the plurality of frequency domain features match the at least one event signature;
determine the occurrence of the at least one event based on the determination that the plurality of frequency domain features match the at least one event signature; and
generate an output of the occurrence of the at least one event based on the determination.

18. The system of claim 17, wherein the event signatures comprise at least one of a rail car signature, a traffic signature, a security signature, a rotational or vibrational equipment signature, a building signature.

19. The system of claim 17, wherein the acoustic signal is generated by at least one of a mechanical source, a biological source, a fluid turbulence source, a fluid leak source, a weather source, or an object collision.

20. A method for detecting an event using acoustic data, the method comprising:
receiving a signal comprising a plurality of frequency domain features, wherein the frequency domain features are indicative of an acoustic signal, and wherein each frequency domain feature of the plurality of frequency domain features is indicative of the acoustic signal across a frequency spectrum;
comparing the plurality of frequency domain features with one or more event signatures, wherein the one or more event signatures comprise thresholds or ranges for each of the plurality of frequency domain features;
determining that the plurality of frequency domain features match at least one event signature of the one or more event signatures;
identifying a type of event for the at least one event signature based on the determination that the plurality of frequency domain features match the at least one event signature;
determining the occurrence of the at least one event based on the determination that the plurality of frequency domain features match the at least one event signature; and
generating an output of the occurrence of the at least one event based on the determination.

21. The method of claim 20, further comprising:
obtaining a sample data set, wherein the sample data set is a sample of the acoustic signal originating from an acoustic sensor; and
determining the plurality of frequency domain features using the sample data set.

22. The method of claim 21, wherein the sample data set is the sample of the acoustic signal originating from the acoustic sensor excluding an acoustic sensor located inside a wellbore.

23. The method of claim 20, wherein the plurality of frequency domain features of the signal comprise at least two of: a spectral centroid, a spectral spread, a spectral roll-off, a spectral skewness, an RMS band energy, a total RMS energy, a spectral flatness, a spectral slope, a spectral kurtosis, a spectral flux, or a spectral autocorrelation function.

* * * * *